US011485187B1

(12) United States Patent
Edren et al.

(10) Patent No.: US 11,485,187 B1
(45) Date of Patent: Nov. 1, 2022

(54) CONFIGURABLE BUSHING

(71) Applicant: Zoox, Inc., Foster City, CA (US)

(72) Inventors: Johannes Edren, Belmont, CA (US); Johannes Andreas Huennekens, Los Gatos, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/303,458

(22) Filed: May 28, 2021

(51) Int. Cl.
| | |
|---|---|
| *B60G 17/015* | (2006.01) |
| *B60G 17/027* | (2006.01) |
| *B60G 17/02* | (2006.01) |
| *B60G 17/0165* | (2006.01) |

(52) U.S. Cl.
CPC ..... *B60G 17/0152* (2013.01); *B60G 17/0165* (2013.01); *B60G 17/02* (2013.01); *B60G 17/027* (2013.01); *B60G 2202/14* (2013.01); *B60G 2204/41062* (2013.01); *B60G 2204/62* (2013.01); *B60G 2206/42* (2013.01); *B60G 2206/73* (2013.01); *B60G 2500/20* (2013.01); *B60G 2600/182* (2013.01); *B60G 2800/162* (2013.01)

(58) Field of Classification Search
CPC ............ B60G 17/0152; B60G 17/0165; B60G 17/02; B60G 17/027; B60G 2204/14; B60G 2204/41062; B60G 2204/62; B60G 2206/42; B60G 2206/73; B60G 2500/20; B60G 2600/182; B60G 2800/162
See application file for complete search history.

(56) References Cited

U.S. PATENT DOCUMENTS

| | | | | |
|---|---|---|---|---|
| 4,872,651 | A * | 10/1989 | Thorn | F16F 13/14 267/293 |
| 5,609,353 | A | 3/1997 | Watson | |
| 6,007,072 | A * | 12/1999 | Yoon | F16F 13/14 280/5.514 |
| 6,644,633 | B2 * | 11/2003 | Graeve | F16F 13/16 267/141.2 |
| 6,644,635 | B2 * | 11/2003 | Breitfeld | F16F 13/16 267/293 |
| 2003/0151178 | A1 * | 8/2003 | Vossel | F16F 13/16 267/219 |
| 2009/0178893 | A1 * | 7/2009 | Auten | F16F 13/16 188/269 |
| 2018/0066723 | A1 * | 3/2018 | Inoue | F16F 7/1011 |
| 2020/0263751 | A1 * | 8/2020 | Ito | F16F 13/305 |
| 2021/0396295 | A1 * | 12/2021 | Rawlings | F16F 13/1463 |

FOREIGN PATENT DOCUMENTS

| | | | | | |
|---|---|---|---|---|---|
| CN | 102785545 | A * | 11/2012 | ............ | B60G 3/20 |
| CN | 104141726 | A * | 11/2014 | ............ | B60G 7/02 |
| DE | 10309905 | A1 * | 9/2003 | ............ | F16F 13/16 |
| DE | 10330059 | A1 * | 5/2004 | ............ | F16F 13/16 |
| DE | 102015215425 | B3 * | 6/2016 | ............ | B60G 7/001 |

(Continued)

*Primary Examiner* — James A English
*Assistant Examiner* — Scott F. Underwood
(74) *Attorney, Agent, or Firm* — Lee & Hayes, P.C.

(57) ABSTRACT

A configurable bushing and/or bushing system that can enable adjustment of an effective modulus of elasticity of different regions radially disposed about a point or inner sleeve. The bushing and/or bushing system can enable adjustment of the kinematic pivot point and/or allow for dynamic configuration and control.

20 Claims, 17 Drawing Sheets

(56) References Cited

FOREIGN PATENT DOCUMENTS

| EP | 0784163 A1 | | 7/1997 | |
|----|------------|---|--------|---|
| GB | 2163104 A | * | 2/1986 | ............. B60G 7/006 |
| GB | 2298019 A | * | 8/1996 | .......... F16F 13/1463 |
| GB | 2382638 A | * | 6/2003 | ........... B60G 13/001 |
| JP | 2977796 B2 | * | 11/1999 | .......... F16F 13/1427 |
| JP | 3748625 B2 | * | 2/2006 | ............. F16F 1/387 |
| KR | 100427312 B1 | * | 4/2004 | |
| KR | 20090061411 A | * | 6/2009 | |
| KR | 20110060562 A | * | 6/2011 | |
| WO | WO-2015135684 A1 | * | 9/2015 | .......... F16F 13/1463 |

\* cited by examiner

CONFIGURABLE BUSHING

BACKGROUND

A bushing or bush is typically employed between two surfaces to prevent the surfaces from rubbing against one another and causing unnecessary stress, friction, and wear. Bushings are often configured as thin tubes of material disposed between shaft and a sleeve to allow relative motion (e.g., rotation and/or sliding motion) between the shaft and sleeve. A bushing can reduce wear between a shaft and a sleeve and may also provide a damping force to reduce vibration and noise.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1A:
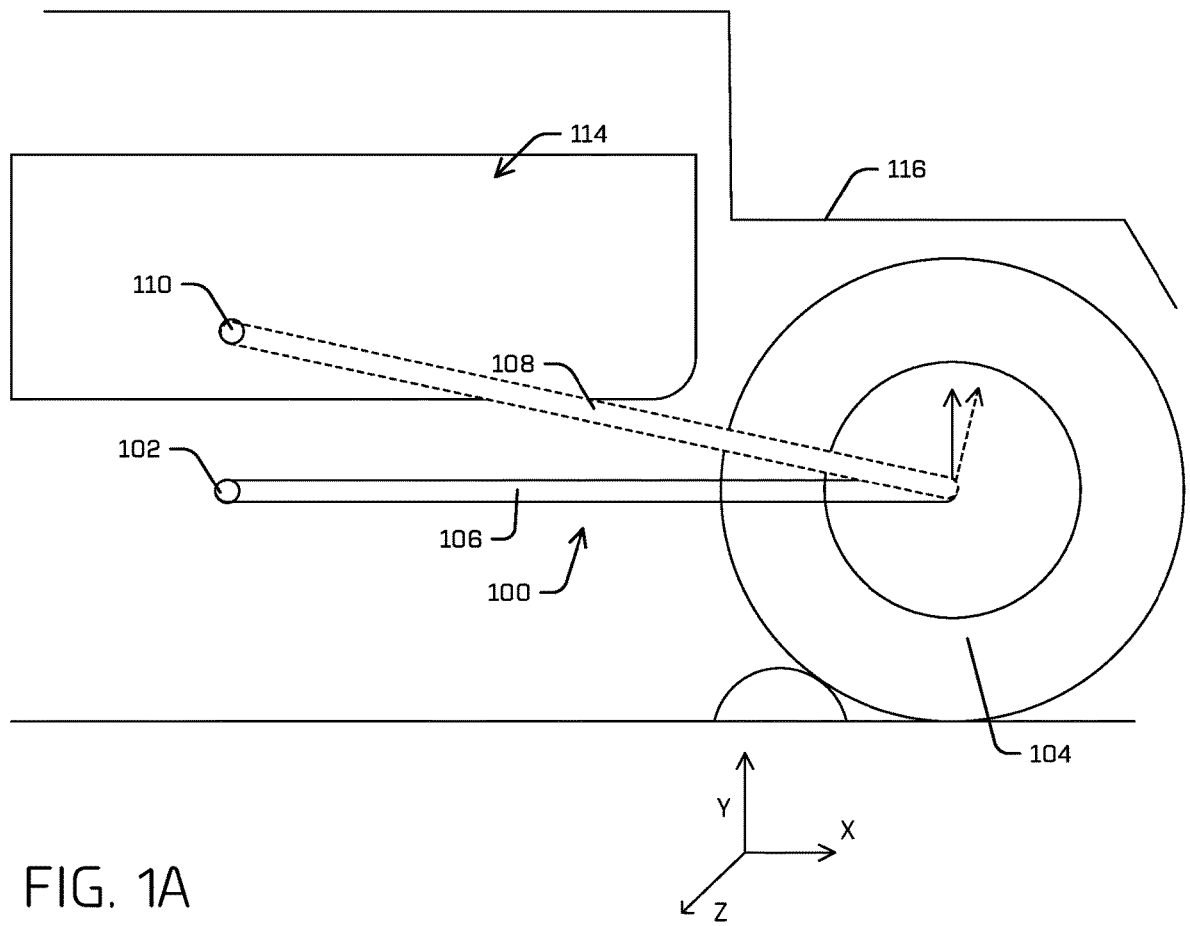
FIGS. 1A-1B are example diagrams illustrating a shifted pivot point that may be achieved with an elasto-hydraulic bushing system as described herein.

This application relates to a bushing system that can be employed in a vehicle suspension system or other applications. Bushings can be used in vehicle suspension systems to help absorb impacts and vibration during operation. Conventional bushings can have a fixed axis of rotation aligned with a center of the shaft, which limits the locations and applications in which bushings can be used.

In examples disclosed herein, a bushing system as described can be an elasto-hydraulic bushing system. In examples disclosed herein, a bushing system as described can be a configurable bushing and/or bushing system. In examples disclosed herein, a bushing system as described can be a configurable elasto-hydraulic bushing system. In examples, the bushing and/or bushing system may be dynamically configurable. In examples, the elasto-hydraulic bushing system may be dynamically configurable.

In examples, the bushing system may be configured to transform rotational motion into translational motion and vice versa. In examples, the bushing system may exhibit the functional characteristics of a pivot point offset from the body or central axis of the bushing. In examples, the bushing system may be employed in a vehicle suspension system and enable a kinematic pivot point of a suspension arm to be shifted or "offset" from the location of the bush during operation. In examples, shifting or offsetting the location of the kinematic pivot point of the suspension arm can lead to improved overall suspension kinematics and more flexibility in the design and positioning of suspension components.

In examples, the bushing system may be configured to exhibit different reactions to different events. In examples, the bushing system can transform rotational motion into translational motion. For example, in a vehicle suspension system, when a suspension arm exhibits a rotational motion, the bushing system can transform the rotation of the arm into a translation along the axis of the arm. In examples, the bushing system can additionally or alternatively transform translational motion into rotational motion. For example, in the event a suspension arm exhibits a pressure onto the bushing system due to the suspension arm translating toward the bushing system in the direction along the axis of the arm, the bushing system may transform the translation motion into a rotational motion of the suspension arm.

In examples, the bushing system may be controlled to exhibit differing degrees of reaction to an event. In examples, the reaction to an event of the bushing system may be controlled by at least one of a fluid flow, modification of a fluid, modification of an elastomeric material, and any combination thereof.

In examples, the bushing system may be controlled to invert its reaction. For example, the bushing system can be controlled to transform a rotational movement of a suspension arm in a first direction (e.g., counter-clockwise) about a rotational axis (R-axis) or pivot point into a translation in either direction along a longitudinal axis (L-axis) of a suspension arm. Additionally, or alternatively, the bushing system can be controlled to transform a rotational movement of the suspension arm in a section direction (e.g., a clockwise direction) about the rotational axis or pivot point into translation in either direction along the longitudinal axis of a suspension arm. Additionally, or alternatively, the bushing system can be controlled to convert a translation of a suspension arm in either direction along the longitudinal axis of the suspension arm into a rotational motion of the suspension arm about a rotational axis. In examples, the translation of the suspension arm during rotation results in the pivot point or rotational axis moving through an arc during operation.

In examples, the bushing system may include a configurable effective modulus of elasticity or level of stiffness. In examples, the effective modulus of elasticity or stiffness of one or more regions of the bushing system may be controlled. In examples, the effective modulus of elasticity or stiffness may be controlled radially about an inner sleeve of a bushing or bushing system. In examples, the overall effective modulus of elasticity or stiffness of the bushing system may be controlled. In examples, the control of the effective modulus of elasticity or stiffness of one or more regions of the bushing system and/or of the bushing system as a whole may be dynamically controlled. In examples, the control of the effective modulus of elasticity or stiffness of one or more regions of one or more regions of an elastic or elastomeric members or elastic bodies of a bushing system may be controlled, independently controlled, and/or dynamically controlled. In examples, the control of the effective modulus of elasticity or stiffness of one or more regions of one or more elastic or elastomeric members or elastic bodies of a bushing system may be controlled and/or dynamically controlled.

In examples, the bushing system can be controlled to "turn off" under certain conditions, such that it functions as a traditional bushing system having a stationary pivot point that does not translate.

Examples of the bushing system can provide more flexibility with respect to location of the bushing in an environment. This can lead to increased designed options. In examples, the bushing system can enable the implementation of a larger vehicle cabin without sacrificing performance. In examples, the bushing system may enable complementary (e.g., mirrored) performance on opposite longitudinal ends and/or on opposite lateral sides of a vehicle.

In examples, a vehicle is provided having a vehicle structure and a bushing system coupled to the vehicle structure. The bushing system may include a first rigid portion fixed to the vehicle structure, a second rigid portion movable relative to the first rigid portion, and an elastomeric member disposed between the first rigid portion and the second rigid portion, the elastomeric member defining a first chamber and a second chamber, the first chamber fluidly connected to the second chamber. The vehicle may also include a suspension arm that may be coupled to the second rigid portion. In examples, the bushing system may be configured such that at least one of a rotation of the suspension arm causes fluid to flow from the first chamber to the second chamber thereby causing the suspension arm to translate, or a translation of the suspension arm causes fluid to flow from the second chamber to the first chamber, thereby causing the suspension arm to rotate.

In examples, a bushing system may be provided. The bushing system may include a first rigid portion, a second rigid portion movable relative to the first rigid portion, and an elastomeric member disposed between the first rigid portion and the second rigid portion. In examples, the elastomeric member may include a first chamber, and a second chamber fluidly connected to the first chamber. In examples, the bushing system may be configured such that at least one of a rotation of the second rigid portion causes fluid to flow from the first chamber to the second chamber thereby causing the second rigid portion to translate, or a translation of the second rigid portion causes fluid to flow from the second chamber to the first chamber, thereby causing the second rigid portion to rotate.

In examples, a method of transforming a first motion into a second motion may be provided. The method may include receiving, by a bushing system comprising a first chamber fluidly connected to a second chamber, a first force that is either a translation first force or a rotational first force. The method may include causing the first chamber to be compressed in response to receiving the translation force or rotational force. The method may include causing the second chamber to expand in response to the first chamber being compressed. The method may include imparting, by the bushing system, a second force associated with causing the second chamber to expand. In examples, the second force may be a rotational second force if the first force received is the translation first force. In examples, the second force may be a translation second force if the first force received is a rotational first force.

In examples, a vehicle is provided. The vehicle may include a vehicle structure. The vehicle may include a bushing system coupled to the vehicle structure. In examples, the bushing system may include a first rigid portion fixed to the vehicle structure, a second rigid portion movable relative to the first rigid portion, and an elastomeric member disposed between the first rigid portion and the second rigid portion. In examples, the vehicle may include a suspension arm coupled to the second rigid portion. In examples, the bushing system may be configured such that a first effective modulus of elasticity of a first region of the elastomeric member is configurable independent of a second effective modulus of elasticity of a second region of the elastomeric member in response to at least one of: a fluid flowing to or from a first chamber included in the elastomeric member, or a modification of a of a physical property of a material in the elastomeric member.

In examples, a bushing system is provided. The bushing system may include a first rigid portion, a second rigid portion movable relative to the first rigid portion, and an elastomeric member disposed between the first rigid portion and the second rigid portion. In examples, the bushing system may be configured such that a first effective modulus of elasticity of a first region of the elastomeric member is configurable independent of a second effective modulus of elasticity of a second region of the elastomeric member in response to at least one of: a fluid flowing to or from a first chamber included in the elastomeric member, or a modification of a physical property of a material in the elastomeric member.

In examples, a method is provided to configure an effective modulus of elasticity of a bushing system. In examples, the configuring can be performed dynamically. In examples, the method may include determining a status of a vehicle, a location of the vehicle, a predicted status of the vehicle, or a road condition. In examples, based at least in part on the status of the vehicle, the location of the vehicle, the predicted status of the vehicle, or the road condition, the method may include generating a trigger signal. In examples, based on the trigger signal, the method may include configuring a first effective modulus of elasticity of a first region of the elastomeric member independent of a second effective modulus of elasticity of a second region of the elastomeric member by causing a fluid flowing to or from a first chamber included in the elastomeric member, or a modification of a physical property of a material in the elastomeric member The techniques and systems described herein may be implemented in a number of ways. Example implementations are provided below with reference to the figures.

Figure 1B:
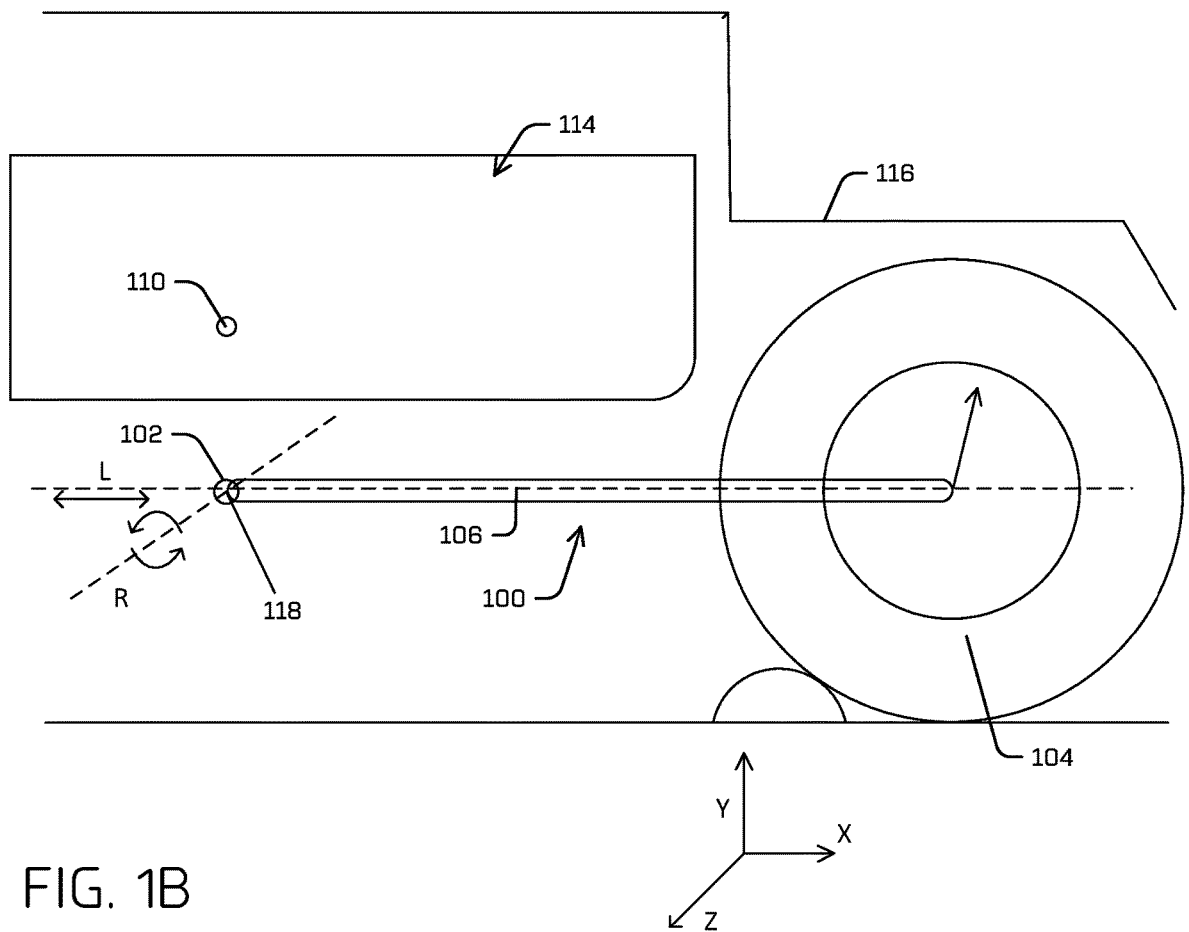

FIGS. 1A and 1B illustrate an example of how a bushing system as described herein can enable shifting or offsetting of a pivot point. The illustration is made in conjunction with a trailing arm vehicle suspension system. However, the bushing system as described may be employed in other types of suspension systems and/or in environments other than a vehicle suspension. The same effect and/or benefits described with the illustrated embodiment, may be achieved in other environments and contexts. Accordingly, the illustrations of FIGS. 1A and 1B are only examples and not intended to limit the application of the bushing system as described.

FIG. 1A illustrates two conceptual configurations for a trailing arm suspension system 100. One set up includes a rear wheel 104 connected at a first pivot point 102 by suspension arm 106. The second set up shows rear wheel 104 connected to a second pivot point 110 via suspension arm 108. These two set ups are to be understood as employed in the alternative. Area 114 indicates the space of a vehicle 116. During vehicle operation, wheel 104 may move in the vertical direction, for example when going over a bump or falling into a pothole. The wheel 104 may also experience forces in the longitudinal direction or direction of travel, for example during acceleration or braking. These wheel behaviors can result in dynamic movements and forces acting on the suspension arm.

The location of the pivot point of a bushing to which a suspension arm is connected may affect the kinematics induced by the bushing onto the suspension system. In examples, when the wheel 104 travels over a bump and thus moves in the vertical direction, it may be desirable to push the wheel backward or away from the direction of travel to diminish the shock caused by the wheel impacting the bump. The motion of the wheel 104 and reactionary force induced on the wheel 104, however, depends on the location of the pivot point. For example, at pivot point 110, as the wheel 104 rolls over the bump its components of motion in both the vertical direction (Y) and the longitudinal direction (X). Thus, as the wheel 104 travels over the bump, it translates slightly away from the bump, thereby minimizing the impact force imparted to the wheel and provide a smoother ride. On the other hand, in a system involving pivot point 102, a displacement of the wheel 104 as it moves over the bump is substantially in the vertical direction (Y). Thus, at pivot point 102, no meaningful reactionary force in the longitudinal direction (X) will be exerted onto the wheel 104 as it travels over a bump.

In a typical system, therefore, it may be advantageous from a riding comfort standpoint to design the suspension system 100 to include a pivot point 110 rather than pivot point 102. However, as illustrated in FIG. 1A, employing a diagonal suspension arm 108 can lead to a pivot point 110 being located at place that interferes with cabin space 114 of vehicle 116. Thus, when considering cabin space 114, use of pivot point 102 is favorable over pivot point 110.

To accommodate for these competing interests, an example elasto-hydraulic bushing system as disclosed herein can be employed. The elasto-hydraulic bushing system as described can be configured to provide a functional equivalent performance of pivot point 110 but still be located at pivot point 102 by shifting or offsetting the pivot point. In examples, the elasto-hydraulic bushing system as described can transform a rotational motion into a translational motion, a translational motion into a rotational motion, or both.

Moreover, in examples, an elasto-hydraulic bushing system as disclosed herein may provide a dynamically tunable performance that can be customized for a given event such as turn, accident, brake, acceleration, or based on road conditions. In examples, an elasto-hydraulic bushing system as described may provide a configurable system in which it may be possible to control or adjust the effective modulus of elasticity of one or more regions of the bushing system to affect operation of the bushing system.

FIG. 1B illustrates a conceptual configuration of a trailing arm suspension system like FIG. 1A, except with respect to examples in which an elasto-hydraulic bushing system as disclosed herein is employed at the more favorable pivot point 102. As described in more detail herein, examples of an elasto-hydraulic bushing system as described may be able to transform rotational motion into translational motion and translational motion into rotational motion. Thus, as illustrated, during vehicle operation, if wheel 104 moves in the vertical direction, for example when going over a bump, it causes the suspension arm 106 to exhibit a rotational motion about rotational axis (R-axis) about pivot point 102. Unlike a standard bushing, however, an elasto-hydraulic bushing system as disclosed herein placed at pivot point 102 could transform at least a portion of that rotational motion about the R-axis into a translational motion along the longitudinal axis (L-axis). As a result, as the wheel 104 rolls over the bump it translates slightly away from the bump because of the translational motion induced by the elasto-hydraulic bushing system. In this manner, the impact force imparted to the wheel can be reduced or minimized in a manner as if a standard bushing were employed at previously described pivot point 110 and provide a smoother ride. In examples, improved rider experience may also be achieved by the dynamic configurability of the effective modulus of elasticity of an elasto-hydraulic bushing system as disclosed.

Figure 2A:
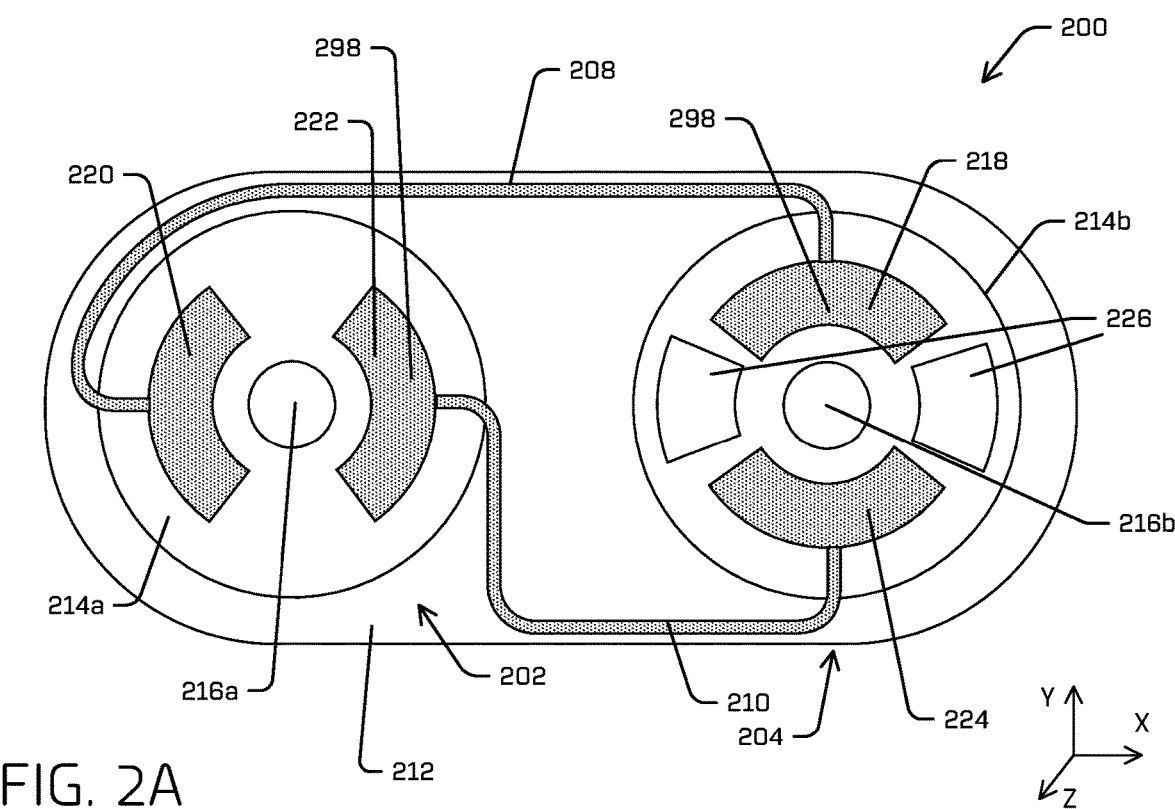
FIGS. 2A-2B are example diagrams of a double-pin elasto-hydraulic bushing system as described herein.
Figure 2B:
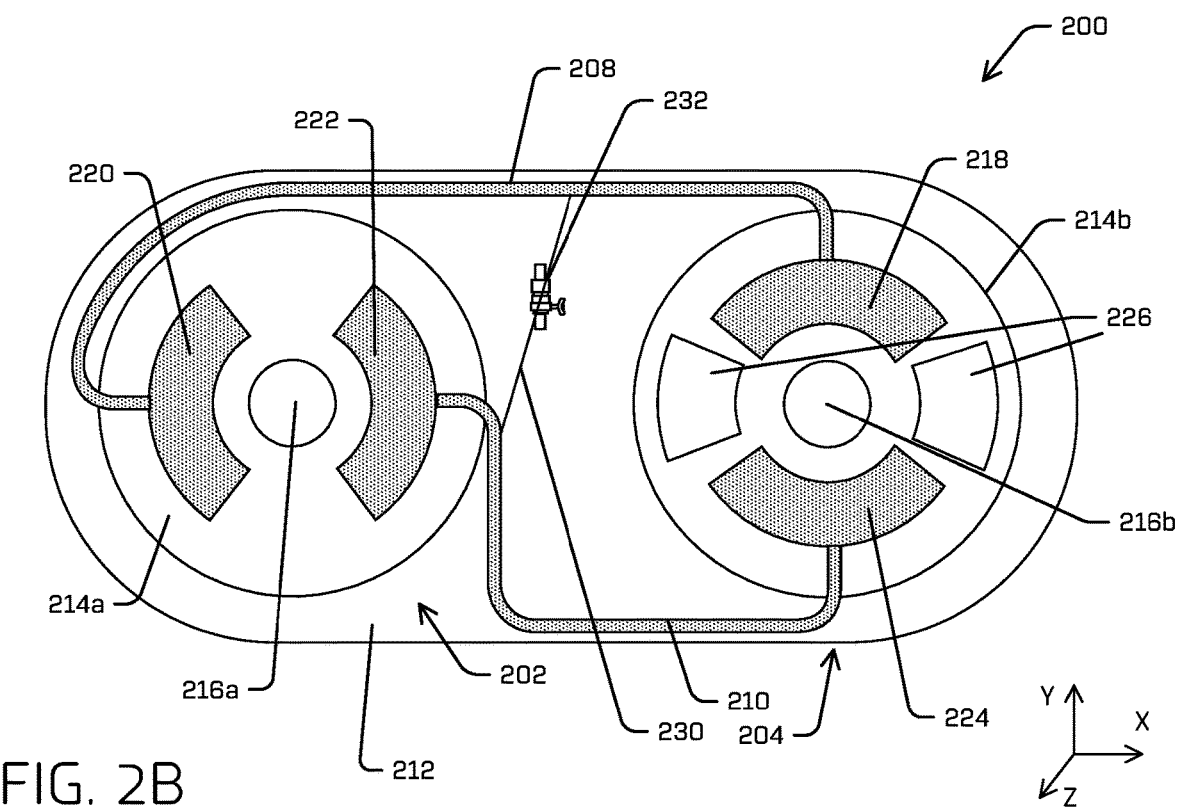
Figure 2C:
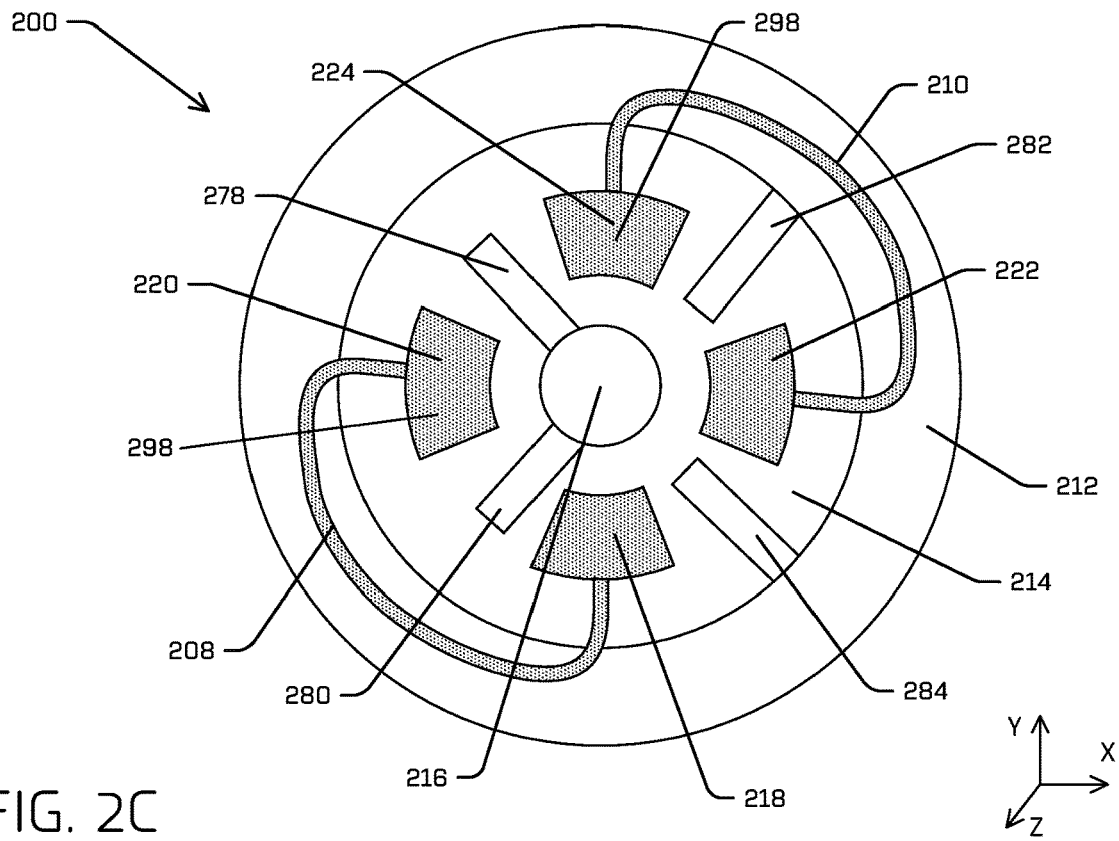
FIGS. 2C-2D are example diagrams of a single-pin elasto-hydraulic bushing system as described herein.
Figure 2D:
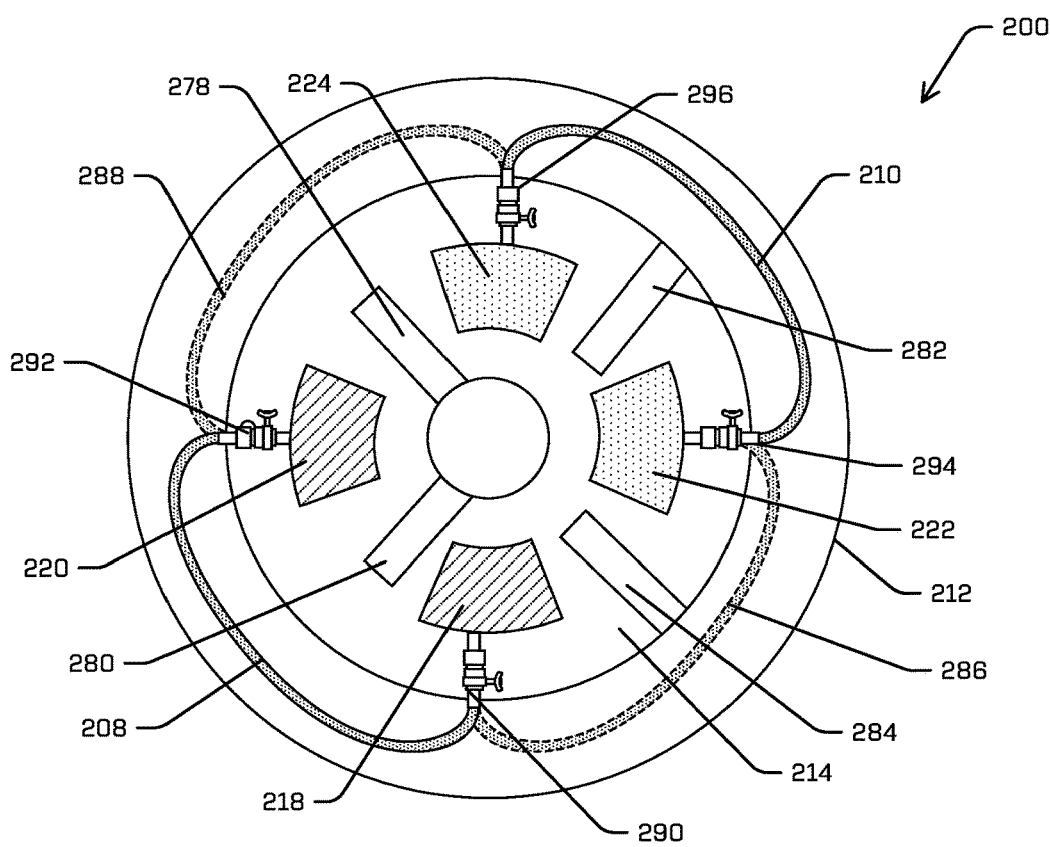

FIGS. 2A-2C illustrate examples of an elasto-hydraulic bushing system 200 in accordance with this description. The bushing system 200 may include a double-pin system that may include a first bushing 202 and second bushing 204 hydraulically interconnected by one or more flow paths 208 and 210. Bushings 202 and 204 can be arranged side-by-side to form a double-pin system as illustrated in FIGS. 2A and 2B or can be integrated into a single-pin system that may include a combined bushing 206 as illustrated in FIGS. 2C and 2D. In examples, bushings 202 and 204, or combined bushing 206, may have a cylindrical or generally cylindrical shape. In examples, the cylindrical shape can have a circular cross-section or an oval cross-section. For purposes of this description a cylindrical or generally cylindrical shape is considered to have a width, a height, and a length. The width of the shape is horizontal dimension (x-direction as illustrated) of a base of the cylindrical or generally cylindrical shape. The height is the vertical dimension (y-direction as illustrated) of a base of the cylindrical or generally cylindrical shape, and that is perpendicular to the width. The length is the dimension extending between the two bases of a cylindrical or generally cylindrical shape (z-direction as illustrated). These terms should be so understood when referring to the width, height, and length of a bushing or bushing system as described herein.

In examples, the elasto-hydraulic bushing system 200 may include a first rigid portion, a second rigid portion, and an elastic or elastomeric member between the first right portion and second rigid portion. In examples, the first rigid portion and the second rigid portions may be movable relative to each other. In examples, one rigid portion is fixed in place. In examples, one rigid portion is movable relative to the other rigid portion. In examples, the first rigid portion is fixed in place, and the second rigid portion is movable relative to the first rigid portion. In examples, either the first or second rigid portion may be a housing 212. In examples, either the first or second rigid portion may be one or more inner sleeves 216. In examples, the elastic or elastomeric member may be one or more elastic bodies 214. Included in the one or more elastic or elastomeric members or elastic bodies 214, the bushing system 200 may include or define one or more fluid chambers 218, 220, 222, and 224. In examples, the one or more elastic or elastomeric members or elastic bodies 214 may include or define one or more sections 226 with variable elastomerity. In examples, one or more sections 226 can be empty voids, fluid filled cavities, or any combination thereof. In examples, one or more sections 226 may be filled with air. Any fluid disclosed herein for use in chambers 218, 220, 222, and 224 may be used in one or more sections 226. In examples, one or more sections 226 may be filled with a smart fluid material such as a magnetorheological fluid, electrorheological fluid, or any like material as described later whose viscosity may be modified by the application of a magnetic field, electric field, electromagnetic field, or any combination thereof as also later described. In examples, the performance of one or more sections 226 may be controlled using a smart fluid material and one or more magnetic fields, electric fields, and/or electromagnetic fields in a manner as described for the smart fluids that may be used in chambers 218, 220, 222, and 224.

In examples, as described herein, the bushing system 200 may be configured such that at least one of rotation of the suspension arm causes fluid to flow from the first fluid reservoir to the second fluid reservoir thereby causing the suspension arm to translate, or translation of the suspension arm causes fluid to flow from the second fluid reservoir to the first fluid reservoir, thereby causing the suspension arm to rotate.

In examples, as illustrated in FIG. 2A, two bushings 202 and 204 may be arranged side-by-side, adjacent, or in proximity to each other. The distance between bushing 202 and bushing 204 is not particularly limited and can be set to achieve the intended functionality. In examples, each bushing 202 and 204 may have its own housing 212. In examples, a pair of bushings 202 and 204 may share a common housing 212. In examples, as illustrated in FIG. 2C, the two bushings may be integrated into a combined bushing 206.

A rigid portion may be a housing 212. Housing 212 may be configured as an outer shell structure that surrounds a bushing 202, bushing 204, or combined bushing 206. In examples, housing 212 may have a similar cylindrical or generally cylindrical shape as the elastic or elastomeric member or elastic body 214 of bushings 202 and 204, or combined bushing 206. In examples, as shown in FIG. 2A, housing 212 may have a cylindrical or generally cylindrical shape that may accommodate one or more elastic or elastomeric member or elastic bodies 214 of bushings 202 and 204. In examples, as shown in FIG. 2C, housing 212 may have a cylindrical or generally cylindrical shape that accommodates an elastic or elastomeric member or elastic body 214 of combined bushing 206. Although not illustrated, in examples, bushings 202 and 204 may have their respective housing. In such examples, each bushing housing 212 may have a cylindrical or generally cylindrical shape to accommodate an elastic or elastomeric member or elastic body 214 of the bushing it surrounds. In examples, housing 212 extends the full length of bushings 202 and 204, or combined bushing 206. In examples, housing 212 exposes a first and second end of one or more elastic or elastomeric member or elastic bodies 214 of bushings 202 and 204, or of combined bushing 206. Housing 212 may be formed of a material that is resilient to deformation. In examples, housing 212 can include a material such as a metal, metal alloy, polymer, wood, ceramic, or any combination thereof.

Housing 212 may be fixed, fastened, or secured to a structure in which the bushing system 200 is used. Any available fastening or securing means may be used to secure housing 212 to a structure. In examples, fastening or securing means may include any fastener or securing structure adequate for the environment. Examples of fastening or securing means may include bolts, screws, brackets, welded joints, clamps, or any combination thereof. Other fasteners or means to secure housing 212 may also be used.

In examples, bushing system 200 is used in a vehicle. In examples, bushing system 200 is used in a suspension system of a vehicle. In examples, bushing system 200 is used in the rear suspension system of a vehicle. In examples, bushing system 200 is used in the front suspension system of a vehicle. In examples, bushing system 200 is used in the rear and front suspension systems of a vehicle. In examples, where bushing system 200 is used in a vehicle or suspension system for a vehicle, housing 212 can be fixed to, fastened, secured or attached to a portion of the vehicle structure or body. Housing 212 can be fastened, fixed, secured or attached to a portion of a vehicle by any of the aforesaid securing or fastening means.

In examples, each bushing 202 and 204 may have its own housing 212. In examples where each bushing has its own housing, each housing independently can be fixed to a structure in which the bushing system 200 is used. In examples, the housing of one bushing can be fastened or secured to the housing of the other bush. The same fasteners, fastening means, or securing means discussed above may be used to connect, fasten or secure the housing of one bushing to the housing of a second bush.

In examples, bushing 202, bushing 204, or combined bushing 206 of bushing system 200 may include an elastic or elastomeric member. In examples, the elastic or elastomeric member may be an elastic body 214. As shown in FIG. 2A, each bushing 202 and 204 may include its own elastic or elastomeric member or elastic body 214a and 214b. As shown in FIG. 2C a combined bushing 206 may include an elastic or elastomeric member or elastic body 214. The elastic or elastomeric member or elastic body 214 may include any suitable elastomeric material. In examples, the elastic or elastomeric member or elastic body 214 may include polyurethane, synthetic rubber, polytetrafluoroethylene (PTFE), any other like elastomeric material, and any combination thereof. In examples, the elastic or elastomeric member or elastic body 214 may include a smart elastomer material such as for example, a magnetorheologic elastomer, an electrorheological elastomer (e.g., an electroactive polymer), or any like material of manipulatable viscosity as discussed in more detail later.

In examples, elastic or elastomeric member or elastic body 214 may have a cylindrical or generally cylindrical shape. As discussed earlier, a cylindrical shape may have a circular or oval cross section. In examples, as illustrated in FIG. 2A, bushing 202 and bushing 204 may have respective elastic or elastomeric members or elastic bodies 214a and 214b with a circular or generally circular cross-section. In examples, as illustrated in FIG. 2C, a combined bushing 206 may include an elastic or elastomeric member or elastic body 214 having a cylindrical or generally cylindrical shape with a circular or generally circular cross-section.

In examples, elastic or elastomeric member or elastic body 214 may be fixed in place within housing 212. In examples, elastic or elastomeric member or elastic body 214 may be friction fitted inside housing 212. In examples, elastic or elastomeric member or elastic body 214 may be bonded to housing 212. Bonding can be performed by any suitable means. In examples, bonding can be done through a curing process, an adhesive, one or more fasteners or any combination thereof.

In examples, the bushing system 200 may include one or more additional rigid portions such as one or more inner sleeves 216. In examples, as illustrated in FIG. 2A, an inner sleeve 216 may be provided in a bush. For example, an inner sleeve 216a may be provided in bushing 202. In examples, an inner sleeve 216b may be provided in bushing 204. As illustrated in FIG. 2C an inner sleeve 216 may be provided in the combined bushing 206. The inner sleeve 216 may be located at an inner portion of elastic or elastomeric member or elastic body 214. In examples, an inner sleeve 216 is surrounded by an elastic or elastomeric member or elastic body 214. In examples, an inner sleeve 216 may be provided into the axial passage of a bush. As illustrated in FIG. 2A, a first inner sleeve 216a is provided in the axial passage of bushing 202, and a second inner sleeve 216b is provided in the axial passage of bushing 204. As illustrated in FIG. 2C an inner sleeve 216 is provided in the axial passage of combined bushing 206. As used herein, the "axial passage" refers to a through hole extending across the length of the bushing system about which a bushing or bushing system is configured to operate.

In examples, inner sleeve 216 may include a rigid structure. Any suitable material may be used for inner sleeve 216. In examples, inner sleeve 216 may include a material such as a metal, metal alloy, polymer, wood, ceramic, or any combination thereof. In examples, inner sleeve 216 include the same material as housing 212. In examples, inner sleeve 216 and housing 212 include a different material. In examples, inner sleeve 216 may be friction fitted inside elastic or elastomeric member or elastic body 214. In examples, inner sleeve 216 may be bonded to elastic or elastomeric member or elastic body 214. Bonding can be performed by any suitable means. In examples, bonding can be done through a curing process, an adhesive, one or more fasteners or any combination thereof.

In examples, inner sleeve 216 may be used as a means to pivotally connect or attach a bushing or bushing system to another assembly or structure. In examples, where an elastohydraulic bushing system 200 is used in a suspension system of a vehicle, inner sleeve 216 may be used to pivotally connect a bushing or bushing system to a suspension arm. As illustrated in FIG. 2A, for example, first and second inner sleeves 216a and 216b may pivotally connect bushing 202 and bushing 204 to a vehicle suspension arm 228. As illustrated in FIG. 2C, inner sleeve 216 of combined bushing 206 may be pivotally connecting combined bushing 206 to a vehicle suspension arm 228.

As the vehicle suspension arm 228 or other structure pivotally connected to inner sleeve 216 exerts a rotational force on inner sleeve 216, it forces inner sleeve 216 to rotate and thus twist the elastic or elastomeric member or elastic body 214. Similarly, as a vehicle suspension arm 228 or other structure connect to inner sleeve 216 exerts a translational force on inner sleeve 216 either in the horizontal or vertical direction, it causes the elastic or elastomeric member or elastic body 214 to compress or stretch. For purposes of this disclosure, "horizontal direction" refers to the horizontal direction (x-direction as illustrated) that crosses the center point of the inner sleeve of a bushing or bushing system when viewed from the cross-sectional view of the bushing or bushing system that illustrates a full circumference of inner sleeve and the surrounding components to the inner sleeve. For purposes of this disclosure, "vertical direction" refers to the vertical direction (y-direction as illustrated) that crosses the center point of the inner sleeve of a bushing or bushing system when viewed from the cross-sectional view of the bushing or bushing system that illustrates a full circumference of inner sleeve and the surrounding components to the inner sleeve.

In examples, a vehicle suspension arm may be coupled to an inner sleeve 216. In examples, the coupling between a vehicle suspension arm and an inner sleeve 216 may be a pivotable connection. In examples, a vehicle suspension arm 228 or other structure and inner sleeve 216 may be coupled by a bolt, rivet, pin, or other know fastening means.

In examples, one or more chambers 218, 220, 222, and 224 may be included in bushing system 200. In examples, one or more chambers may be included in a bushing or bushing system. The one or more chambers may be configured as fluid chambers to hold fluid. In examples, the one or more chambers may be configured to expand. In examples, the one or more chambers may be configured to contract or compress. In examples, the one or more chambers may be configured to expand, contract, or compress. In examples, the one or more chambers expansion, contraction, or both may be caused by fluid transfer, or cause fluid transfer, or both. In examples, the one or more chambers expansion, contraction, compression or any combination thereof may be caused by a force applied to inner sleeve 216. In examples, expansion, contraction, compression or any combination thereof of one or more chambers may be caused by a rotational force, a translational force, or a combination thereof applied to an inner sleeve 216. In examples, expansion, contraction, compression or any combination thereof of one or more chambers may be caused by, a force applied to an inner sleeve, fluid transfer, or both. In examples, expansion, contraction, compression or any combination thereof of one or more chambers may cause a force applied to an inner sleeve, fluid transfer, or both.

In examples, the one or more chambers may be embedded in elastic or elastomeric member or elastic body 214. In examples, a chamber may extend at least a portion of the length of the elastic or elastomeric member or elastic body 214. In examples, a chamber may extend between one percent and ninety-nine percent of the length of the elastic or elastomeric member or elastic body 214 of a bushing or bushing system. In examples, a chamber may extend at least one quarter, half, two thirds, or ninety percent of the length of the elastic or elastomeric member or elastic body 214 of bushing or bushing system. In examples, as illustrated in FIGS. 2A-2D, the one or more chambers may be arranged about one or more inner sleeves 216. In examples, a chamber is on one side of inner sleeve. In examples, as shown in FIG. 2A a first chamber 218 or 220 is on one side of respective first and second inner sleeve 216a and 216b, and a second chamber 224 or 222 is on the opposite side of respective first and second inner sleeve 216a and 216b from the first chamber. In examples, a chamber is above inner sleeve. In examples, a chamber is below inner sleeve. In examples, as illustrated in FIG. 2A, a first chamber 218 is above second inner sleeve 216b and second chamber 224 is below second inner sleeve 216b. In examples, two or more chambers are arranged symmetrically around an inner sleeve. In examples, as illustrated in FIG. 2C four chambers are arranged symmetrically around inner sleeve 216. For example, as illustrated, chambers 220 and 222 are on the lateral sides of inner sleeve 216, chamber 224 is located above inner sleeve 216, and chamber 218 is located below inner sleeve 216. It should be understood that the reference to placement above or below an inner sleeve in the description of chambers refer to position when viewing the cross-section of a bushing or bushing system at a plane that is parallel to a cylindrical base of the bushing or bushing system when the bushing is at rest or in the relaxed state as would be installed to a structure, and as illustrated in FIGS. 2A-2D.

In examples, a chamber is of sufficient size to cause a motion of inner sleeve 216. In examples, a chamber is of sufficient size to cause a translational motion, a rotational motion, or a combination of both of an inner sleeve 216.

In examples, fluid transfer in the context of one or more chambers 218, 220, 222, and 224, refers to the transfer of fluid into or out of one of the chambers. In examples, one or more chambers may be fluidly connected to at least one other chamber. In examples, one or more chambers may be fluidly connected to a reservoir located outside the bushing or bushing system. The fluid connection can be any fluid conduit that allows for unhindered passage of fluid. In examples, the fluid connection can be a flow path, conduit, tube, or hose. In examples, the fluid connection, such as a flow path, conduit, tube, or hose, may extend outside of elastic or elastomeric member or elastic body 214.

The fluid 298 can be any suitable fluid. In examples, the material of elastic or elastomeric member or elastic or elastomeric member or elastic body 214 and of fluid 298 may be selected such that fluid 298 does not permeate through elastic or elastomeric member or elastic body 214. In examples, the fluid 298 can be synthetic oil, motor or engine oil, antifreeze, water, or any other suitable fluid. In examples, the fluid 298 can be a gas. In examples the fluid 298 may be a magnetorheological fluid the viscosity of which may be affected via a magnetic field as described later. In examples, the operation of bushing system 200 including one or more chambers 218, 220, 222, and 224 as described may be further enhanced by the application of a magnetorheological fluid by affecting the response time and/or degree of response of the bushing system by controlling the viscosity of the fluid using a magnetic field as described in more detail herein.

For example, as illustrated in FIG. 2A, chamber 218 in bushing 204 may be fluidly connected to chamber 220 in bushing 202 via a flow path or tube 208. In examples, also as illustrated in FIG. 2A, chamber 222 in bushing 202 may be fluidly connected to chamber 224 in bushing 204 via flow path or tube 210. Similarly, as illustrated in FIG. 2C, chamber 218 in combined bushing 206 can be fluidly connected to chamber 220 also of combined bushing 206 via a flow path, conduit, or tube 208. Also, as illustrated in FIG. 2C, a chamber 222 of combined bushing 206 can be fluidly connected to chamber 224 of combined bushing 206 via a flow path, conduit, or tube 210. In examples, flow path, conduit, or tube 208 thus may enable flow between chamber 218 and chamber 220. In examples, flow path, conduit, or tube 210 thus may enable flow between chamber 222 and chamber 224.

In examples, in a double-pin bushing system 200 the fluid connections between the chambers may be fluidly connected through a crossflow line 230. For example, as illustrated in FIG. 2B, a crossflow line 230 can fluidly connect flow path 208 with flow path 210. In examples, crossflow line 230 may be controlled via one or more crossflow line valves 232. As discussed in more detail later, operation of crossflow line valve 232 can divert fluid flow through crossflow line 230 away from flow paths or tubes 208 and 210, and thus affect the overall functioning of the bushing system 200. In examples, the bushing system 200 may be caused to operate as a standard bushing. In examples, the bushing system 200 may controlled to enable shifting of the kinematic pivot point to a position that is better for the environment in which the bushing system 200 is employed. In examples, the bushing system 200 can be controlled to enable tuning its kinematic behavior both statically and dynamically.

In examples, crossflow line valve 232 may also allow for switching flow so as to invert the operation of bushing system 200. In examples, crossflow line 230 may include one or more conduits and one or more crossflow line valves 232 can be operated to open and divert flow of flow path 208 and 210 to the one or more conduits of crossflow line 230. For example, crossflow line 230 and crossflow line valves 232 can be employed to induce flow between chamber 218 and chamber 222. In examples, crossflow line 230 and crossflow line valves 232 can be employed to induce flow between chamber 220 and chamber 224. In examples, crossflow line 230 and crossflow line valves 232 may be operated to induce all fluid flow between chamber 218 and chamber 222 and between chamber 220 and chamber 224. In examples, crossflow line 230 and crossflow line valves 232 may be operated to induce only partial flow between chamber 218 and chamber 222 and between chamber 220 and chamber 224. In examples where only partial flow is induced between chamber 218 and chamber 222 and between chamber 220 and chamber 224, partial flow may be also retained between chamber 218 and chamber 220 and between chamber 222 and chamber 224. In examples, the amount of flow in each flow path and crossflow line can be regulated, controlled, tuned, or adjusted using one or more crossflow line valves 232. In examples, crossflow line 230 and crossflow line valves 232 can be fully opened to fluid flow and flow paths or tubes 208 and 210 can remain fully open to fluid flow, thus allowing equal flow through flow paths 208, 210, and crossflow line 230.

Figure 2E:
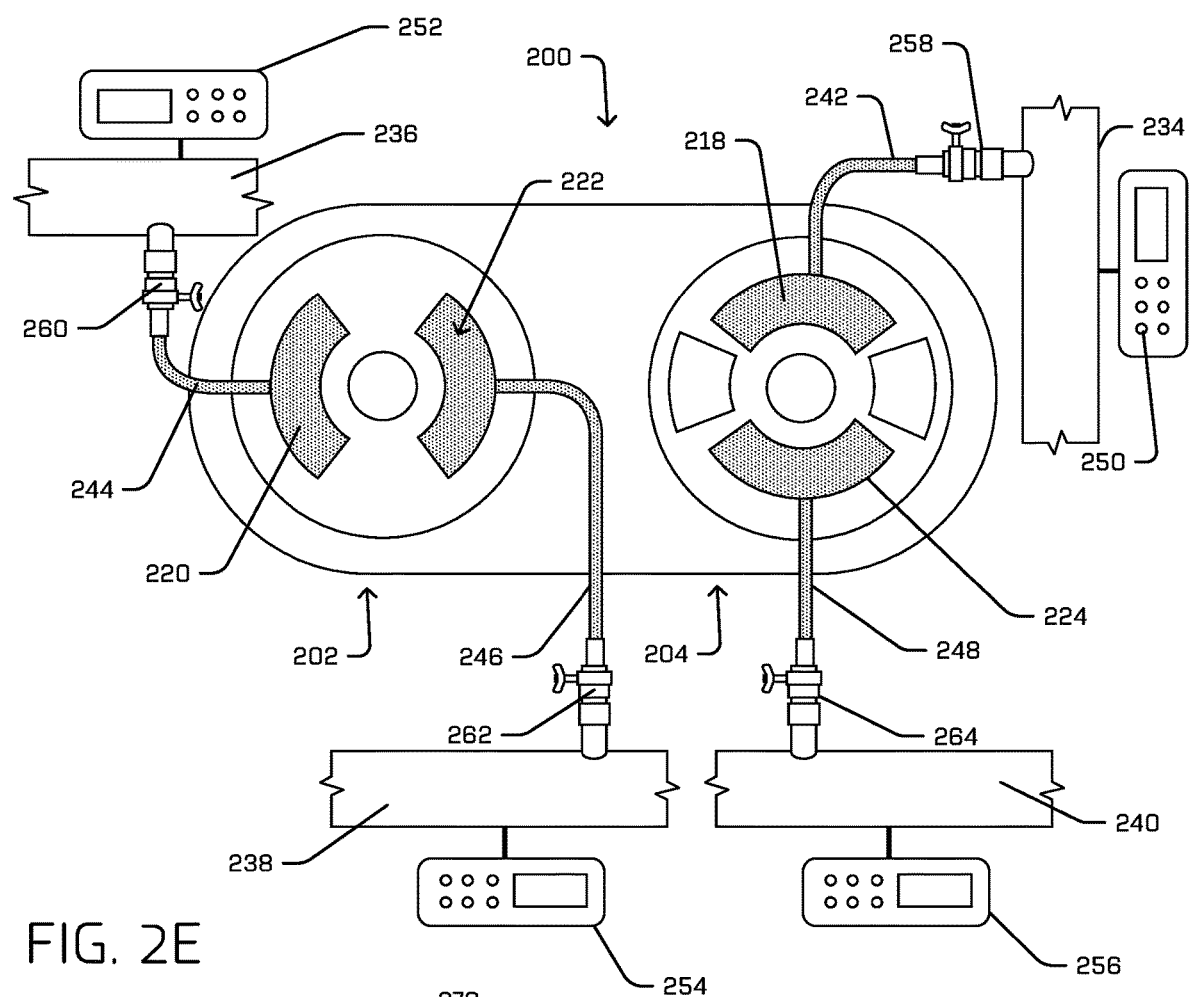
FIGS. 2E-2H are example diagrams of an elasto-hydraulic bushing system as described herein in which one or more chambers are in fluid connection with an external reservoir or manifold.
Figure 2F:
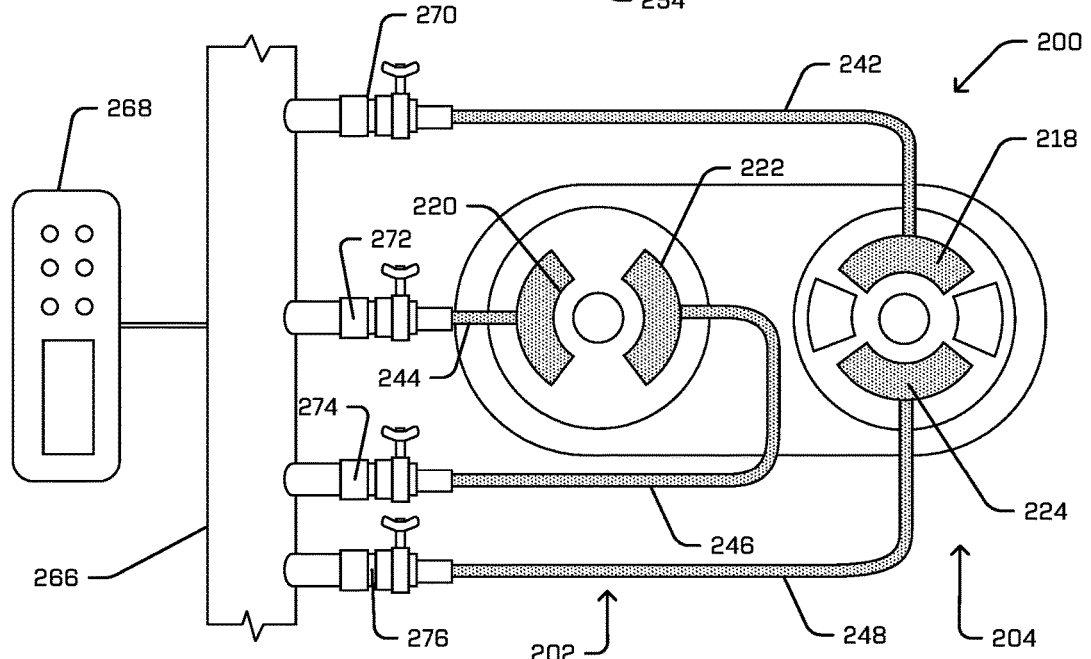

In examples, as illustrated in FIGS. 2E and 2F the one or more chambers may be connected to one or more external reservoirs instead of or in addition to each other. For example, as illustrated in FIGS. 2E and 2F, one or more chambers may be fluidly connect to either independent reservoirs or a common manifold external to the double-pin bushing system 200. In examples, as illustrated, each chamber 218, 220, 222, and 224 may be connected to a respective flow line 242, 244, 246, and 248. The flow lines can be connected to either to separate reservoirs 234, 236, 238, and 240 respectively, or to a common manifold 266. The one or more reservoirs may include a pump and valve system and be operated by a controller. A pump and valve system can include any suitable pump coupled with a fluid valve. The pump can be configured to work in reverse. The valve of the pump and valve system can be used to open or close the flow line associated thereto. In examples, the pump and valve system may be configured to inject fluid into a chamber, suction fluid from a chamber, or both. The valve of the pump and valve system may be configured to hold the fluid inside a chamber or out of a chamber. A controller associated with one or more reservoirs may be used to control the operation of the pump and valve system along with any other components of the reservoir. In examples, each of reservoirs 234, 236, 238, and 240 may include a pump and valve system 258, 260, 262, and 264 respectively and can be operated by controller 250, 252, 254, and 256 respectively. In examples as illustrated in FIG. 2F, a common manifold 266 may be used, common manifold 266 may include one or more pump and valve systems 270, 272, 274, and 276, respective to each of flow lines 242, 244, 246, and 248, and may be controlled by a controller 268. The one or more controllers 250, 252, 254, 256, and 268 may be in communication with or be part of bushing control system 638 described later. In examples, the controllers can cause fluid to flow into or out of each of chambers 218, 220, 222, and 224 based on the event detected or predicted to control, tune, or adjust the operation of double-pin bushing system 200.

Bushing system 200 may also include one or more sections 226. In examples, sections 226 may be in either or both bushings 202 and 204, and/or in combined bushing 206. For illustration purposes only, sections 226 are illustrated in bushing 204 in FIGS. 2A, and 2B. In examples, sections 226 may extend through the full length of bushing 202, 204, or combined bushing 206. In examples, sections 226 may extend through only a portion of the length of bushing 202, 204, or combined bushing 206. In examples, sections 226 may be configured to impart desired spring characteristics of the bushing in which they are included. Sections 226 may be shaped and sized as desired. In examples, sections 226 are configured to not interfere with the operation of chambers 218, 220, 222, and 224 or the flow of fluid to and from chambers 218, 220, 222, and 224.

Referring to FIG. 2C, in examples, a single-pin elasto-hydraulic bushing system 200 may include a combined bushing 206, and may include any one or more of the above described features. As illustrated, in examples, combined bushing 206 may include a housing 212, an elastic or elastomeric member or elastic body 214, an inner sleeve 216, one or more chambers 218, 220, 222, and 224, and respective fluid connections to each of the one or more chambers. In examples, features illustrated in combined bushing 206 of single-pin bushing system 200 may be structurally similar, functionally similar, or both to the corresponding features described earlier with respect to bushing 202 and bushing 204 of double-pin bushing system 200.

In examples, combined bushing 206 may also include one or more vanes. In examples, the one or more vanes may project into elastic or elastomeric member or elastic body 214. In examples, the one or more vanes may project from an inner sleeve 216, from a housing 212, or both. In examples, a vane may have an oblong shape. In examples, a vane may have a rectangular cross-section. In examples, a vane may have a shape that curves or arcs as it projects from an inner sleeve or housing. In examples, a vane may have a shape that is straight or does not curve as it projects from an inner sleeve or housing. Other shapes may also be employed. A vane may have a width, a dimension extending from an inner sleep or housing to a distal end. In examples, the width of a vane does not extend beyond a thickness of an elastic or elastomeric member or elastic body 214. In examples, a vane may have a width that is the same or different from the width of another vane. In examples, all inner sleeve vanes may have the same width, different width, or a combination thereof. In examples, all housing vanes may have the same width, different width, or any combination thereof. In examples, the width of an inner sleeve vane is the same or different from the width of a housing vane.

In examples, a vane projecting from an inner sleeve may have a length equal to the length of the inner sleeve to which the vane is attached or from which it extends. In examples, a vane projecting from an inner sleeve may have a length that is different from the length of the inner sleeve to which the vane is attached or from which it extends. In examples, a vane projecting from housing may have a length equal to the length of the housing to which the vane is attached or from which it extends. In examples, a vane projecting from a housing may have a length that is different from the length of the housing to which the vane is attached or from which it extends. In examples, a vane projecting from an inner sleeve or a housing may have a length equal to the length of at least one chamber provided in the elastic body. In examples, a vane projecting from an inner sleeve or a housing may have a length that is different from the length of at least one chamber provided in the elastic body. In examples, a vane may have a structure that is contiguous along its length. In examples, a vane may have a structure that is not contiguous along its length. For example, a vane may have one or more gaps, spaces, indents, holes, or other like missing portions along its length. Any suitable material may be used to form a vane. In examples, a vane may be formed of the same material described earlier for an inner sleeve. In examples, a vane includes the same material as the inner sleeve from where the vane projects. In examples, a vane includes a material that is different from the material in the inner sleeve from where the vane projects. In examples, a vane may extend between two chambers. In examples, a vane may extend between two proximate or sequentially arranged chambers about an inner sleeve that are in fluidly connected to each other. In examples, a vane may extend between two proximate or sequentially arranged chambers about an inner sleeve that are not fluidly connected to each other.

In examples, one or more vanes may be connected to or be extensions of inner sleeve 216. A connection between a vane and an inner sleeve may be achieved by any suitable fastener or connection means. For example, a fastener or connection means can be one or more bolts, screes, brackets, clamps, clips, adhesives, weld joints, or any combination thereof. In examples, one or more vanes may be part of an integral structure of an inner sleeve and thus they may be formed of a contiguous material that also forms the inner sleeve. In examples, two or more vanes may be connected to or may be extensions of an inner sleeve. In examples, each vane may be independently connected to or be an extension of the inner sleeve. In examples, all vanes extending from the same inner sleeve are integral to the inner sleeve. In examples, all vanes extending from the same inner sleeve are connected to the inner sleeve by a fastener or connection means. In examples, at least on vane extending from the inner sleeve is integral to the inner sleeve and at least another vane extending from the same inner sleeve is connected to that inner sleeve by a fastener or other connection means.

In examples, vanes connected to inner sleeve 216 or that are extensions of inner sleeve 216 may be configured to move with the inner sleeve 216 when a force is applied to inner sleeve 216. For example, if a rotational force is applied to inner sleeve 216, a vane connected to inner sleeve 216 or that is an extension of inner sleeve 216 may also be translated in a rotational path along with the inner sleeve 216. For example, a vane connected to or that is an extension of inner sleeve 216 may be translated in a clockwise direction when a rotational force in the clockwise direction is applied to inner sleeve 216. Similarly, in examples, a vane connected to or that is an extension of inner sleeve 216 may be translated in a counter-clockwise direction when a rotational force in the counter-clockwise direction is applied to inner sleeve 216. In examples, if a translational force is applied to inner sleeve 216, a vane connected to or that is an extension of inner sleeve 216 be also be translated in the same manner as inner sleeve 216.

In examples, as illustrated in FIG. 2C, combined bushing 206 may include a first inner sleeve vane 278. In examples, first inner sleeve vane 278 may be connected to or be an extension of inner sleeve 216. In examples, first inner sleeve vane 278 may extend between two chambers. In examples, first inner sleeve vane 278 may extend between two chambers that are not fluidly connected. In examples, first inner sleeve vane 278 may extend between two chambers that are fluidly connected. In examples, as illustrated in FIG. 2C, a first inner sleeve vane 278 may extend between chambers 220 and 224. In examples, combined bushing 206 may include a second inner sleeve vane 280. In examples, second inner sleeve vane 280 may be connected to or be an extension of inner sleeve 216. In examples, second inner sleeve vane 280 may extend between two chambers. In examples, second inner sleeve vane 280 may extend between two chambers that are fluidly connected. In examples, second inner sleeve vane 280 may extend between two chambers that are not fluidly connected. In examples, as illustrated in FIG. 2C, a second inner sleeve vane 280 may extend between chambers 218 and 220. In the illustrated examples, when a rotational force is applied to inner sleeve 216, vanes 278 and 280 may be configured to rotate along with or in the same direction as inner sleeve 216. Likewise, in the illustrated examples, when a translational force is applied to inner sleeve 216, vanes 278 and 280 may be configured to translate in the same direction of or along with inner sleeve 216.

In examples, one or more vanes may be connected to or be extensions of housing 212. In examples, vanes connected to or that are an extension of housing 212 may be fixed in position with the housing and not be moved by the application of a force to inner sleeve 216. Vanes may be connected to housing 212 in the same manner, using fasteners or other connection means, as described with respect to vanes connected to an inner sleeve. Likewise, vanes may be part of an integral structure of housing 212 and thus they may be formed of a contiguous material that also forms the housing 212. In examples, two or more vanes may be connected to or may be extensions of a housing. In examples, each vane may be independently connected to or be an extension of the housing. In examples, all vanes extending from the same housing are integral to the housing. In examples, all vanes extending from the same housing are connected to the housing by a fastener or connection means. In examples, at least on vane extending from the housing is integral to the housing and at least another vane extending from the same housing is connected to that housing by a fastener or other connection means.

For example, as illustrated in FIG. 2C, combined bushing 206 may include a first housing vane 282. In examples, first housing vane 282 may be connected to or be an extension of housing 212. In examples, first housing vane 282 may extend between two chambers. In examples, first housing vane 282 may extend between two chambers that are fluidly connected. In examples, first housing vane 282 may extend between two chambers that are not fluidly connected. In examples, as illustrated in FIG. 2C, a first housing vane 282 may extend between chambers 222 and 224. In examples, combined bushing 206 may include a second housing vane 284. In examples, second housing vane 284 may be connected to or be an extension of housing 212. In examples, second housing vane 284 may extend between two chambers. In examples, second housing vane 284 may extend between two chambers that are not fluidly connected. In examples, second housing vane 284 may extend between two chambers that are fluidly connected. In examples, as illustrated in FIG. 2C, a second housing vane 284 may extend between chambers 218 and 222. In the illustrated examples, when a rotational force or translational force is applied to inner sleeve 216, vanes 282 and 284 may be configured to remain fixed in place along with housing 212.

In examples, the chambers 218, 220, 222, and 224 in combined bushing 206 of a single-pin bushing system 200 may be fluidly connected to one or more other chambers, a separate reservoir, or a combination thereof. For example, as illustrated in FIG. 2C, chambers 218 and 220 may be fluidly connected by a flow path or tube 208 as similarly described earlier in conjunction with FIG. 2A for the double-pin bushing system. In examples, as also illustrated in FIG. 2C, chambers 222 and 224 may be fluidly connected by a flow path or tube 210 as similarly described in conjunction with FIG. 2A for the double-pin bushing system.

A crossflow line 230 and one or more crossflow line valves 232 as previously described in conjunction with FIG. 2B may also be implemented in combined bushing system 206 in the same manner.

In examples, as illustrated in FIG. 2D, cross flow between chambers that are not fluidly connected by flow paths 208 and 210 may be achieved by including supplementary crossflow lines 286 and 288, and one or more supplementary crossflow line valves 290, 292, 294, and 296. For example, a first supplementary crossflow line 286 may be employed to fluidly connect chambers 218 and 222. For example, a second supplementary crossflow line 288 may be employed to fluidly connect chambers 220 and 224. In examples, regulation of fluid flow between chambers may be controlled using supplementary crossflow line valves 290, 292, 294, and 296. In examples, a supplementary crossflow line valve can regulate fluid flow from a given chamber between a flow path or tube and a supplementary crossflow line. In examples, a supplementary crossflow line valve may be provided for each chamber.

As illustrated in FIG. 2D, in examples, a first supplementary crossflow line valve 290 may be provided to regulate fluid flow between chamber 218 and chambers 220 and 222 via flow path or tube 206 and supplementary crossflow line 286. In examples, a second supplementary crossflow line valve 292 may be provided to regulate fluid flow between chamber 220 and chambers 218 and 224 via flow path or tube 206 and supplementary crossflow line 288. In examples, third a supplementary crossflow line valve 294 may be provided to regulate, control, or tune fluid flow between chamber 222 and chambers 218 and 224 via supplementary crossflow line 286 and flow path or tube 210. In examples, a fourth supplementary crossflow line valve 296 may be provided to regulate fluid flow between chamber 224 and chambers 218 and 222 via supplementary crossflow line 288 and flow path or tube 210. In examples, in combined bushing 206 the fluid connections made by flow paths or tubes 208 and 210 are between two adjacent, serial, or sequentially arranged chambers about inner sleeve 216. In examples, the fluid connections made by supplementary crossflow lines 286 and 288 are between two adjacent, serial, or sequentially arranged chambers about inner sleeve 216. In examples, the fluid connections made by either flow paths or tubes 206 and 210 and/or supplementary crossflow lines 286 and 288 are between two distal, disordered, or non-sequentially arranged chambers about inner sleeve 216.

Figure 2G:
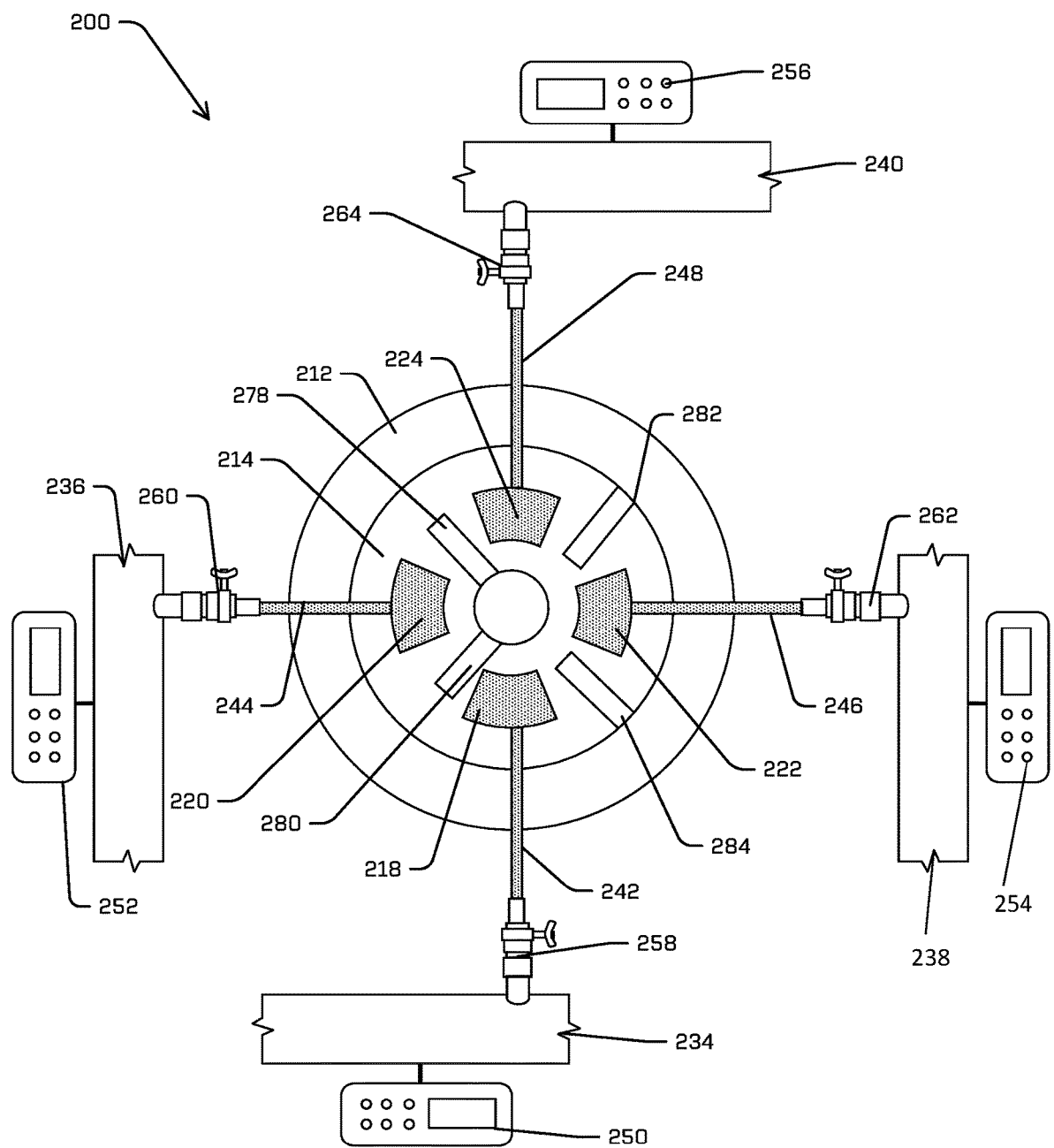
Figure 2H:
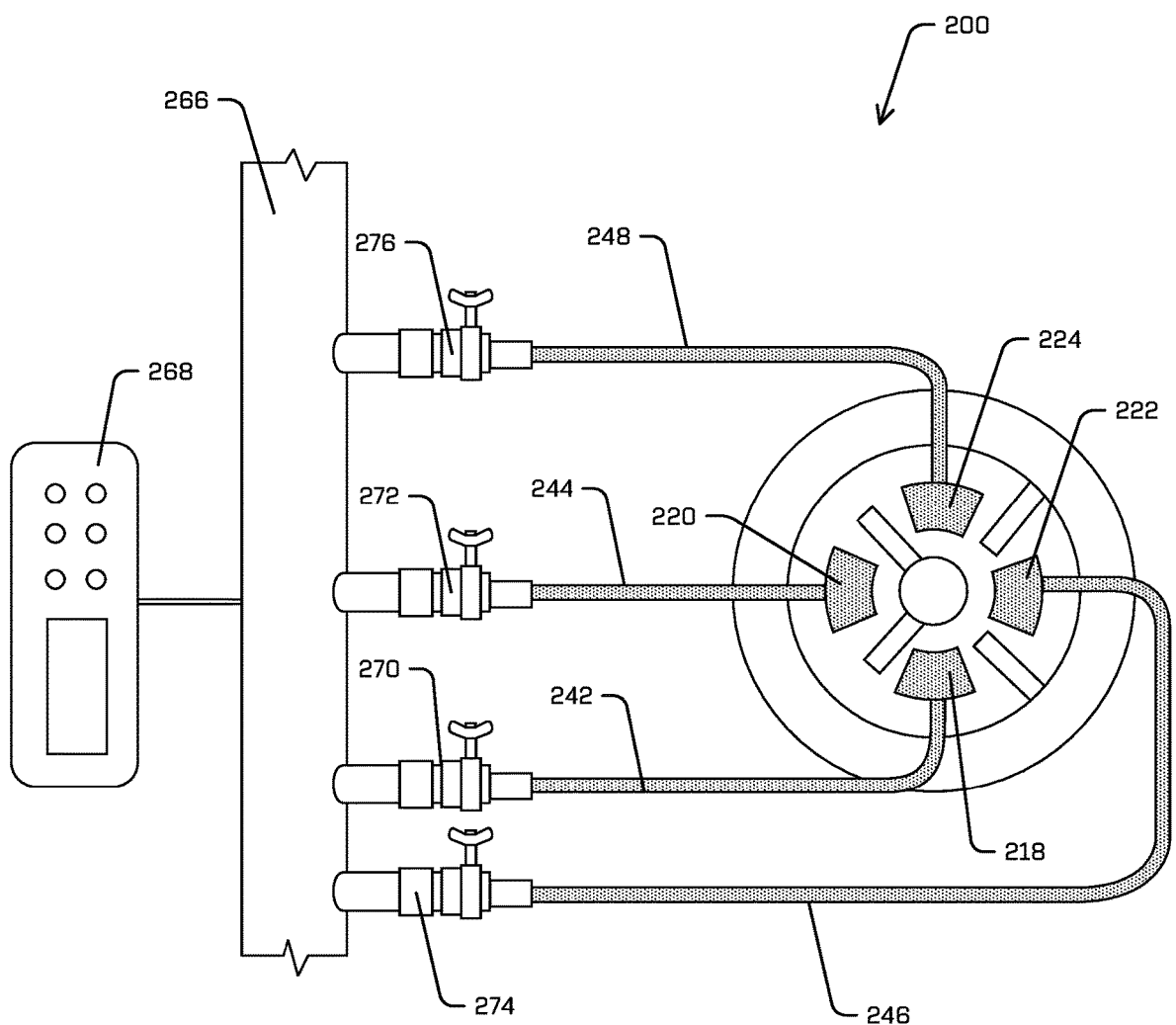

In examples, one or more chambers in combined bushing 206 may be in flow communication with an external reservoir in place of or in addition to being in flow communication with other chambers. For example, as described earlier with respect to FIGS. 2E and 2F, as illustrated in FIGS. 2G and 2H, one or more chambers may be fluidly connected to either independent reservoirs or a common manifold external to the bushing system 200. In examples, as illustrated FIGS. 2G and 2H and as similarly described earlier, each chamber 218, 220, 222, and 224 may be connected to a respective flow line 242, 244, 246, and 248. The flow lines can be connected to either to separate reservoirs 234, 236, 238, and 240 respectively, or to a common manifold 266. The one or more reservoirs may include a pump and valve system and be operated by a controller. A pump and valve system can include any suitable pump coupled with a fluid valve. The pump can be configured to work in reverse. The valve of the pump and valve system can be used to open or close the flow line associated thereto. In examples, the pump and valve system may be configured to inject fluid into a chamber, suction fluid from a chamber, or both. The valve of the pump and valve system may be configured to hold the fluid inside a chamber or out of a chamber. A controller associated with one or more reservoirs may be used to control the operation of the pump and valve system along with any other components of the reservoir. In examples, each of reservoirs 234, 236, 238, and 240 may include a pump and valve system 258, 260, 262, and 264 respectively and can be operated by controller 250, 252, 254, and 256 respectively. In examples as illustrated in FIG. 2F, a common manifold 266 may be used, common manifold 266 may include one or more pump and valve systems 270, 272, 274, and 276, respective to each of flow lines 242, 244, 246, and 248, and may be controlled by a controller 268. The one or more controllers 250, 252, 254, 256, and 268 may be in communication with or be part of bushing control system 638 described later. In examples, the controllers can cause fluid to flow into or out of each of chambers 218, 220, 222, and 224 based on the event detected or predicted to control, tune, or adjust the operation of single-pin bushing system 200.

Example operation of a bushing system 200 as described herein is described in conjunction with FIGS. 3A-3D and 4A-4D. FIGS. 3A-3D illustrate example operations of a double-pin system as described, while FIGS. 4A-4D illustrate example operations of a single-pin system as described. These illustrations are only examples to demonstrate functionality of the described structure. Additional operations and permutations may be implemented based on these descriptions. As described earlier, the bushing system 200 as described herein may be employed in any environment in which any standard bushing is used. For purposes of illustration only, the operation of bushing system 200 as described is discussed in conjunction with a vehicle suspension system. This example is only illustrative and should not be viewed as limiting on the use of the bushing system 200 as described.

In examples, a vehicle 300 may include a vehicle structure or body 310. In examples, vehicle 300 may include a suspension system 302. In examples, suspension system 302 may be part of the vehicle structure 310. In examples, suspension system 302 may be configured to connect a wheel 304 to vehicle structure 310 employing one or more bushing systems 200. In examples, one or more bushing systems 200 are part of the vehicle structure 310.

In examples, vehicle 300 may be configured to travel via a road network from one geographic location to a destination carrying one or more of the occupants. For example, the interior of vehicle 300 may include a plurality of seats, which may be provided in any relative arrangement. In examples, vehicle 300 may include an example carriage-style seating arrangement in a substantially central portion of the vehicle interior. For example, the vehicle 300 may include two or more rows of seats, and in some examples, two of the rows of seats may face each other. One or more of the rows of seats may include two seats. In some examples, one or more of the two seats may be a bench-style seat configured to provide seating for one or more occupants. Other relative arrangements and numbers of seats are contemplated.

In examples, vehicle 300 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 300 may be configured to control all functions from start to completion of the trip, including all parking functions, it may not include a driver and/or controls for driving the vehicle 300, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially- or fully-autonomously controlled.

In examples, vehicle 300 may be any configuration of vehicle, such as, for example, a van, a sport utility vehicle, a cross-over vehicle, a truck, a bus, an agricultural vehicle, and a construction vehicle. Vehicle 300 may be powered by one or more internal combustion engines, one or more electric motors, hydrogen power, any combination thereof, and/or any other suitable power sources. In examples, vehicle 300 may have four wheels. In examples, the systems and methods described herein may be incorporated into vehicles having fewer or a greater number of wheels, tires, and/or tracks. In examples, vehicle 300 may have four-wheel steering and may be multi-directional, configured to operate generally with equal performance characteristics in all directions. For example, vehicle 300 may be bidirectional such that a first end of the vehicle 300 is the leading end of the vehicle 300 when travelling in a first direction, and such that the first end becomes the trailing end of the vehicle 300 when traveling in the opposite, second direction. Similarly, a second end of the vehicle 300 may be the leading end of the vehicle 300 when travelling in the second direction, and such that the second end becomes the trailing end of the vehicle 300 when traveling in the opposite, first direction. These example characteristics may facilitate greater maneuverability, for example, in small spaces or crowded environments, such as parking lots and urban areas. For purposes of this description, a vehicle midsection refers to a portion of vehicle 300 that is halfway between a leading end and trailing end of vehicle 300.

In examples wheel 304 may be a rear wheel or a front wheel. In examples where vehicle 300 is bidirectional, a wheel 304 may act as a rear wheel when the vehicle travels with a leading end being the end of vehicle 300 that is farther from wheel 304 than the trailing end. In examples, when the vehicle travels, wheel 304 may act as a rear wheel when wheel 304 is located closest to a trailing end of the vehicle 300 than a leading end of the vehicle 300. In examples, wheel 304 may act as the front wheel when based on the direction of travel of vehicle 300, wheel 304 is closer to a leading end of vehicle 300 than a trailing end of vehicle 300, or when wheel 304 is farther from a trailing end of vehicle 300 than the leading end of vehicle 300. In examples, suspension system 302 may connect wheel 304 to vehicle 300 via one or more suspension arms 306. In examples, a single suspension arm 306 may connect wheel 304 to vehicle 300. In examples, two or more suspension arms 306 may connect wheel 304 to vehicle 300. In examples, as described in more detail later, a suspension arm 306 may have different shapes, including a double arm, an A-frame, a single arm, or any other suspension arm design known to one of skill in the art in the field of vehicular suspension systems. For purposes of illustration, operation of bushing system 200 is described in conjunction with a single suspension arm. However, this is only an example, and similar functionality may be achieved by employing bushing system 200 in other suspension arm designs.

Figure 3A:
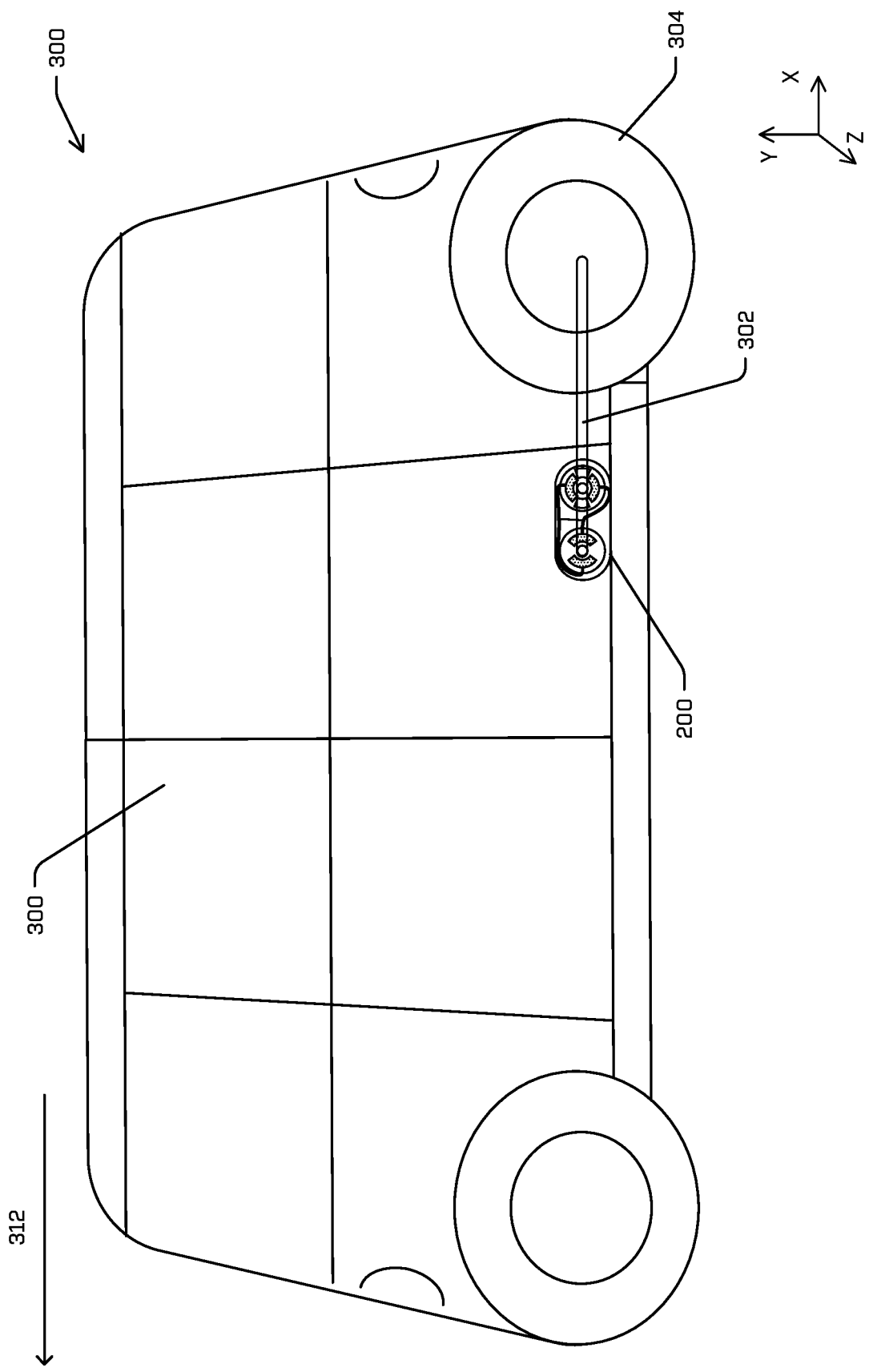
FIGS. 3A-3D are example diagrams illustrating operations of a double-pin elasto-hydraulic bushing system as described herein.

As illustrated in the diagram of FIG. 3A, suspension arm 306 may be secured to vehicle 300 via one or more bushings. In examples, at least one bushing connecting suspension arm 306 to vehicle 300 is a double-pin bushing system 200 as described herein. In examples, double-pin bushing system 200 may be the only bushing connecting suspension arm 306 to vehicle 300. In examples, one or more double-pin bushing systems 200 as described herein may be the only bushings to connect suspension arm 306 to vehicle 300. In examples, one or more double-pin bushing systems 200 as described herein may be used in combination with one or more single-pin bushing system 200 as described herein, and/or with any one or more other bushing known in the art to connect suspension arm 306 to vehicle 300.

Figure 3B:
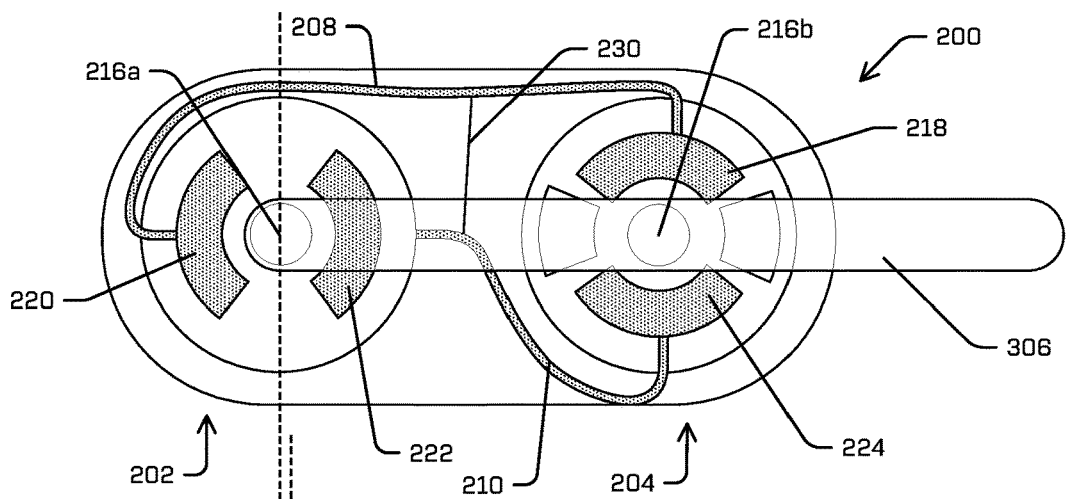

Example operations of a double-pin system is illustrated in FIGS. 3A-3D. FIG. 3B illustrates a double-pin bushing system 200 including a first bushing 202 and a second bushing 204 as described previously. In examples, as illustrated, first bushing 202 may include a first inner sleeve 216*a* with second chamber 220 and third chamber 222 arranged on opposite left and right sides of first inner sleeve 216*a*, i.e. arranged so that second chamber 220, first inner sleeve 216*a*, and third chamber 222 are sequentially along an axis that is horizontal to a bottom surface of vehicle 300 and passes through a center point of the first inner sleeve 216*a*. In examples, as illustrated, second bushing 204 may include a second inner sleeve 216*b* with first chamber 218 and fourth chamber 224 arranged over and under second inner sleeve 216*b* opposite to each other, i.e. arranged so that first chamber 218, second inner sleeve 216*b*, and fourth chamber 224 are sequentially arranged along a vertical axis that is perpendicular to the horizontal axis along which chambers 220 and 222 are arranged and passes through a center point of second inner sleeve 216*b*. In examples, second chamber 220 is closer to a midsection of vehicle 300 than third chamber 222. In examples, first chamber 218 is closer to the top of vehicle 300 than fourth chamber 224. In examples, first chamber 218 is above fourth chamber 224. In examples, first chamber 218 is above second inner sleeve 216*b* and fourth chamber 224.

As shown, a suspension arm 306 may be configured to engage first bushing 202 and second bushing 204 at first inner sleeve 216*a* and second inner sleeve 216*b* respectively. In the example shown, first chamber 218 is fluidly connected to second chamber 220, and third chamber 222 is fluidly connected to fourth chamber 224. One or more bolts, rivets, pins, or other known fastening means may be used to engage a bushing may be used to engage suspension arm 306 with inner sleeves 216*a* and 216*b*. For purposes of explanation, it is assumed that suspension arm 306 is a rear suspension that connects a trailing rear wheel 304 to a vehicle 300. In this context, it assumed that vehicle 300 is traveling in travel direction 312. In this context, first bushing 202 may be located closer to the midsection of vehicle 300 than second bushing 204.

The diagram of FIG. 3B illustrates when no force is being exerted on either first inner sleeve 216*a* or second inner sleeve 216*b*. As vehicle 300 travels, however, different events can occur. In examples, during travel wheel 304 may be required to travel over an obstacle or bump in the road. In examples, during travel wheel 304 may be required to travel through pothole or depression in the road. In examples, vehicle 300 may have to stop and thus wheel 304 may experience resistance in the direction of travel. In examples, vehicle 300 may have to accelerate and thus wheel 304 may exert a force in the direction of travel. Any one or more of these events as well as other similar events may engage the suspension system 302 to provide shock absorption, dampen vibration, reduce noise, or any combination thereof. In examples, double-pin bushing system 200 may improve the functioning of the suspension system 302. In examples, double-pin bushing system 200 may improve shock absorption, dampen vibration, reduce noise, or any combination thereof by transforming rotational motion of a suspension arm into translational motion, translational motion of a suspension arm into rotational motion, or any combination thereof. In examples, double-pin bushing system 200 may be located in a place that does not impinge on the size of a passenger cabin of vehicle 300. In examples, double-pin bushing system 200 may be located on a plane that is parallel to the ground when vehicle 300 is in normal operation and that intersects a center point of first and second inner sleeves and a center of wheel 304.

Figure 3C:
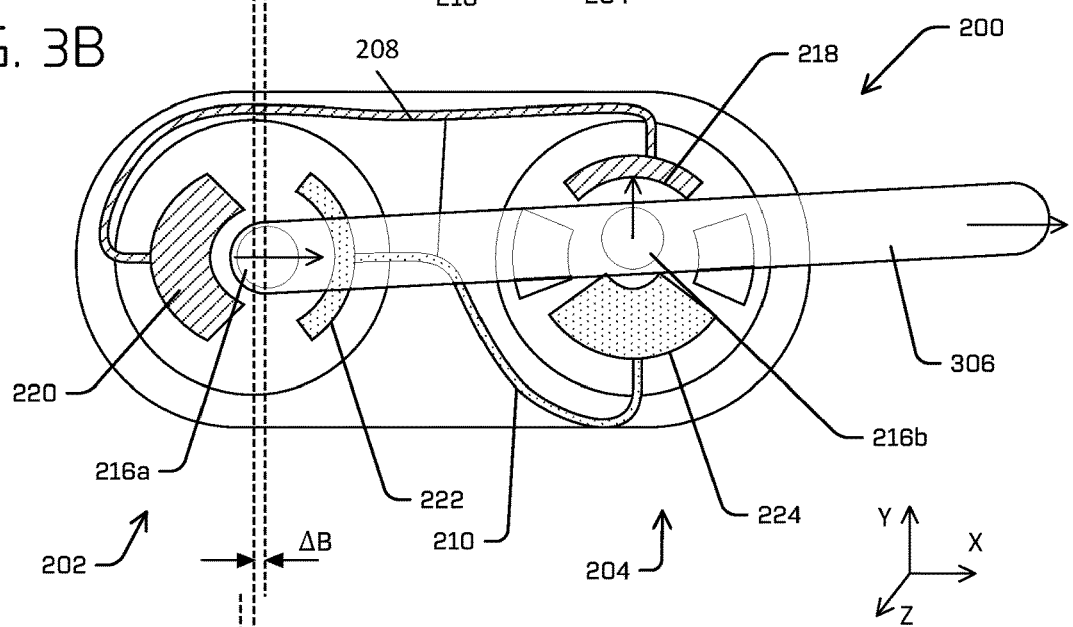

FIG. 3C, for examples, illustrates how double-pin bushing system 200 may assist in the event wheel 304 rides over an object or a bump on the road. As wheel 304 rides over an object or bump on the road, it is displaced in the vertical direction. As wheel 304 rises to ride over the obstacle, it pushes one end of suspension arm 306 upward. A typical bushing located at the described location of double-pin bushing system 200 would simply allow the suspension arm 306 to pivot and thus rotate counterclockwise. In contrast, in examples, as suspension arm 306 is forced upward, when engaged to the double-pin bushing system 200, as suspension arm 306 begins to pivot and thus rotate counterclockwise about a pivot point at first inner sleeve 216*a* of first bushing 202, it may also exert a force in the vertical direction on second inner sleeve 216*b* of second bushing 204. In examples, as second inner sleeve 216*b* is translated upward, it may press on first chamber 218. In so doing, first chamber 218 may be compressed between second inner sleeve 216*b* and housing 212. The pressure exerted onto first chamber 218 may force fluid inside first chamber 218 to be pressure ejected from first chamber 218 into flow path or tube 208. As the pressurized fluid flows through flow path or tube 208, it may reach second chamber 220. As the pressurized fluid is injected into second chamber 220, it may force second chamber 220 to expand. In examples, as second chamber 220 expands it may exert a force in the horizontal direction onto first inner sleeve 216*a*. The force exerted by expanding second chamber 220 onto first inner sleeve 216*a* may force first inner sleeve 216*a* to translate horizontally in a linear or substantially linear direction toward third chamber 222 by a distance of AB. As first inner sleeve 216*a* translates, it will exert a similar directional translation force onto suspension arm 306, and indirectly onto wheel 304. In so doing, wheel 304 will be pushed rearward as it travels over the obstacle. In examples, exerting a rear force onto wheel 304 as it travels over an obstacle may reduce the shock, vibration, noise, or any combination thereof experience by the vehicle 300. Thus, as described, a rotational motion a supporting arm 306 about a pivot point at first inner sleeve 216*a* is transformed at least in part into a translational motion in a horizontal direction. In examples, as described the translational motion in the horizontal direction is toward wheel 304.

As also illustrated in FIG. 3C, during the above described operation, fluid flow may also occur between chambers 222 and 224. This fluid flow, however, does not temper the above effects caused by the fluid flow between chambers 218 and 220. In examples, by translating first inner sleeve 216*a* toward the wheel 304, first inner sleeve 216*a* may press and thus compress third chamber 222. As third chamber 222 is compressed, the fluid inside third chamber 222 may be pressure ejected out of third chamber 222 through flow path or tube 210 and reach fourth chamber 224. Fourth chamber 224 may expand as it receives fluid flow from third chamber 222. In examples, fourth chamber 224 may have already expanded partially or fully in response to the vertical translation of second inner sleeve 216b caused by suspension arm 306 while wheel 304 rises to travel over the obstacle.

Figure 3D:
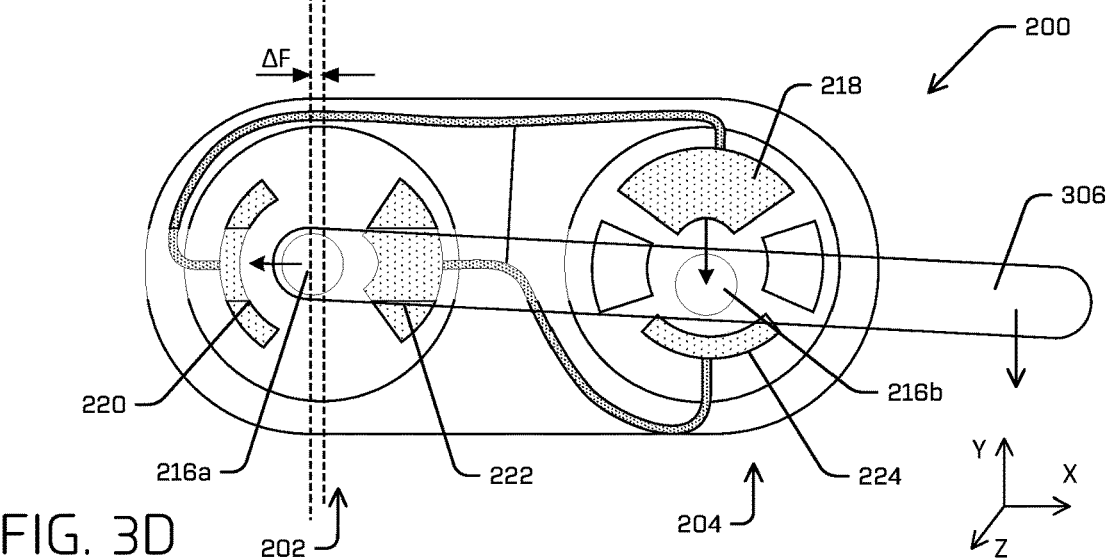

FIG. 3D illustrates a diagram of the operation of a double-pin bushing system 200 vehicle 300 experiences acceleration. In examples, during acceleration, the trailing end of vehicle 300 may dip down toward the ground and cause the leading end of vehicle 300 to lift or move upward. In examples, it may be desirable to minimize the amount the vehicle trailing end dips down by applying an upward force to the trailing end of the vehicle. In examples, a double-pin bushing system 200 as described may assist in achieving this goal.

In examples, as illustrated, as vehicle 300 accelerates, the rear wheel 304 may exert a linear or substantially linear translational force in the direction of travel on suspension arm 306, and indirectly on both first and second inner sleeves 216a and 216b of bushing system 200. As suspension arm 306 pushes first inner sleeve 216a forward displacing it a distance ΔF, in a linear or substantially linear direction of travel, first inner sleeve 216a may press against second chamber 220. In examples, as first inner sleeve 216a presses onto second chamber 220, second chamber 220 is compressed between first inner sleeve 216a and housing 212. The compressing of second chamber 220 may cause fluid inside second chamber 220 to pressure eject into flow path or tube 208. In examples, the pressurized fluid from second chamber 220 may travel through flow path or tube 208 to first chamber 218. In examples, as the pressurized fluid injects into first chamber 218, the fluid may expand first chamber 218. In examples, as first chamber 218 expands it will exert a translational force in the downward direction onto second inner sleeve 216b. In examples, the translational force exerted by first chamber 218 may cause translation of second inner sleeve 216b in a downward direction. In examples, as second inner sleeve 216b translates in a downward direction, it will exert a force in a downward direction onto suspension arm 306. In examples, as a downward force is applied to suspension arm 306, it also applied to a rear wheel 304. In examples, a downward force applied to suspension arm 306 at second inner sleeve 216b may cause suspension arm 306 to pivot clockwise about a pivot point at first inner sleeve 216a of bushing 202. In examples, rear wheel 304 is already touching the ground, thus, a downward force on rear wheel 304 may be compensated by an upward force on the trailing end of the vehicle exerted via housing 212. In examples, the double-pin bushing system 200 forces a trailing end of vehicle 300 upward. In examples, an upward force at the trailing end of vehicle 300 may counter the dip of the trailing end of vehicle 300 during an acceleration event.

As in the discussion of FIG. 3C, during an acceleration event it is possible that fluid transfer may occur also between third chamber 222 and 224. However, in examples, fluid transfer between chambers 222 and 224 would have a minimal or no effect on the above describe functioning and effect of double-pin bushing system 200. For example, as first chamber 218 expands and presses inner sleeve 216b downward, it is possible that fourth chamber 224 is compressed between inner sleeve 216b and housing 212. The compression of fourth chamber 224 may cause pressurized fluid to travel from fourth chamber 224 to third chamber 222 through flow path or tube 210. As pressurized fluid enters third chamber 222 it may expand third chamber 222. Expansion of third chamber 222, however, may have also been caused by the translation of inner sleeve 216a toward second chamber 220 due to the translational force exerted onto inner sleeve 216a by suspension arm 306. Thus, expansion of third chamber 222 may have little to no effect on the above described functioning of bushing system 200.

Although not illustrated, additional operations of a double-pin bushing system 200 may also be achieved. In examples, compression of third chamber 222 may cause fluid to flow to and expand fourth chamber 224. In examples, expansion of fourth chamber 224 may translate second inner sleeve 216b upward and thus cause a counter-clock rotation of suspension arm 306 and wheel 304 about a pivot point at first inner sleeve 216a. In examples, compression of fourth chamber 224 may cause fluid to flow and expand third chamber 222, which may cause horizontal translation of first inner sleeve 216a toward second chamber 220. In examples, horizontal translation of first inner sleeve 216a may cause suspension arm 306 and wheel 304 to translate in the same direction.

In examples, similar effects as described above may be achieved using bushing system 200 during events other than riding over an obstacle or acceleration. In examples, bushing system 200 may assist the suspension system when the wheel 304 rides through a dip or pothole in the road or other event. In examples, double-pin bushing system 200 may also be configured to operate as standard bushing. In examples, the functioning of double-pin bushing system 200 may be reversed from what has been described.

In examples, it may be desirable to operate bushing system 200 as a standard bushing. In examples, during a vehicle braking event, it may desirable to not cause bushing system 200 to transform a rotational motion of a suspension arm into a translational one or vice versa. In examples, during a braking event, crossflow line 230 and one or more crossflow line valves 232 may be fully opened. In examples, opening of crossflow line 230 and one or more crossflow line valves 232 does not block fluid flow in flow path 208 or flow path 210. In examples, by opening crossflow line 232 and one or more crossflow line valves 232, fluid is allowed to flow from any one chamber to another. In examples, by allowing unrestricted fluid flow through flow paths and crossflow line will minimize or eliminate any reaction by bushing system 200. As such, in examples where fluid flow is unrestricted between chambers through flow paths and crossflow line, bushing system 200 may operate as a standard bushing. Control of fluid flow by the operation of crossflow line 230 and one or more crossflow line valves 232 is described in more detail below.

In examples, the degree of the effect generated by double-pin bushing system 200 as described above, i.e. the degree at which a rotational force of a suspension arm is transformed into a translational force and vice versa, may be controlled, tuned, or adjusted. In examples, the effect generated by double-pin bushing system 200 may be controlled, tuned, or adjusted by a controller or an operator. In examples, the degree of the effect generated by double-pin bushing system 200 may be controlled, tuned, or adjusted by operating crossflow line 230 and one or more crossflow line valves 232. In examples, the flow through crossflow line 230 may be controlled, tuned, or adjusted by operating one or more crossflow line valves 232. In examples, flow through crossflow line 230 may be blocked so that no fluid passes through crossflow line 230. In examples, flow through crossflow line 230 may be unobstructed and thus crossflow line 230 may be fully opened. In examples, flow through crossflow line 230 may be partially restricted. In examples, one or more crossflow line valves 232 may be controlled to open, close, partially open, partially close, fully divert flow, partially divert flow, or any combination thereof. In examples, by operating one or more crossflow line valves 232, the flow through crossflow line 230 may be controlled, tuned, or adjusted. As fluid flow through crossflow line 230 is adjusted, in examples, the fluid flow through flow paths 208 and 210 may be affected. In examples, by affecting fluid flow through flow paths 208, 210, or both, the effect generated by bushing system 200 can be controlled, tuned, or adjusted. In examples, the amount of transformation between rotational and translational forces may be controlled, tuned, or adjusted to be greater for one or more events, lower for one or more events, or not existent for one or more events. The control, tuning, or adjustment of the flow through crossflow line 230 by operation of one or more crossflow line valves 232 may be performed by a controller, an operator, or any combination thereof as described in more detail later.

In examples, a double-pin bushing system 200 may be connected to a suspension arm of a front wheel of a monodirectional vehicle. In examples, a double-pin bushing system 200 as illustrated in FIG. 3B and described above, may be connected to a front wheel suspension arm of a vehicle such that the first bushing 202 is farther from the midsection of vehicle 300 than second bushing 204. In examples, double-pin bushing system 200 connected a front wheel suspension arm may be arranged in the same manner as shown in FIG. 3B with first bushing 202 closer to a midsection of vehicle 300 than second bushing 204.

In examples, double-pin bushing system 200 may be used in a conjunction with a front wheel of vehicle 300 rather than a rear wheel. In examples, a vehicle 300 may be a bidirectional vehicle and thus a double-pin bushing system 200 may be part of a suspension system that works as a front wheel suspension when the vehicle travels in one direction and as a rear wheel suspension system when the vehicle travels in a second direction, opposite the first direction.

In examples, where vehicle 300 is bidirectional vehicle it may not be easy or efficient to rearrange double-pin bushing system 200 every time vehicle 300 changes direction. In examples, operation of the double-pin bushing system 200 can reversed using crossflow line 230 and one or more crossflow line valves 232. In examples, the one or more crossflow line valves 232 may be configured to diverge fluid flow from flow paths 208 and 210 to crossflow line 230. In examples, at least a portion of the fluid flow is diverted. In examples, all fluid flow is diverted. In examples, fluid flow may be diverted from flow paths or tubes 208 and 210 in a manner such that fluid can flow between first chamber 218 and third chamber 222. In examples, fluid flow may be diverted such that fluid can flow between second chamber 220 and fourth chamber 224. In examples, fluid flow may be diverted so that fluid can flow between first chamber 218 and third chamber 222, and between second chamber 220 and fourth chamber 224, instead of between first chamber 218 and second chamber 220, and third chamber 222 and fourth chamber 224.

In examples in which a double-pin bushing system 200 is operated in reverse, when an upward translational force is applied to second inner sleeve 216b, first chamber 218 is compressed and fluid flows to third chamber 222, thereby expanding third chamber 222 and causing a horizontal translation of first inner sleeve 216a in a direction toward second chamber 220. In examples, the translation of first inner sleeve 216a may be transferred to the suspension arm connected to first inner sleeve 216a and thus the wheel connected to the suspension arm. In examples, as the suspension arm forces a translation of first inner sleeve 216a, second chamber 220 may be compressed forcing fluid to flow to and expand fourth chamber 224. Expansion of fourth chamber 224 may cause second inner sleeve 216b to translate upward in the vertical direction, which can cause the suspension arm to also pivot or rotate about a pivot point at first inner sleeve 216a in a counter clock direction and thus also apply an upward force to the wheel attached to the suspension arm. Other functions of bushing system 200 when operated in reverse may also be provided. For example, when operated in reverse, compression of third chamber 222 may cause fluid to flow to and expand first chamber 218, and compression of fourth chamber 224 may cause fluid to flow and expand second chamber 220. In examples, expansion of first chamber 218 may cause a downward translation of second inner sleeve 216b and thus a clockwise rotation of the suspension arm and wheel about a pivot point at first inner sleeve 216a. In examples, expansion of second chamber 220 may cause a horizontal translation of first inner sleeve 216a toward third chamber 222, and thus a linear translation in the same direction of the suspension arm and wheel.

Similar functionality as described for a double-pin bushing system 200 described above, can be also be achieve as illustrated in FIGS. 4A-4D with a single-pin bushing system 200. For purposes of illustration, FIGS. 4A-4D illustrate operation of a single-pin bushing system 200 as part of a rear wheel suspension system. In examples, FIG. 4A, similar to FIG. 3A, illustrates a vehicle 300 may include a suspension system 302. In examples, a suspension system 302 may be configured to connect a wheel 304 to vehicle 300. A suspension arm 306 may be secured to vehicle 300 via one or more bushings. In examples, at least one bushing connecting suspension arm 306 to vehicle 300 is a single-pin bushing system 200 as described herein. In examples, single-pin bushing system 200 may be the only bushing connecting suspension arm 306 to vehicle 300. In examples, one or more single-pin bushing systems 200 as described herein may be the only bushings to connect suspension arm 306 to vehicle 300. In examples, one or more single-pin bushing systems 200 as described herein may be used in combination with one or more double-pin bushing system 200 as described herein, and/or with any one or more other bushing known in the art to connect suspension arm 306 to vehicle 300.

In examples, as illustrated in FIGS. 4A-4D, a single-pin bushing system 200 may include an inner sleeve 216. In examples, one or more inner sleeve vanes may extend from inner sleeve 216 into an elastic or elastomeric member or elastic body 214. In the illustrated examples, the single-pin bushing system 200 includes a first inner sleeve vane 278 and a second inner sleeve vane 280. In examples, elastic or elastomeric member or elastic body 214 may include one or more chambers arranged about inner sleeve 216. In examples, the single-pin bushing system 200 may include four chambers 218, 220, 222, and 224 equidistantly and symmetrically arranged about inner sleeve 216. In examples, the first inner vane 278 extends between fourth chamber 224 and second chamber 220. In examples, the second inner vane 280 extends between second chamber 220 and first chamber 218. In examples, the single-pin bushing system 200 may include a housing 212 encasing the elastic or elastomeric member or elastic body 214. In examples, one or more housing vanes may extend from housing 212 into elastic or elastomeric member or elastic body 214. In the illustrated examples, the single-pin bushing system 200 may include a first housing vane 282 extending between fourth chamber 224 and third chamber 222. In examples, the single-pin bushing system 200 may include a second housing vane 284 extending between first chamber 218 and fourth chamber 224. In examples, first chamber 218 is fluidly connected to second chamber 220 via flow path or tube 208. In examples, third chamber 222 is fluidly connected to fourth chamber 224 via a flow path or tube 210.

As shown, a suspension arm 306 may be configured to engage inner sleeve 216 of single-pin bushing system 200. One or more bolts, rivets, pins, or other known fastening means may be used to engage a bushing may be used to engage suspension arm 306 with inner sleeve 216.

Figure 4A:
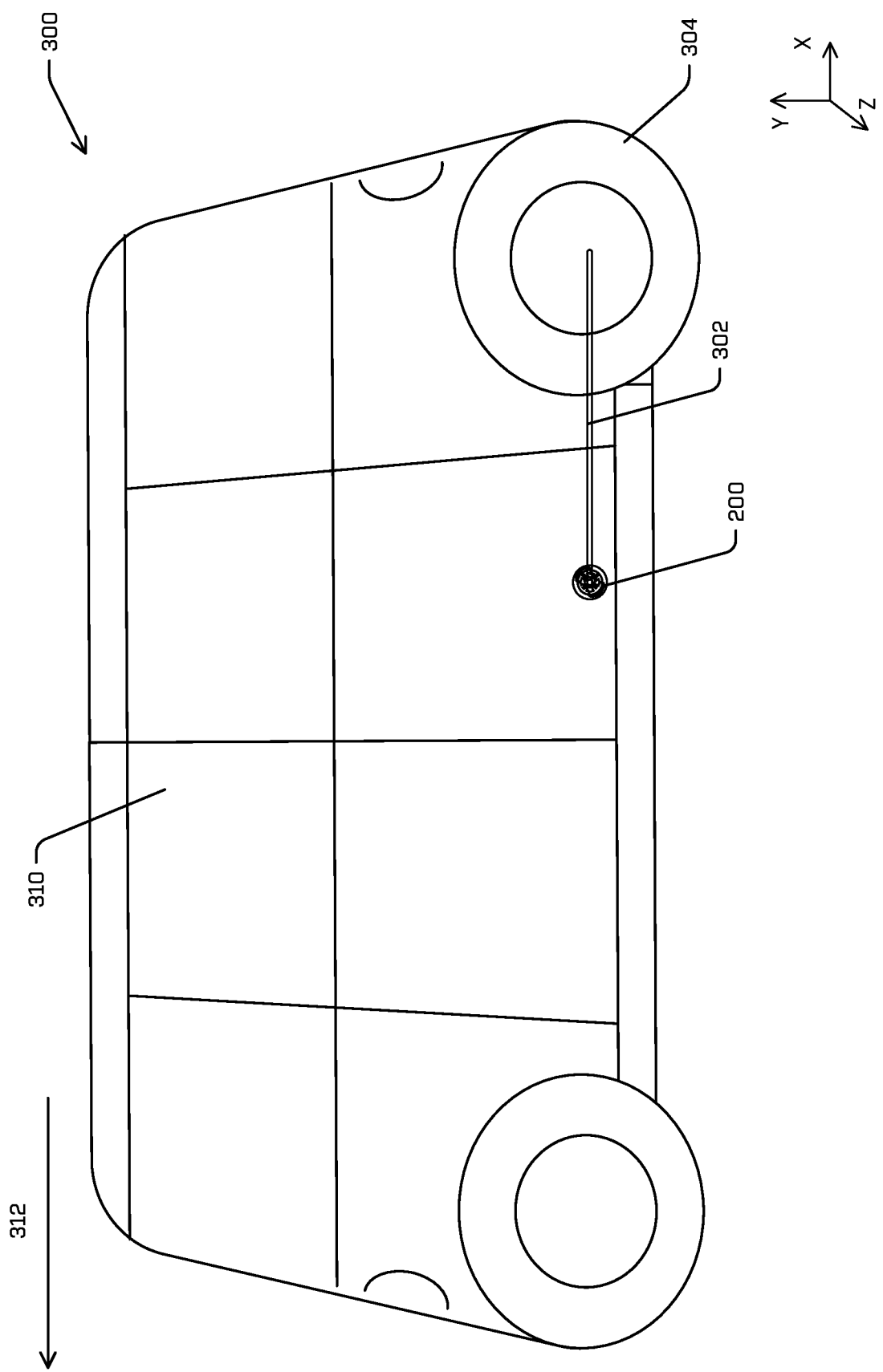
FIGS. 4A-4D are example diagrams illustrating operations of a single-pin elasto-hydraulic bushing system as described herein.
Figure 4B:
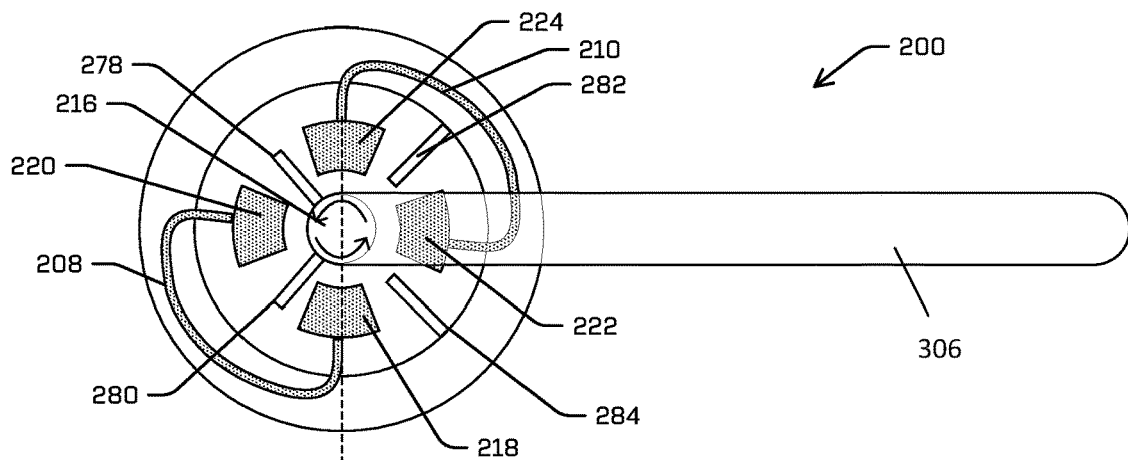

The diagram of FIG. 4B illustrates when no force is being exerted on inner sleeve 216. As vehicle 300 travels, however, different events can occur as previously described. In examples, during travel wheel 304 may be required to travel over an obstacle or bump in the road. In examples, during travel wheel 304 may be required to travel through pothole or depression in the road. In examples, vehicle 300 may have to stop and thus wheel 304 may experience resistance in the direction of travel. In examples, vehicle 300 may have to accelerate and thus wheel 304 may exert a force in the direction of travel. Any one or more of these events as well as other similar events may engage the suspension system 302 to provide shock absorption, dampen vibration, reduce noise, or any combination thereof. In examples, single-pin bushing system 200 may improve the functioning of the suspension system 302. In examples, single-pin bushing system 200 may improve shock absorption, dampen vibration, reduce noise, or any combination thereof by transforming rotational motion of a suspension arm into translational motion, translational motion of a suspension arm into rotational motion, or any combination thereof. In examples, single-pin bushing system 200 may be located in a place that does not impinge on the size of a passenger cabin of vehicle 300. In examples, single-pin bushing system 200 may be located on a plane that is parallel to the ground when vehicle 300 is in normal operation and that intersects a center point of first and second inner sleeves and a center of wheel 304.

Figure 4C:
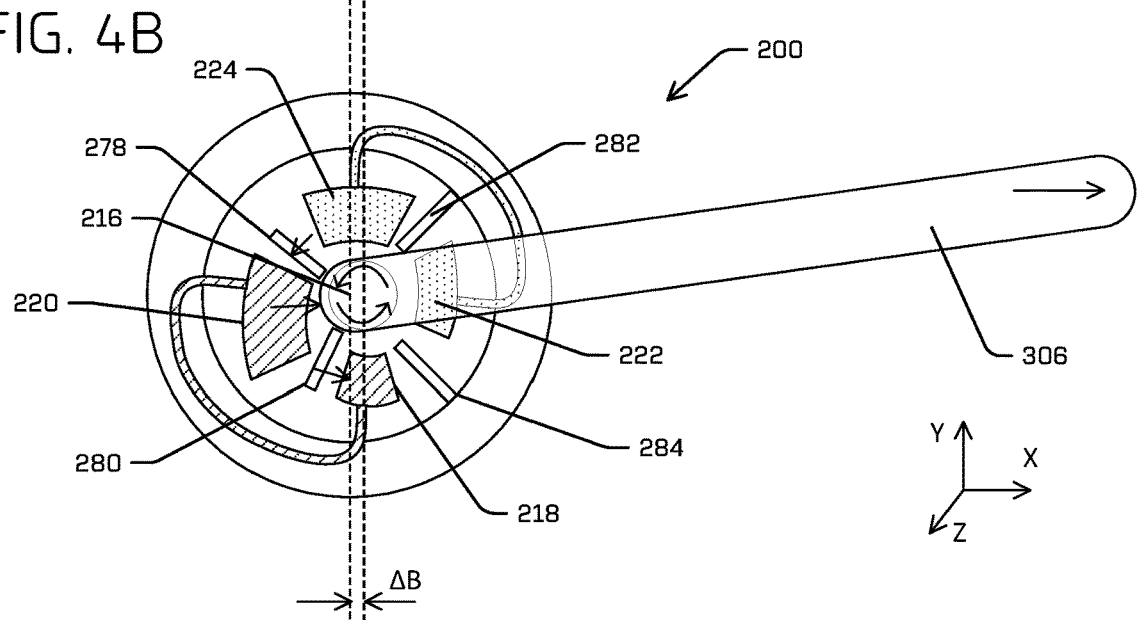

FIG. 4C, for examples, illustrates how single-pin bushing system 200 may assist in the event wheel 304 rides over an object or a bump on the road. As wheel 304 rides over an object or bump on the road, it is displaced in the vertical direction. As wheel 304 rises to ride over the obstacle, it pushes one end of suspension arm 306 upward. A typical bushing located at the described location of single-pin bushing system 200 would simply allow the suspension arm 306 to pivot and thus rotate counterclockwise. In contrast, in examples, as suspension arm 306 is forced upward, when engaged to the single-pin bushing system 200, as suspension arm 306 begins to pivot and thus rotate counterclockwise it will rotate in the same direction inner sleeve 216. As inner sleeve 216 rotates, it also rotates any inner sleeve vane extending therefrom. In examples, as illustrated in FIG. 4C, as inner sleeve 216 rotates counterclockwise, first inner sleeve vane 278 and second inner sleeve vane 280 are also rotated counterclockwise. As illustrated, first chamber 218 is between second inner sleeve vane 280 and second housing vane 284. As previously described, in examples, housing vanes are fixed in position. Thus, in examples, as second inner sleeve 280 rotates counterclockwise, it presses first chamber 218 against second housing vane 284. In examples, the pressure may cause compression of first chamber 218. In examples, the compression of first chamber 218 may force fluid inside first chamber 218 to be pressure ejected from first chamber 218 into flow path or tube 208. As the pressurized fluid flows through flow path or tube 208, it may reach second chamber 220. As the pressurized fluid is injected into second chamber 220, it may force second chamber 220 to expand. In examples, as second chamber 220 expands it may exert a force in the horizontal direction onto inner sleeve 216. The force exerted by expanding second chamber 220 onto inner sleeve 216 may force inner sleeve 216 to translate horizontally in a linear or substantially linear direction toward third chamber 222 by a distance ΔB. As inner sleeve 216 translates, it will exert a similar directional translation force onto suspension arm 306, and indirectly onto wheel 304. In so doing, wheel 304 will be pushed rearward as it travels over the obstacle. As described earlier with respect to the double-pin bushing system, in examples, exerting a rear force onto wheel 304 as it travels over an obstacle may reduce the shock, vibration, noise, or any combination thereof experience by the vehicle 300. Thus, as described, a rotational motion a supporting arm 306 connected to inner sleeve 216 is transformed at least in part into a translational motion in a horizontal direction. In examples, as described the translational motion in the horizontal direction is toward wheel 304.

As also illustrated in FIG. 4C, during the above described operation, fluid flow may also occur between chambers 222 and 224. This fluid flow, however, does not temper the above effects caused by the fluid flow between chambers 218 and 220. In examples, by translating inner sleeve 216 toward the wheel 304, inner sleeve 216 may press and thus compress third chamber 222. As third chamber 222 is compressed, the fluid inside third chamber 222 may be pressure ejected out of third chamber 222 through flow path or tube 210 and reach fourth chamber 224. Fourth chamber 224 may expand as it receives fluid flow from third chamber 222. In examples, fourth chamber 224 may have already expanded partially or fully in response to the rotational displacement of first inner sleeve vane 278 caused by rotation of inner sleeve 216.

Figure 4D:
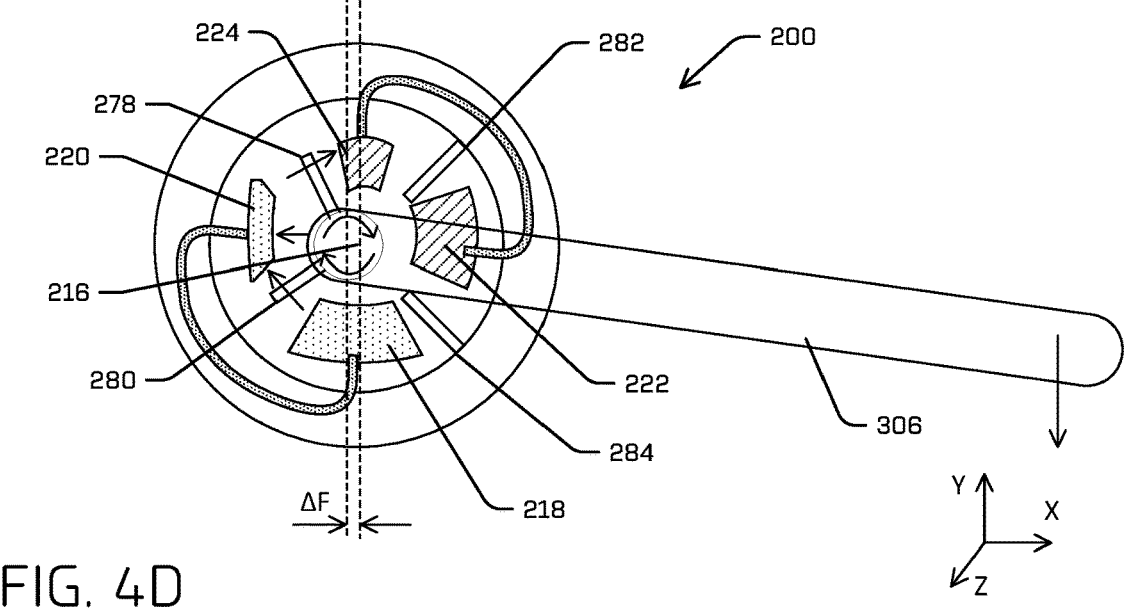

FIG. 4D illustrates a diagram of the operation of a single-pin bushing system 200 vehicle 300 experiences acceleration. In examples, as previously discussed, during acceleration, the trailing end of vehicle 300 may dip down toward the ground and cause the leading end of vehicle 300 to lift or move upward. In examples, it may be desirable to minimize the amount the vehicle trailing end dips down by applying an upward force to the trailing end of the vehicle. In examples, a single-pin bushing system 200 as described may assist in achieving this goal.

In examples, as illustrated, as vehicle 300 accelerates, the rear wheel 304 may exert a linear or substantially linear translational force in the direction of travel on suspension arm 306, and indirectly on inner sleeve 216 single-pin bushing system 200. As suspension arm 306 pushes inner sleeve 216 forward displacing it a distance ΔF, in a linear or substantially linear direction of travel, inner sleeve 216 may press against second chamber 220. In examples, as inner sleeve 216 presses onto second chamber 220, second chamber 220 is compressed between inner sleeve 216a and housing 212. The compressing of second chamber 220 may cause fluid inside second chamber 220 to pressure eject into flow path or tube 208. In examples, the pressurized fluid from second chamber 220 may travel through flow path or tube 208 to first chamber 218. In examples, as the pressurized fluid injects into first chamber 218, the fluid may expand first chamber 218. In examples, as first chamber 218 expands it will exert a displacement force against second inner sleeve vane 280 and second housing vane 284. In examples, second housing vane 284 is fixed in place and thus will not be displaced. In examples, the displacement force from the expansion of first chamber 218 will displace second inner sleeve vane 280. In examples, the displacement of second inner sleeve vane 280 will cause a clockwise rotation of inner sleeve 216. In examples, as inner sleeve 216 rotates in a clockwise direction, it will exert a rotational force in the same direction about a pivot point at inner sleeve 216 onto suspension arm 306. In examples, as suspension arm 306 is rotated in a clockwise direction about the pivot point at inner sleeve 216, it also applied the same rotational force to rear wheel 304. In examples, rear wheel 304 will in effect experience a downward force applied by suspension arm 306. In examples, rear wheel 304 is already touching the ground, thus, a downward force on rear wheel 304 may be compensated by an upward force on the trailing end of the vehicle exerted via housing 212. In examples, the single-pin bushing system 200 forces a trailing end of vehicle 300 upward. In examples, an upward force at the trailing end of vehicle 300 may counter the dip of the trailing end of vehicle 300 during an acceleration event.

As in the discussion of FIG. 4C, during an acceleration event it is possible that fluid transfer may occur also between third chamber 222 and 224. However, in examples, fluid transfer between chambers 222 and 224 would have a minimal or no effect on the above describe functioning and effect of single-pin bushing system 200. For example, as inner sleeve 216 rotates, it may rotate first inner sleeve vane 278 to compress fourth chamber 224 between first inner sleeve 278 and first housing vane 282. The compression of fourth chamber 224 may cause pressurized fluid to travel from fourth chamber 224 to third chamber 222 through flow path or tube 210. As pressurized fluid enters third chamber 222 it may expand third chamber 222. Expansion of third chamber 222, however, may have also been caused by the translation of inner sleeve 216 toward second chamber 220 due to the translational force exerted onto inner sleeve 216 by suspension arm 306. Thus, expansion of third chamber 222 may have little to no effect on the above described functioning of single-pin bushing system 200.

Although not illustrated, additional operations of a single-pin bushing system 200 may also be achieved. In examples, compression of third chamber 222 may cause fluid to flow to and expand fourth chamber 224. In examples, expansion of fourth chamber 224 may cause a displacement force onto first inner sleeve vane 278, which may result in a counter-clockwise rotation of inner sleeve 216. The counterclockwise rotation of inner sleeve 216 may cause a similar rotation of suspension arm 306 and wheel 304 about a pivot point at inner sleeve 216. In examples, compression of fourth chamber 224 may cause fluid to flow and expand third chamber 222, which may cause horizontal translation of inner sleeve 216 toward second chamber 220. In examples, horizontal translation of inner sleeve 216 may cause suspension arm 306 and wheel 304 to translate in the same direction.

In examples, similar effects as described above may be achieved using a single-pin bushing system 200 during events other than riding over an obstacle or acceleration. In examples, single-pin bushing system 200 may assist the suspension system when the wheel 304 rides through a dip or pothole in the road or other event. In examples, single-pin bushing system 200 may also be configured to operate as standard bushing. In examples, the functioning of single-pin bushing system 200 may be reversed from what has been described.

In examples, it may be desirable to operate single-pin bushing system 200 as a standard bushing. In examples, during a vehicle braking event, it may desirable to not cause single-pin bushing system 200 to transform a rotational motion of a suspension arm into a translational one or vice versa. In examples, during a braking event, supplementary crossflow lines 286 and 288 and one or more supplementary crossflow line valves 290, 292, 294, and 296 may be fully opened. In examples, opening one or more of supplementary crossflow lines 286 and 288 and one or more supplementary crossflow line valves 290, 292, 294, and 296 does not block fluid flow in flow path 208 or flow path 210. In examples, by opening one or more supplementary crossflow lines 286 and 288 and one or more supplementary crossflow line valves 290, 292, 294, and 296, fluid is allowed to flow from any one chamber to another. In examples, by allowing unrestricted fluid flow through flow paths and supplementary crossflow lines will minimize or eliminate any reaction by single-pin bushing system 200. As such, in examples where fluid flow is unrestricted between chambers through flow paths and supplementary crossflow lines, single-pin bushing system 200 may operate as a standard bushing. Control of fluid flow by the operation of one or more supplementary crossflow lines 286 and 288 and one or more supplementary crossflow line valves 290, 292, 294, and 296 is described in more detail below.

In examples, the degree of the effect generated by single-pin bushing system 200 as described above, i.e. the degree at which a rotational force is transformed into a translational force and vice versa, may be controlled, tuned, or adjusted. In examples, the effect generated by single-pin bushing system 200 may be tuned by a controller or an operator. In examples, the degree of the effect generated by single-pin bushing system 200 may be controlled, tuned, or adjusted by operating one or more supplementary crossflow lines 286 and 288 and one or more supplementary crossflow line valves 290, 292, 294, and 296. In examples, the flow through one or more supplementary crossflow lines 286 and 288 may be controlled, tuned, or adjusted by operating one or more supplementary crossflow line valves 290, 292, 294, and 296. In examples, flow through one or more supplementary crossflow lines 286 and 288 may be blocked so that no fluid passes through one or more supplementary crossflow lines 286 and 288. In examples, flow through one or more supplementary crossflow lines 286 and 288 may be unobstructed and thus one or more supplementary crossflow lines 286 and 288 may be fully opened. In examples, flow through one or more supplementary crossflow lines 286 and 288 may be partially restricted. In examples, one or more supplementary crossflow line valves 290, 292, 294, and 296 may be controlled to open, close, partially open, partially close, fully divert flow, partially divert flow, or any combination thereof. In examples, by operating one or more supplementary crossflow line valves 290, 292, 294, and 296, the flow through one or more supplementary crossflow lines 286 and 288 may be adjusted. As fluid flow through one or more supplementary crossflow lines 286 and 288 is controlled, tuned, or adjusted, in examples, the fluid flow through flow paths 208 and 210 may be affected. In examples, by affecting fluid flow through flow paths 208, 210, or both, the effect generated by single-pin bushing system 200 can be controlled, tuned, or adjusted. In examples, the amount of transformation between rotational and translational forces may be controlled, tuned, or adjusted to be greater for one or more events, lower for one or more events, or not existent for one or more events. The control, tuning, or adjustment of the flow through one or more supplementary crossflow lines 286 and 288 by operation of one or more supplementary crossflow line valves 290, 292, 294, and 296 may be performed by a controller, an operator, or any combination thereof as described in more detail later.

In examples, a single-pin bushing system 200 may be connected to a suspension arm of a front wheel of a monodirectional vehicle. In examples, single-pin bushing system 200 may be used in a conjunction with a front wheel of vehicle 300 rather than a rear wheel. In examples, a vehicle 300 may be a bidirectional vehicle and thus a single-pin bushing system 200 may be part of a suspension system that works as a front wheel suspension when the vehicle travels in one direction and as a rear wheel suspension system when the vehicle travels in a second direction, opposite the first direction.

In examples, operation of the single-pin bushing system 200 can reversed using supplementary crossflow lines 286 and 288 and one or more supplementary crossflow line valves 290, 292, 294, and 296. In examples, the one or more supplementary crossflow line valves 290, 292, 294, and 296 may be configured to diverge fluid flow from flow paths 208 and 210 to supplementary crossflow lines 286 and 288 respectively. In examples, at least a portion of the fluid flow is diverted. In examples, all fluid flow is diverted. In examples, fluid flow may be diverted from flow paths or tubes 208 and 210 in a manner such that fluid can flow between first chamber 218 and third chamber 222. In examples, fluid flow may be diverted such that fluid can flow between second chamber 220 and fourth chamber 224. In examples, fluid flow may be diverted so that fluid can flow between first chamber 218 and third chamber 222, and between second chamber 220 and fourth chamber 224, instead of between first chamber 218 and second chamber 220, and third chamber 222 and fourth chamber 224.

In examples in which a single-pin bushing system 200 is operated in reverse, when an counterclockwise rotational force is applied inner sleeve 216, first chamber 218 is compressed and fluid flows to third chamber 222, thereby expanding third chamber 222 and causing a horizontal translation of inner sleeve 216 in a direction toward second chamber 220. In examples, the translation of inner sleeve 216 may be transferred to the suspension arm connected to inner sleeve 216 and thus the wheel connected to the suspension arm. In examples in which a single-pin bushing system 200 is operated in reverse, as the suspension arm forces a translation of inner sleeve 216, second chamber 220 may be compressed forcing fluid to flow to and expand fourth chamber 224. Expansion of fourth chamber 224 may cause first inner sleeve vane 278 to be displaced and thus cause a counterclockwise rotation of inner sleeve 216. The caused rotation of inner sleeve 216 may cause the suspension arm to also pivot or rotate about a pivot point at inner sleeve 216 in a counter clock direction and thus also apply an upward force to the wheel attached to the suspension arm. Other functions of single-pin bushing system 200 when operated in reverse may also be provided. For example, when operated in reverse, compression of third chamber 222 may cause fluid to flow to and expand first chamber 218, and compression of fourth chamber 224 may cause fluid to flow and expand second chamber 220. In examples, expansion of first chamber 218 may cause a displacement of second inner sleeve vane 284 and thus a clockwise rotation of inner sleeve 216 and consequently of the suspension arm and wheel about a pivot point at inner sleeve 216. In examples, expansion of second chamber 220 may cause a horizontal translation of inner sleeve 216 toward third chamber 222, and thus a linear translation in the same direction of the suspension arm and wheel.

In examples, as previously described, bushing system 200, double-pin and single-pin, may also include chambers that are not fluidly connected to each other. Instead, as described earlier with respect to FIGS. 2E-2H, chambers 218, 220, 222, and 224 may be fluidly connected to a reservoir or a manifold. In examples, the chambers may all be fluidly connected to a common manifold. In examples, the chambers may be fluidly connected to independent reservoirs. In examples, two or more chambers may be fluidly connected to a common manifold, and one or more chambers may be fluidly connected to independent reservoirs. In examples, two or more chambers are fluidly connected to each other and two or more chambers are connected to either a common manifold or independent reservoirs.

In examples where chambers 218, 220, 222, and 224 are connected to reservoirs or common manifold, the bushing system 200, double-pin or single-pin, may operate in the same manner as previously described except instead of fluid flowing between chambers as they compress and expand, fluid flows between chambers and the reservoirs or manifold. In examples, fluid flow between chambers and reservoirs or manifold can occur by flow lines 242, 244, 246, and 248, and controlled by pump and valve systems 258, 260, 262, and 264 for individual reservoirs or pump and valve systems 270, 272, 274, and 276 for common manifold 266. In examples, controllers 250, 252, 254, 256, and/or 268 may be used to control the pump and valve systems.

In examples, vehicle 300 may include or more sensors that can detect or predict an event such as wheels riding over an obstacle, vehicle acceleration, wheels riding through a depression, vehicle braking or any other type of event. In examples, in bidirectional vehicles, controllers 250, 252, 254, 256, and/or 268 may also receive signals from the vehicle sensors as to the direction vehicle 300 is traveling so that they can determine whether the bushing system 200 to which they are associated is operating in conjunction with as a front wheel or rear wheel suspension system. Based on the sensor information, controllers 250, 252, 254, 256, and/or 268 may activate the one or more pump and valve systems to expand, contract, enable compression of, or any combination thereof of the chambers to which the pump and valves systems are fluidly connected. In examples, the pump and valve systems can inject fluid into one or more chambers to expand the chambers. In examples, the pump and valve systems can suction fluid from one or more chambers to contract the chambers. In examples, the pump and valve systems can allow the chambers to compress in reaction to a force from the suspension arm by allowing fluid flow from the chambers to the reservoirs or manifold.

In examples, controllers 250, 252, 254, 256, and/or 268 can receive information about the status of one chamber and in response affect the status of another chamber. In examples, controllers 250, 252, 254, 256 may communicate with each other to provide status information about the chambers to which they are associated. In examples, a common controller 268 may monitor the status of each chamber. In examples, monitoring of a chamber can be performed using one or more sensors. In examples, each chamber can be monitored using a pressure sensor.

For example, if bushing system 200 is used in a rear wheel suspension system and chamber 218 is compressed by a force induced by the suspension arm, controller 250 of chamber 218 or common controller 268 may cause pump and valve system 258 or 270 that is fluidly connected to chamber 218 to allow fluid to flow from chamber 218 to either reservoir 234 or common manifold 266 via flow line 242. In examples, controller 250 of chamber 218 or common controller 268 may cause pump and valve system 258 or 270 that is fluidly connected to chamber 218 to suction fluid from chamber 218 and transfer the fluid to either reservoir 234 or common manifold 266 via flow line 242 in response to a command received from the vehicle system 500 based on a sensed event or a predicted event. In examples, in conjunction with allowing chamber 218 to compress or with actively contracting chamber 218, controller 252 of chamber 220 or common controller 268 may cause pump and valve system 260 or 272 that is fluidly connected to chamber 220 to inject fluid into chamber 220 from reservoir 236 or common manifold 266 via line 244 and thus cause chamber 220 to expand. In this manner, the same effect can be achieved by bushing system 200 as previously described in which chamber 218 is fluidly connected to chamber 220.

As can be appreciated, the same type of control described herein by way of controllers 250, 252, 254, 256, and/or 268 can be performed for each of chambers 218, 220, 222, and 224. As such, the bushing system 200, double-pin or single-pin, may be operated as desired and as previously described. Also, in examples, because chambers 218, 220, 222, and 224 may be independently controlled using controllers and pump and valve systems along with reservoirs and/or manifold, the same effects and operations of bushing system 200, double-pin and single-pin, as previously described employing crossflow line 230 and/or supplementary crossflow lines 286 and 288 may also be achieved without the use of any crossflow line or supplementary crossflow lines. Instead, in examples, the chambers can be expanded and contracted or allowed to compress, as desired. Thus, for example, in the event chamber 218 is contracted or is allowed to compress, instead of affecting chamber 220, controller 254 of chamber 222 or common controller 266 may cause pump and valve system 262 or 274 that is fluidly connected to chamber 222 to flow fluid into chamber 222 and thus cause chamber 222, instead of chamber 220, to expand and thus achieve the same reverse operation of bushing system 200 as previously described using crossflow line 230 or supplementary crossflow lines 286 and 288. In examples, the control, tuning, or adjustment of the effects of the bushing system 200, double-pin or single-pin, may also be accomplished using the one or more controllers 250, 252, 254, 256, and/or 268 and the one or more pump and valve systems by controlling the rate, amount, and/or timing of flow between each of chambers 218, 220, 222, and 224 and either reservoirs 234, 236, 238, and 240, and/or common manifold 266, in place of using crossflow line 230 and/or supplementary crossflow lines 286 and 288. In examples, using the one or more controllers 250, 252, 254, 256, and/or 268 fluid flow may be fully open, fully blocked, partially open, and/or partially blocked between any one of chambers 218, 220, 222, and 224 and a reservoir or manifold. In examples, using the one or more controllers 250, 252, 254, 256, and/or 268 bushing system 200 may be caused to operate as a standard bushing. For example, if one or more controllers 250, 252, 254, 256, and/or 268 receive a signal that vehicle 300 is braking, bushing system 200 may be controlled to operate as a standard bushing.

In examples, the bushing system may be configured such that an effective modulus of elasticity of a first region of the elastomeric member may be configurable. In examples, the bushing system may be configured such that the effective modulus of elasticity the elastomeric member may be radially configurable. Modification of the effective modulus of elasticity of one or more regions in a bushing system may affect the operation of the bushing system. In examples, the modification or configuration of an effective modulus of elasticity of one or more regions of a bushing system may cause an offset of the effective pivot point of the bushing system (e.g., in response to a force applied to an inner member of a bushing) and thus realize one or more advantages previously described In examples, modification or configuration of an effective modulus of elasticity of one or more regions of a bushing system may allow for improved performance of the bushing system tailored to the particular situation. In examples, modification or configuration of an effective modulus of elasticity of one or more regions of a bushing system may allow for improved performance of a suspension system in which the bushing system is used. In examples, modification or configuration of an effective modulus of elasticity of one or more regions of a bushing system may result in improved vehicle rider experience.

In examples, the effective modulus of elasticity of one or more regions of the bushing system may be modified by any suitable means. In examples, the effective modulus of elasticity of one or more regions of the bushing system may be configured or modified mechanically, magnetically, electrically, any combination thereof and/or by any other means alone or in combination with those described herein. In examples, mechanical modification of the effective modulus of elasticity of one or more regions of the bushing system may be effectuated via fluid flow to and from one or more chambers provided in one or more elastic or elastomeric members or elastic bodies of the bushing system. In examples, magnetic modification of the effective modulus of elasticity of one or more regions of the bushing system may be effectuated by manipulation of a property such as a physical property of a material such as a smart material included in elastomeric member. In example, a material may be a smart material. In example the material or smart material may be included in an elastomeric member either by including the material or smart material in one or more chambers included in the elastomeric member and/or by using the material or smart material to form one or more portions or regions of the elastomeric member. In examples, a smart material may be a smart fluid material, a smart elastomer material, or a combination of both.

In examples, the smart material may be a magnetorheological and/or electrorheological fluid and/or elastomer used in conjunction with one or more elastic or elastomeric members or elastic bodies of the bushing system. In examples, electrical modification of the effective modulus of elasticity of one or more regions of the bushing system may be effectuated via an electrorheological fluid and/or elastomer used in conjunction with one or more elastic or elastomeric members or elastic bodies of the bushing system. Other means that are able to affect the viscosity of a fluid and/or elasticity of a region of one or more elastic or elastomeric members or elastic bodies of the bushing system may be employed. In examples, the configurable or modifiable regions of one or more elastic or elastomeric members or elastic bodies of the bushing system are sub-portions of one or more elastic or elastomeric members or elastic bodies of the bushing system. In examples, the one or more regions of configurable and/or modifiable effective modulus of elasticity may be provided radially about a center point and/or inner sleeve of one or more elastic or elastomeric members or elastic bodies of the bushing system.

In examples, the change in the effective modulus of elasticity may be caused in conjunction with the above described operation of transforming rotational motion to translational motion and/or translational motion to rotational motion. In examples, the change in the effective modulus of elasticity may be caused independent of the above described operation of transforming rotational motion to translational motion and/or translational motion to rotational motion.

In examples, configuration of an effective modulus of elasticity of a bushing system or region thereof may be accomplished via a modification of a smart material such as a smart fluid material or smart elastomer material. In examples, configuration of an effective modulus of elasticity of a bushing system or region thereof may be accomplished via a modification of a property such as a physical property of a smart material such as a smart fluid material or smart elastomer material included in the elastomeric member either in a chamber in the elastomeric member and/or as a region or portion of the elastomeric member. In examples, smart fluid materials may include magnetorheological fluids, electrorheological fluids, or any other like fluid the viscosity of which may be affected via a magnetic field, electrical filed, electromagnetic field, or any like means. In examples, smart elastomer materials may include magnetorheological elastomeric materials, electrorheological elastomeric materials, or any other like material the elasticity of which may be affected via a magnetic field, electrical filed, electromagnetic field, or any like means. In examples, a change in effective modulus of elasticity to one or more regions of the bushing system could modify the behavior of bushing system and, in cases, potentially shift the functional pivot point.

In examples, operation of bushing system 200 may be controlled or affected by causing a stiffening of one or more regions, portions, or elements of the bushing system 200. In examples, operation of bushing system 200 may be controlled or affected by modifying the effective modulus of elasticity of one or more regions, portions, or elements radially disposed about one or more inner sleeves of the bushing system 200. In examples, by employing fluid flow in one or more chambers 218, 220, 222, and 224 as described earlier, it may be possible to also affect the bushing effective modulus of elasticity of one or more regions and thus the bushing operation. In examples, one or more chambers 218, 220, 222, and 224 may be operated independently and thus expanded or retracted independent of any expansion or retraction of any other chamber.

In examples, the effective modulus of elasticity of one or more regions of the bushing system may be affected by means other than mechanical means, and/or in combination with mechanical means. In examples, the effective modulus of elasticity of one or more regions of the bushing system may be modified by affecting a material property of one or more materials present in one or more regions of the bushing system. In examples, the effective modulus of elasticity of one or more regions of the bushing system may be modified by affecting a material property of one or more materials present in one or more regions of the elastomeric member of the bushing system. In examples, the material properties may include viscosity, apparent viscosity, stiffness, modulus, and/or elasticity of a material. In examples, the effective modulus of elasticity of one or more regions of the bushing system may be affected by a magnetic field, electric field, direct application of an electric current, magnetoelectric field, that may affect a material property of a smart material such as a smart fluid and/or smart elastomer. In examples, the effective modulus of elasticity of one or more regions of the bushing system may be achieved by affecting a property such as a physical property of a material provided in one or more chambers 218, 220, 222, and 224 or in one or more regions of the of the elastomeric member of the bushing system that correspond to the location of the illustrated one or more chambers 218, 220, 222, and 224. In examples, the material provided in one or more chambers 218, 220, 222, and 224 is a smart material such as a smart fluid material, a smart elastomer material, or a combination of both. In examples, the smart material can be a magnetorheological material that may include a magnetorheological fluid (MRF), a magnetorheological elastomer (MRE), or a combination of both. In examples, a smart elastomer material such as MRE may be included in one or more regions of the one or more elastic or elastomeric members or elastic bodies 214 of bushing system 200. In examples, the smart material may include an electrorheological material that may include an electrorheological fluid (ERF), an electrorheological elastomer (ERE), or a combination of both. In examples, a smart elastomer material such as ERE may be included in one or more regions of the one or more elastic or elastomeric members or elastic bodies 214 of bushing system 200. In examples, other means may be employed to affect the material properties of a fluid or material.

In examples, one or more smart materials such as fluids and/or elastomers may be used to implement a configuration of an effective modulus of elasticity of one or more regions of the bushing system. In examples, smart materials may include shape memory alloys and polymers, piezoelectric materials, magnetostrictive materials, and magnetorheological fluids and elastomers, electrorheological fluids and elastomers, and other like materials. In examples, means that may be employed to change a property such as a physical property of a material or smart material may include magnetic field, electric field, electromagnetic field, temperature, pH value, pressure, moisture, or any like means. For purposes of illustration, the examples described herein involve smart materials such as MRF, MRE, ERF and ERE affected by a magnetic field, electric field, and/or electromagnetic field. It should be understood that other means of affecting material properties and use of other materials including other smart materials, may be similarly applied and controlled as the examples described.

Figure 5A:
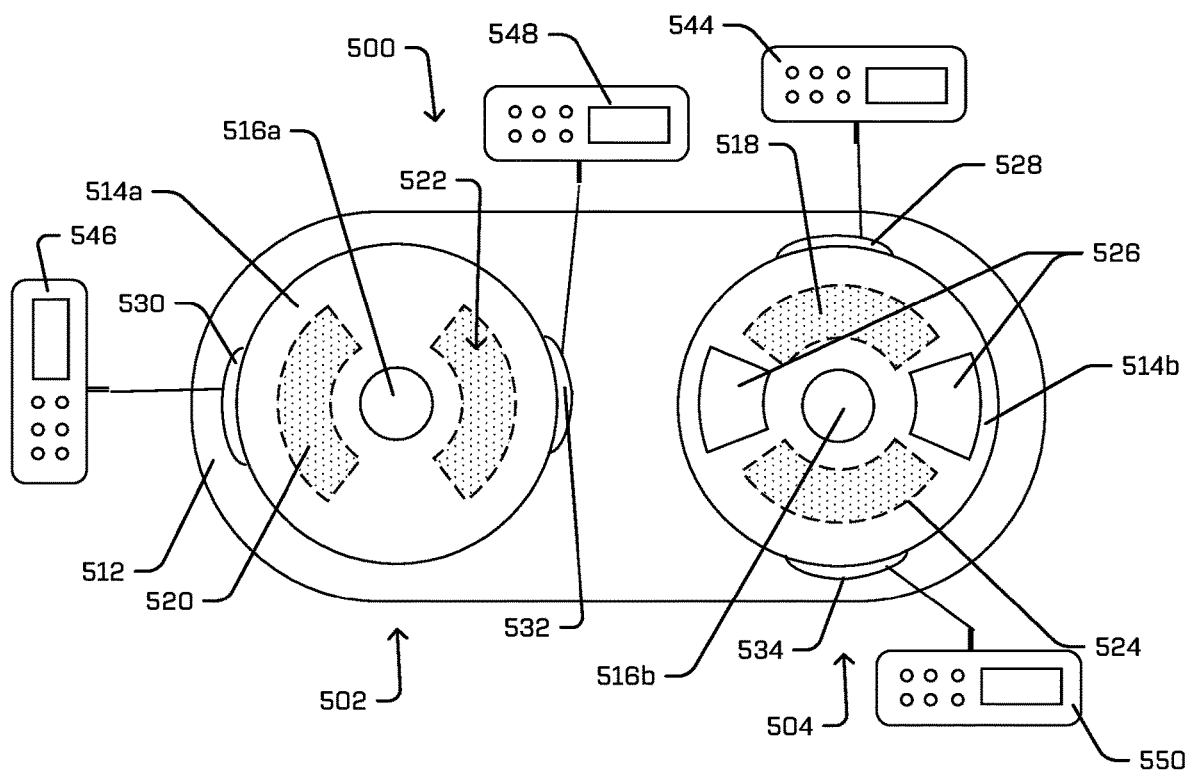
FIGS. 5A-5C are example diagrams illustrating a bushing system with regions of configurable effective modulus of elasticity.
Figure 5B:
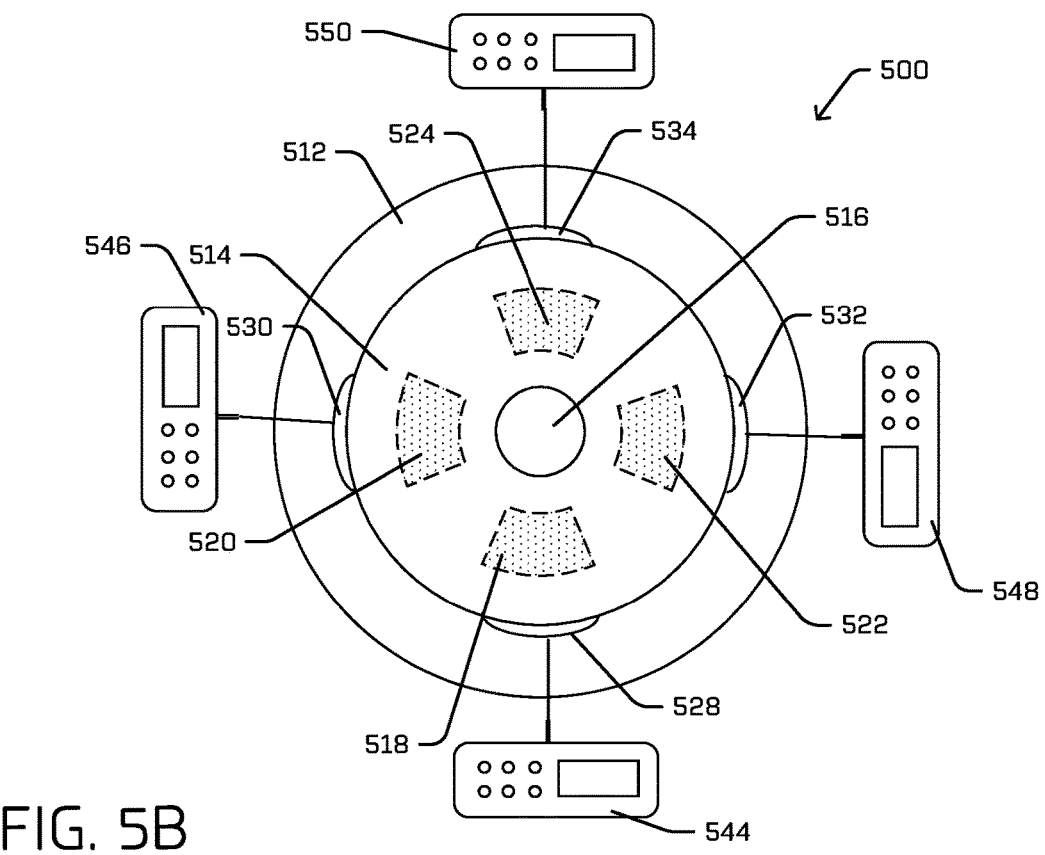

FIGS. 5A and 5B illustrate example diagrams of modifying the effective modulus of elasticity of one or more regions of a double-pin and single-pin bushing system as described earlier. As illustrated, in examples, a bushing system 500 can be implement as a double-pin system as shown in FIG. 5A or a single-pin system as shown in FIG. 5B. Illustrated in FIGS. 5A and 5B are one or more regions 518, 520, 522, and 524. In examples, the one or more regions are separate and distinct regions. In examples, the one or more regions may be regions of configurable effective elastic modulus of elasticity. In examples, the one or more regions are radially arranged about a center point, pivot point, and/or inner sleeve of a bushing and/or of an elastic or elastomeric member or elastic body of a bushing or bushing system. In examples, a bushing system may include all four of regions 518, 520, 522, and 524. In examples, a busying system may include fewer than all four regions. In examples, bushing system may only include one, two, three, or four of regions 518, 520, 522, and 524. In examples, regions 518, 520, 522, and 524 may be configured to have a controllable and/or modifiable effective modulus of elasticity. In examples, the effective modulus of elasticity of each of one or more regions 518, 520, 522, and 524 may be configured to be independently a controllable and/or modifiable. In examples, one or more regions 518, 520, 522, and 524 are provided in the elastic or elastomeric members or elastic bodies 514 of the bushing system. In examples, one or more regions 518, 520, 522, and 524 may correspond to the locations and occupy the same space as previously described for chambers 218, 220, 222, and 224 previously described with respect to FIGS. 2A-2H.

In examples, one or more regions 518, 520, 522, and 524 may extend the full thickness or a partial thickness of the bushing system. In examples, the one or more regions 518, 520, 522, and 524 may be embedded in or be portions of elastic or elastomeric member or elastic body 514. In examples, a region may extend at least a portion of the length of the elastic or elastomeric member or elastic body 514. In examples, a region may extend between one percent and ninety-nine percent of the length of the elastic or elastomeric member or elastic body 514 of a bushing or bushing system. In examples, a region may extend at least one quarter, half, two thirds, or ninety percent of the length of the elastic or elastomeric member or elastic body 514 of a bushing or bushing system. In examples, as illustrated in FIGS. 5A and 5B, the one or more regions may be arranged about one or more inner sleeves 516.

For example, in FIG. 5A, the double-pin bushing system may include a first elastic or elastomeric member or elastic body 514*a* and a second elastic or elastomeric member or elastic body 514*b* as similarly described earlier with respect to FIG. 2A. In examples, as illustrated in FIG. 5A, one or more regions 520 and 522 may be located in a first elastic or elastomeric member or elastic body 514*a*. In examples, region 520 and 522 may be at similar locations as chambers 220 and 222 previously described in conjunction with FIG. 2A. In examples, also as illustrated in FIG. 5A, one or more regions 518 and 524 are provided in a second elastic or elastomeric member or elastic body 514*b*. In examples, region 518 and 524 may be at similar locations as chambers 218 and 224 previously described in conjunction with FIG. 2A. In examples, as illustrated in FIG. 5B, one or more regions one or more regions 518, 520, 522, and 524 are provided in the elastic or elastomeric members or elastic bodies 514 of a single-pin bushing system 500. In examples, as illustrated in FIG. 5B, one or more regions one or more regions 518, 520, 522, and 524 are located at similar locations as chambers 218, 220, 222, and 224 that were described earlier in conjunction with FIG. 2C.

In examples, the one or more regions 518, 520, 522, and 524 may include one or more chambers 218, 220, 222, and 224 as previously described. In examples, an effective modulus of elasticity of one or more regions 518, 520, 522, and 524 may be dependent on a fluid pressure in one or more chambers 218, 220, 222, and 224 respectively. In examples, an effective modulus of elasticity of one or more of regions 518, 520, 522, and 524 may be modified by fluid flowing to or from a chamber. In examples, as fluid is flowed into a chamber, the effective modulus of elasticity of the region occupied by that chamber may increase. In examples, as fluid is extracted from a chamber, the effective modulus of elasticity of the region occupied by that chamber may decrease. In examples, an effective modulus of elasticity of a first region may be configurable in response to a fluid flowing to or from a first chamber located in that first region. For example, an effective modulus of elasticity of a first region 518 may be configurable in response to a fluid flowing to or from a first chamber 218. In examples, an effective modulus of elasticity of a second region may be configurable in response to a fluid flowing to or from a second chamber located in that second region. For example, an effective modulus of elasticity of a second region 520 may be configurable in response to a fluid flowing to or from a second chamber 220. In examples, an effective modulus of elasticity of a third region may be configurable in response to a fluid flowing to or from a third chamber located in that third region. For example, an effective modulus of elasticity of a third region 522 may be configurable in response to a fluid flowing to or from a third chamber 222. In examples, an effective modulus of elasticity of a fourth region may be configurable in response to a fluid flowing to or from a fourth chamber located in that fourth region. For example, an effective modulus of elasticity of a fourth region 524 may be configurable in response to a fluid flowing to or from a fourth chamber 224.

In examples, as previously described, chambers 218, 220, 222, and 224 may either be fluidly connected or operated in tandem to cause a transformation of rotational motion into a translational motion and/or a translational motion into a rotational motion. In examples, the effective modulus of elasticity of one or more regions 518, 520, 522, and 524 may change in conjunction with the described operation that gives rise to the motion transformation.

In examples, as previously described, the fluid flow to and from chambers 218, 220, 222, and 224 may be independently controlled. For example, any one or more of chambers 218, 220, 222, and 224 may be operatively and/or fluidly connected to a shared or independent reservoir. In examples, fluid flow to and/or from any one or more of chambers 218, 220, 222, and 224 may be controlled or caused by one or more controllers 250, 252, 254, 256, 268 and/or control system 638 operating one or more valves 258, 260, 262, 264, 270, 272, 274, and/or 276 and reservoirs 234, 236, 238, and 240, and/or common manifold 266. In examples, the control of fluid flow to and from a chamber may be configured to modify an effective modulus of elasticity of the region occupied by the chamber independent of any other functionality or motion transformation. For example, fluid can be injected into or extracted from one chamber without flow compensation in another chamber. In examples, fluid flow may be controlled to and from chamber 218 located at a region 518 to configure, alter, control, or modify the effective modulus of elasticity of region 518 independent of any flow to or from any other chamber. Similarly, in examples, fluid flow may be controlled to and from chamber 220 located at a region 520 to configure, alter, control, or modify the effective modulus of elasticity of region 520 independent of any flow to or from any other chamber. In examples, fluid flow may be controlled to and from chamber 222 located at a region 522 to configure, alter, control, or modify the effective modulus of elasticity of region 522 independent of any flow to or from any other chamber. In examples, fluid flow may be controlled to and from chamber 224 located at a region 524 to configure, alter, control, or modify the effective modulus of elasticity of region 524 independent of any flow to or from any other chamber. In examples, the effective modulus of elasticity of any one of regions 518, 520, 522, and 524 may thus be independently controlled via fluid flow.

In examples, the effective modulus of elasticity of any one or more regions 518, 520, 522, and 524 may be configurable, adjustable, controllable, and/or modifiable by employing one or more means to modify a material property of a material provided in any one or more regions 518, 520, 522, and 524.

In examples, the effective modulus of elasticity of any one or more regions 518, 520, 522, and 524 may be configurable, adjustable, controllable, and/or modifiable by employing one or more smart fluid materials such as magnetorheological fluids (MRFs), electrorheological fluids (ERFs), or any combination thereof.

An MRF is a fluid of smart materials characterized by fast, tuneable and reversible changes of its rheological properties under application of magnetic fields. In examples, an MRF may have an ability to alter its basic characteristics and viscosity, when subjected to the magnetic field. In examples, the state of an MRF can be switched from the semisolid to the fluid phase and vice versa upon the application or removal of a magnetic field. In examples, MRF can exhibit fast response and good controllability. In examples, an MRF may have yield stress that can increase considerably in the presence of externally applied magnetic field. In examples, an MRF may be composed of soft, spherical, magnetic particles whose diameters range from 0.01 to 20 μm dispersed in an organic liquid. In examples, an MRF may include a carrier fluid and polarizable particles. In examples, the carrier fluid may include silicone oil. Other carrier fluids may also be used. In examples, the polarizable particles may include iron particles dispersed in the carrier fluid. Other materials for the polarizable particles may also be used. For example, upon applying a magnetic field, the polarizable particles in an MRF may form chains between two poles.

In examples, an ERF may include solid particles dispersed in an insulating liquid, display the special characteristic of electric-field-induced rheological variations. In examples, ERFs may include additive particles kept in suspension in a dielectric fluid that is non-conducting. In examples, the carrier fluid has high electrical resistivity and has a low viscosity like silicon oil, olive oil, hydrocarbons, and other like materials. In examples, liquid carrier such as hydrocarbon or silicon oil has low viscosity and high resistivity. In examples, the additive particles mixed in the carrier fluids may include polymers, alumina silicates, metal oxides silica, and other like materials. In examples, the additive particles may have low particles size that may allow the carrier fluid to maintain low viscosity when an external electric field is not applied. In examples, the additive particles size may be in the range of 0.1-100 μm. In examples, without any external electric field an ERFs may remain in liquid condition and as soon as an electric field is applied the ERF may change to solid exhibiting a viscosity change of the fluid. In examples, ERFs may change physical properties like viscosity due to application of electric field. In examples, types of ERF may include, Positive ERFs—fluids whose viscosity increases by application of the electric field, and Negative ERFs—fluids whose viscosity decreases by application of electric field.

In examples, one or more chambers 218, 220, 222, and 224 is filled with a smart fluid material such as MRF and/or ERF. In examples, the same MRF and/or ERF may be used to fill all chambers. In examples, each chamber may be filled with a different MRF and/or ERF. In examples, only one of chambers 218, 220, 222, and 224 located respectively in regions 518, 520, 522, and/or 524 of an elastic or elastomeric member or elastic body 514 contains a smart fluid material such as MRF and/or ERF. In examples, at least two of chambers 218, 220, 222, and 224 located respectively in regions 518, 520, 522, and/or 524 of an elastic or elastomeric member or elastic body 514 contain a smart fluid material such as MRF and/or ERF. In examples, at least three of chambers 218, 220, 222, and 224 located respectively in regions 518, 520, 522, and/or 524 of an elastic or elastomeric member or elastic body 514 contain a smart fluid material such as MRF and/or ERF. In examples, all four of chambers 218, 220, 222, and 224 located respectively in regions 518, 520, 522, and/or 524 of an elastic or elastomeric member or elastic body 514 contain an MRF and/or ERF.

In examples, a chamber contains mixture of two or more a smart fluid materials such as MRFs, ERFs, or both. In examples, at least one chamber in one region contains a smart fluid material such as MRF and/or ERF that is different from a smart fluid material such as MRF and/or ERF contained in at least one chamber located in another region. In examples, the first chamber 218 may contain a first a smart fluid material such as MRF and/or first ERF, the second chamber 220 in the second region may contain a second a smart fluid material such as MRF and/or second ERF, the third chamber 222 in the third region may contain a third a smart fluid material such as MRF and/or third ERF, and the fourth chamber 224 in the fourth region may contain a fourth a smart fluid material such as MRF and/or ERF. In examples, the first, second, third, and fourth a smart fluid material such as MRFs and/or ERFs may be the same or different.

In examples, two or more chambers may be fluidly connected and a smart fluid material such as MRF and/or ERF may flow from one chamber to another chamber as previously described. In examples, any one chamber may include a smart fluid material such as MRF and/or ERF that flows in and out of the chamber using independent reservoirs or manifolds as described in conjunction with FIGS. 2D-2G. In examples, any one chamber may include a smart fluid material such as MRF and/or ERF that does not flow to or from a chamber. In examples, a chamber is not fluidly connected to anything else and simply contains a smart fluid material such as MRF and/or ERF fluid therein.

In examples, an application of a magnetic field may cause a change in viscosity of a smart fluid material such as MRF. Accordingly, application of a magnetic field may affect the behavior of a smart fluid material such as MRF. In examples, affecting a smart fluid material such as MRF with a magnetic field can affect the operation of bushing system 200.

In examples, an application of an electric field may cause a change in viscosity of a smart fluid material such as ERF. Accordingly, application of an electric field may affect the behavior of a smart fluid material such as ERF. In examples, affecting a smart fluid material such as ERF with an electric field can affect the operation of bushing system 200.

In examples, modification to the viscosity of the fluid that flows to and from a chamber may affect response time and/or degree of response in the previously described operations where one or more chambers are employed in transforming rotational motion into translational motion and/or translational motion in rotational motion. For examples, a more viscous fluid may take longer to flow to or from a chamber. In such examples, cause a viscosity of a smart fluid material such as MRF and/or ERF to increase may result in a dampened response time of the bushing system.

In examples, modification of the viscosity of a smart fluid material such as MRF and/or ERF using a magnetic field, an electric field, and/or an electromagnetic field can affect the effective modulus of elasticity of the region in which the chamber is located. In examples, an MRF and/or ERF may become more viscous and exhibit less elasticity. In examples, as a smart fluid material such as MRF and/or ERF becomes more viscous, the region occupied by the chamber containing a smart fluid material such as MRF and/or ERF may become stiffer. In examples, as a smart fluid material such as MRF and/or ERF becomes less viscous, the region occupied by the chamber containing a smart fluid material such as MRF and/or ERF may become less stiff and/or more flexible or elastic.

In examples, the effective modulus of elasticity of any one or more regions 518, 520, 522, and 524 may be configurable, adjustable, controllable, and/or modifiable by employing a smart material for the elastomer. In examples, the effective modulus of elasticity of any one or more regions 518, 520, 522, and 524 may be configurable, adjustable, controllable, and/or modifiable by employing a smart elastomer material such as magnetorheological elastomer (MRE), an electrorheological elastomer (ERE), or a combination of both.

In examples, an MRE is a type of soft magneto-active rubber-like material, whose physical or mechanical properties can be altered upon the application of a magnetic field. In the presence of a magnetic field, MREs may exhibit a magnetorheological effect providing a field-dependent physical or mechanical property, for example, a controllable modulus (Young Modulus or Elastic Modulus), due to the sensitive response of the magnetic particles to the field. In examples, while the field is removed, MREs may reclaim their original, natural property. In examples, MREs can be prepared by mixing micron-sized magnetic particles into nonmagnetic rubber-like matrices. In examples, an MRE may include of three basic components: magnetic particles, nonmagnetic elastic matrices, and additives. In examples, the magnetic particles may be selected to have higher permeability, higher saturation magnetization, and lower remnant magnetization for obtaining stronger magnetic field-sensitive effect. In examples, high modulus or low modulus can be chosen. In examples, the magnetic particles can be locked in the matrix in the absence or presence of a magnetic field. In examples, the additives may be selected according to the choice of the particles and the matrix. An example additive is silicone oil. Other additives may also be used. In examples, the magnetorheological effect may be defined as the ratio of the value increment of a property at a measured magnetic field to the initial value of that property at zero magnetic field. In examples, the magnetorheological effect may be characterized by the ratio of modulus increment AG at a measured magnetic field to the initial modulus Go, i.e., AG/Go.

In examples, an ERE are smart elastomers with tunable dynamic properties by applying electric field. In examples, ERE may be composed by polarizable particles dispersing within elastomers matrix. In examples, ERE do not require large-sized electromagnetic coils, and thus use of an ERE may result in a simpler structures than one employing an MRE. In examples, the rheological properties, such as modulus (Young Modulus or Elastic Modulus), viscosity, and yield stress, of an ERE can be reversibly changed by applying external electric field. In examples, EREs may include dielectric or semiconducting filler particles and polymer matrix. In examples, EREs may include polarizable particles and an elastomer matrix. In examples, the matrix may include a gel or rubber matrix. According to the distribution of polarizable particles in the elastomer matrix, two kinds of ER elastomers can be distinguished as isotropic EREs and anisotropic EREs. The particles in the isotropic EREs are randomly distributed without order, while they are form ordered structures as chains or columns in the anisotropic ones. In examples, the viscoelastic properties of EREs, such as storage modulus and loss modulus, may be electric field responsive.

In examples, one or more regions 518, 520, 522, and 524 of an elastic or elastomeric member or elastic body 514 may include a smart elastomer material such as MRE and/or ERE. In examples, an elastic or elastomeric member or elastic body 514 may be a combination of one or more smart elastomer materials such as MRE and/or ERE and one or more elastomer materials that are not a smart elastomer material such as MRE and/or ERE. In examples, an elastic or elastomeric member or elastic body 514 may include at least in part one or more elastomer materials that are not a smart elastomer material such as MRE and/or ERE. In examples, elastic or elastomeric member or elastic body 514 may include a smart elastomer material such as MRE and/or ERE only at one or more regions 518, 520, 522, and/or 524. In examples, only one of regions 518, 520, 522, and/or 524 of an elastic or elastomeric member or elastic body 514 contains a smart elastomer material such as MRE and/or ERE. In examples, at least two of regions 518, 520, 522, and/or 524 of an elastic or elastomeric member or elastic body 514 contain a smart elastomer material such as MRE and/or ERE. In examples, at least three of regions 518, 520, 522, and/or 524 of an elastic or elastomeric member or elastic body 514 contain a smart elastomer material such as MRE and/or ERE. In examples, all four regions 518, 520, 522, and/or 524 of an elastic or elastomeric member or elastic body 514 contain a smart elastomer material such as MRE and/or ERE. In example, the smart elastomer material such as MRE and/or ERE material may be coextensive with the region it occupies. In examples, the smart elastomer material such as MRE and/or ERE may be in at least a portion of a region it occupies. In examples, a region contains mixture of two or more a smart elastomer materials such as MREs and/or EREs. In examples, at least one region contains a smart elastomer material such as MRE and/or ERE that is different from a smart elastomer material such as MRE and/or ERE contained in at least one other region.

In examples, an application of a magnetic field may cause a change in the elasticity or modulus of the smart elastomer material such as MRE. Accordingly, application of a magnetic field may affect the effective modulus of elasticity of a region containing a smart elastomer material such as MRE. In examples, application of a magnetic field may therefore affect the behavior of a bushing or bushing system that contains one or more regions include one or more smart elastomer materials such as MREs.

In examples, an application of an electric field may cause a change in the elasticity or modulus of the smart elastomer material such as ERE. Accordingly, application of an electric field may affect the effective modulus of elasticity of a region containing a smart elastomer material such as ERE. In examples, application of a electric field may therefore affect the behavior of a bushing or bushing system that contains one or more regions include one or more smart elastomer materials such as EREs.

In examples, the bushing system may include one or more regions 518, 520, 522, and/or 524 including any combination of any of one or more chambers 218, 220, 222, and 224, fluidly interconnected or not, with or without the use of one or more smart fluid materials such as MRFs and/or ERFs, with or without any one or more regions 518, 520, 522, and/or 524 also containing one or more smart elastomer materials such as MREs and/or EREs.

In examples, any suitable means to apply a magnetic field to affect the properties of a smart fluid material such as MRF and/or ERF, and/or a smart elastomer material such as MRE and/or ERE may be employed.

In examples, one or more electromagnets may be placed at one or more locations along a periphery of an elastic or elastomeric member or elastic body 514. As illustrated in FIGS. 5A and 5B, one or more electromagnets 528, 530, 532, and 534 can be positioned proximate to one or more regions 518, 520, 522, and/or 524. An electromagnet may be configured to generate a magnetic field directed to at least a portion of the one or more regions 518, 520, 522, and/or 524. In examples, the bushing system may include an independently controllable electromagnet for generating and/or directing a magnetic field in or to at least a portion of each of the one or more regions 518, 520, 522, and 524 containing one or more smart fluid materials such as one or more MRF, one or more MRE, or both.

Figure 5C:
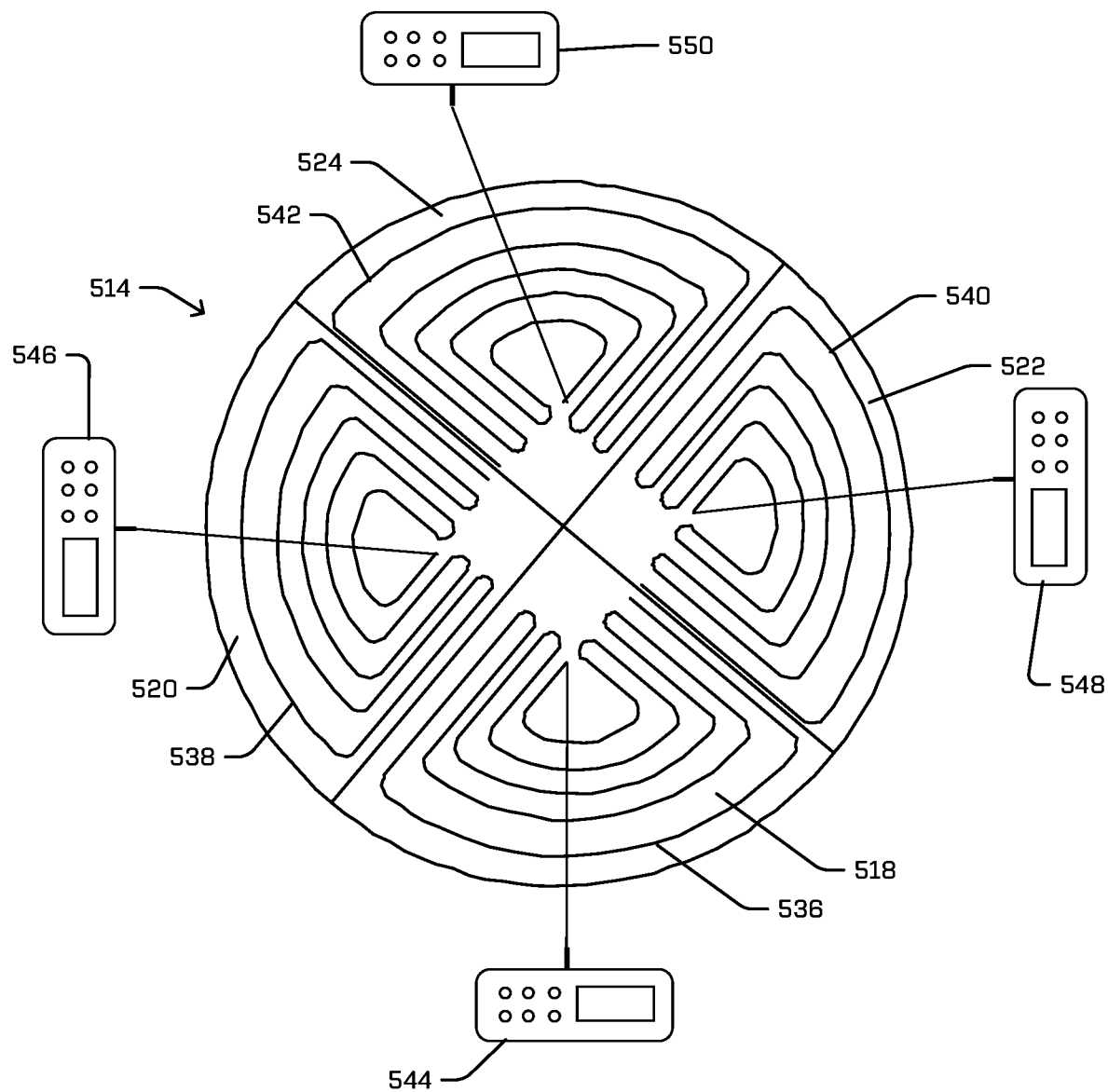

In examples, as illustrated in FIG. 5C, one or more regions 518, 520, 522, and 524 may include one or more electrical coils 536, 538, 540, and 542. In examples, a coil can include a wire of conductive material such as a copper wire. In examples, a coil may be present within an elastic or elastomeric member or elastic body 514. In examples, coils may be configured to generate a magnetic field. In examples, each of coils 536, 538, 540, and 542 may be configured to generate a magnetic field at least within the one or more regions in which the coil is located. In examples, the bushing system may include an independently controllable coil for generating a magnetic field in at least a portion of each of the one or more regions 518, 520, 522, and 524 containing a smart fluid material such as MRF, a smart elastomer material such as MRE, or both.

In examples, the bushing system may include a combination of one or more electromagnets and one or more coils. In examples, an electromagnet or coil to generate a magnetic field to affect the viscosity at least one of a first smart fluid material, second smart fluid material, third smart fluid material, and fourth smart fluid material. For example, an electromagnet or coil to generate a magnetic field to affect the viscosity at least one of a first MRF, second MRF, third MRF, and fourth MRF. In examples, the first, second, third, and fourth smart fluid material such as MRF may be the same or different. In examples, an electromagnet or coil to generate a magnetic field to affect the modulus or stiffness of a smart elastomer material such as MRE in at least one of the first region, second region, third region, and fourth region independently of the modulus or stiffness of a smart elastomer material such as MRE contained in at least one other of the first region, second region, third region, and fourth region.

Similarly, in examples, any suitable means to apply an electric field to affect a smart fluid material such as ERF and/or a smart elastomer material such as ERE may be employed. As described above, the system may be similarly arranged to include electrodes in place of electromagnets 528, 530, 532, and 534. Also, as described, the coils 536, 538, 540, and 542 may be similarly utilized to create electric fields instead of magnetic fields.

In examples, one or more controls 544, 546, 548, and 550 similar to controllers 250, 252, 254, 256, and/or 268 as previously described may be used to control the one or more electromagnets or electrodes 528, 530, 532, and 534 and/or coils 536, 538, 540, and 542. In examples, the one or more controllers 544, 546, 548, and 550 may be in communication with or be part of bushing control system 638 described later. In examples, the one or more controllers 544, 546, 548, and 550 may be in communication with each other. In examples, control system 638 as described may be used to control the operation of the one or more electromagnets or coils in a manner similar as discussed earlier with respect to the fluid flow control in one or more chambers.

In examples, using any of one or more of controllers 544, 546, 548, and 550, controllers 252, 254, 256, and/or 268, and/or control system 638, it may be possible to control either flow to and from any one chamber, viscosity of a smart fluid material such as MRF and/or ERF in a chamber or flowing from one chamber to the another chamber, and/or material properties, modulus or stiffness of a smart elastomer material such as MRE and/or ERE. In examples, controls any one or more of these features may allow for control, configuration, adjustment, and/or modification of an effective modulus of elasticity of one or more portions of a bushing system as described herein. In examples, as illustrated in FIGS. 5A-5C, the effective modulus of elasticity of any of one or more regions 518, 520, 522, and 524 may be adjusted or controlled by operation of fluid flow and/or application of a magnetic field, electric field, electric current, and/or electromagnetic field at the particular location. In examples, this ability to control may result in a bushing system with configurable effective modulus of elasticity between a first rigid portion, such as the housing, and a second rigid portion, such as the inner sleeve. In examples, the bushing system may be controlled to have configurable effective modulus of elasticity at least at one or more regions 518, 520, 522, and 524. In examples, the effective modulus of elasticity of each region may be independently controlled.

In examples, the reconfiguration of the effective modulus of elasticity of one or more regions of the bushing system may affect the behavior and/or reaction of the bushing system. In examples, the effective pivot point of a bushing system may be offset by controlling the effective modulus of elasticity of one or more regions of the bushing system. In examples, the control of the effective modulus of elasticity of one or more regions of the bushing system may be performed dynamically. In examples, the effective modulus of elasticity control may be based on sensor information, predicted information, sensed wheel behavior, predicted road conditions, vehicle status, predicted or sensed collision, predicted or sensed acceleration, pre-planned information, user input, previously stored passenger profiles, impact of the wheel with an object, predicted impact of the wheel with an object, detected vehicle maneuver, planned vehicle maneuver, road surface roughness, and/or any combination thereof. In examples, control system 638, as described herein, may control the effective modulus of elasticity of one or more regions of a bushing system based on sensor information, predicted information, sensed wheel behavior, predicted road conditions, vehicle status, predicted or sensed collision, predicted or sensed acceleration, pre-planned information, user input, previously stored passenger profiles, impact of the wheel with an object, predicted impact of the wheel with an object, detected vehicle maneuver, planned vehicle maneuver, road surface roughness, and/or any combination thereof.

In examples, the configurable and/or adjustable bushing system as described can provide an ability to dynamically tune the bushing performance to better react for a particular condition, such as for example, vehicle turning, acceleration, braking, directional change, and/or for any adjustment that may result in improved rider comfort. In examples, the configurable and/or adjustable busying system may be used for applications as motor mounts, in which case the stiffness or effective modulus of elasticity could be varied based on a measured vibration, based on RPM of the motor, or other like sensed condition. In examples, the configurable and/or adjustable busying system may be used for seat mounts to minimize vibration imparted to a passenger under different conditions, machine tool mounts in a factory setting, and other like applications. In examples, configurable and/or adjustable busying systems may provide an ability to control and/or coordinate the operation of two or more bushing systems based on any one or more of the previously stated conditions or information.

In examples, the bushing system may be controlled to dynamically change the effective modulus of elasticity of one or more regions 518, 520, 522, and 524. In examples, the bushing system may be controlled to only stiffen or allow for more elasticity in one region but not another. In examples, the effective modulus of elasticity of two or more regions may be dynamically controlled to achieve a desired effect. Any combination of effective modulus of elasticity adjustment, configuration, and/or control for any one or more of the regions 518, 520, 522, and 524 may be implemented.

Figure 6:
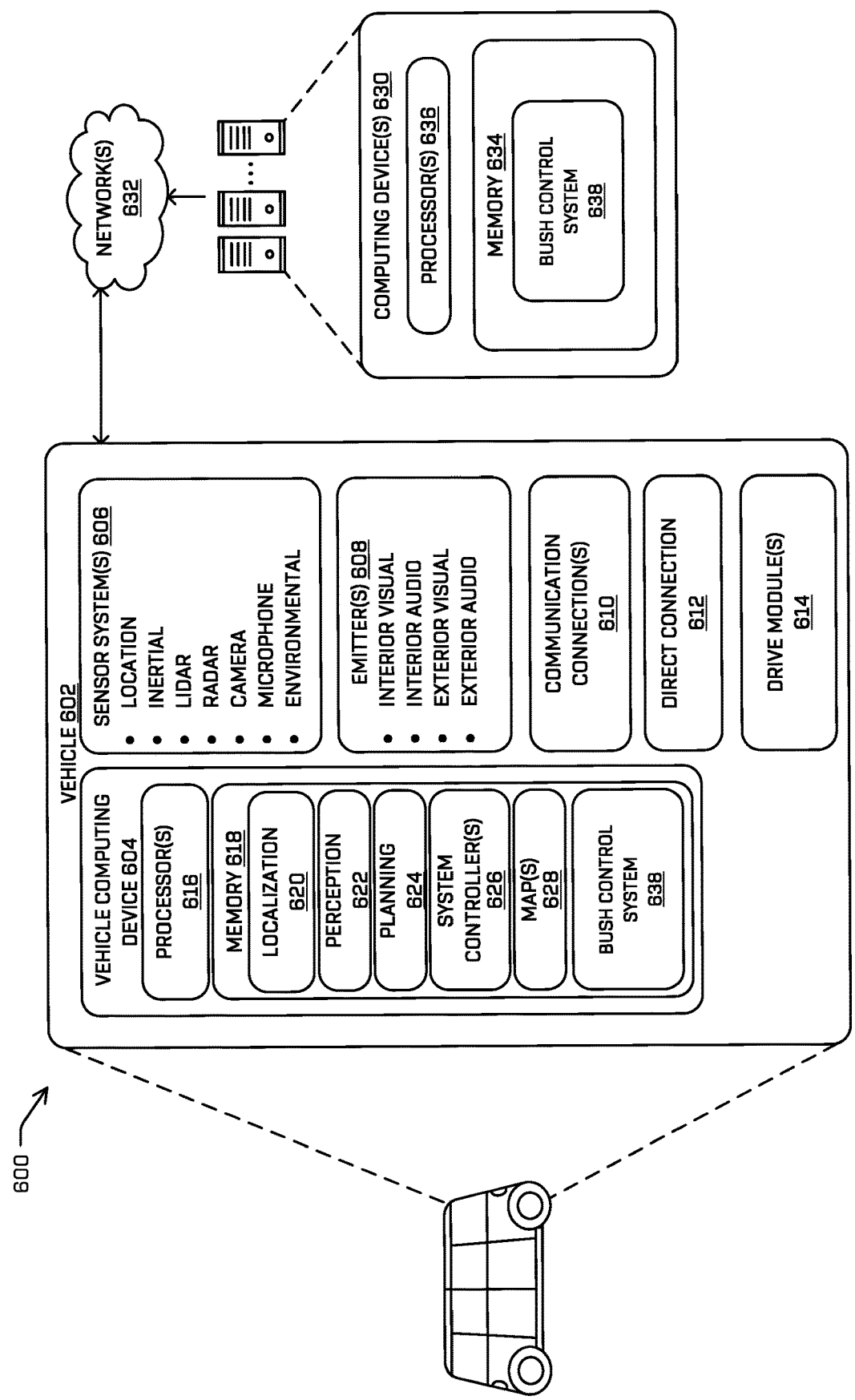
FIG. 6 is a block diagram of an example system architecture for implementing the example techniques described herein.

FIG. 6 depicts a block diagram of an example system 600 of vehicle 602. In at least some examples, the system 600 may include a vehicle 602, which may correspond to the example vehicle 300 discussed previously. The vehicle 602 may include a vehicle computing device 604, one or more sensor system(s) 606, one or more emitters 608, one or more communication connections 510, at least one direct connection 612, and one or more drive modules 614.

The vehicle computing device 604 may include one or more processors 616 and memory 618 communicatively coupled with the one or more processors 616. In the illustrated example, the vehicle 602 is an autonomous vehicle. However, the vehicle 602 may be any other type of vehicle. In the illustrated example, the memory 518 of the vehicle computing device 604 stores a localization component 620, a perception component 622, a planning component 624, a bushing control system 638, one or more system controllers 626, and one or more map(s) 628. Though depicted in FIG. 6 as residing in memory 618 for illustrative purposes, it is contemplated that the localization component 620, the perception component 622, the planning component 624, the bushing control system 638, the one or more system controllers 626, and/or the one or more maps 628 may additionally, or alternatively, be accessible to the vehicle 602 (e.g., stored on, or otherwise accessible by, memory remote from the vehicle 602).

Regarding the example system 600 shown in FIG. 6, in at least some examples, the localization component 620 may be configured to receive data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment and may continuously determine a location and/or orientation of the autonomous vehicle within the map. In some examples, the localization component 620 may utilize SLAM (simultaneous localization and mapping), CLAMS (calibration, localization and mapping, simultaneously), relative SLAM, bundle adjustment, non-linear least squares optimization, or the like to receive image data, LIDAR sensor data, radar data, IMU data, GPS data, wheel encoder data, and the like to accurately determine a location of the autonomous vehicle. In some examples, the localization component 320 may provide data to various components of the vehicle 602 to determine an initial position of an autonomous vehicle for generating a candidate trajectory, as discussed herein.

In some examples, the perception component 622 may be configured to perform object detection, segmentation, and/or classification. In some examples, the perception component 622 may provide processed sensor data that indicates a presence of an entity that is proximate to the vehicle 602 and/or a classification of the entity as an entity type (e.g., car, pedestrian, cyclist, animal, building, tree, road surface, curb, sidewalk, unknown, etc.). In additional and/or alternative examples, the perception component 622 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In general, the planning component 624 may determine a path for the vehicle 602 to follow to traverse through an environment. For example, the planning component 624 may determine various routes and trajectories and various levels of detail. For example, the planning component 624 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 624 may generate an instruction for guiding the autonomous vehicle along at least a portion of the route from the first location to the second location. In at least one example, the planning component 624 may determine how to guide the autonomous vehicle from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 602 to navigate.

In at least one example, the planning component 624 may determine a location of a user based on image data of an environment received from the user using, for example, bags of binary words with image-based features, artificial neural network, and the like. Further, the planning component 624 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 602 may stop to pick up a passenger. In at least one example, the planning component 624 may determine a pickup location based at least in part on determining a user identity (e.g., determined via image recognition or received as an indication from a user device, as discussed herein).

In other examples, the planning component 624 may alternatively, or additionally, use data from the perception component 622 to determine a path for the vehicle 602 to follow to traverse through an environment. For example, the planning component 624 may receive data from the perception component 622 regarding objects associated with an environment. Using this data, the planning component 624 may determine a route to travel from a first location (e.g., a current location) to a second location (e.g., a target location) to avoid objects in an environment. In at least some examples, such a planning component 624 may determine there is no such collision free path and, in turn, provide a path which brings vehicle 602 to a safe stop avoiding all collisions and/or otherwise mitigating damage.

In examples, a bushing control system 638 may be used to control the bushing system described herein (200/500). In examples, bushing control system 638 may be used in place of or may include one or more controllers 250, 252, 254, 256, 268, 544, 546, 548, and/or 550. As previously described controllers 250, 252, 254, 256, 268, 544, 546, 548, and/or 550 that are part of control system 638 may receive information from one or more other components or sensors of system 600. In examples, the one or more controllers of control system 638 may receive one or more signals from sensors and/or other components of system 600 indicative of an event or of a predicted event. In examples, the one or more controllers described may receive IMU data from one or more components of system 600. In examples, the event or predicted event may include one of a road conditions, such as the presence of an obstacle over which a wheel has to travel, a depression in the road through which a wheel has to travel, an acceleration of the vehicle, a vehicle braking, or any other like event. In examples, sensor information may include real time sensor information, predicted information, sensed wheel behavior, predicted road conditions, vehicle status, predicted or sensed collision, predicted or sensed acceleration, pre-planned information, user input, previously stored passenger profiles, impact of the wheel with an object, predicted impact of the wheel with an object, detected vehicle maneuver, planned vehicle maneuver, road surface roughness, and/or any combination thereof. In examples, the event may be determined by another component of system 600 and the signal sent to control system 638 and/or any of one or more controllers 250, 252, 254, 256, 268, 544, 546, 548, and/or 550 indicates the event or predicted event. In examples, the sensor data is sent to control system 638 and/or any of one or more controllers 250, 252, 254, 256, 268, 544, 546, 548, and/or 550 which then can determine the event or predicted event.

Based on one or more signals indicative of an event or predicted event and/or the determination of an event or predicted event, control system 638 and/or any of one or more controllers 250, 252, 254, 256, 268, 544, 546, 548, and/or 550 can determine the operation and control of bushing system as described and may generate a respective trigger signal to cause the desired operation. In examples, the one or more and/or any of one or more controllers 250, 252, 254, 256, 268, 544, 546, 548, and/or 550 of control system 638 may be in communication with each other to provide information and enable reaction in the status and control of one or more chambers of bushing system. In examples, the one or more controllers in control system 638 may receive sensor information about the status of each of chambers 218, 220, 222, and 224 and/or region 518, 520, 522, and 524.

In examples, control system 638 and/or any of one or more controllers 250, 252, 254, 256, 268, 544, 546, 548, and/or 550 may use the sensor information or other information available from one or more components of system 600 to effect control, configuration, modification, or operation of the bushing system. In examples, any of the control system may anticipate an event such as a wheel traveling over a bump, an acceleration of the vehicle, a predicted collision and/or braking, a wheel traveling through a dip in the road or any other event. In examples, any of the described control systems may time one or more trigger signals so that configuration of an effective modulus of elasticity of one or more regions of a bushing system may be cause in any of the described manners at the opportune time. In examples, map information may be used to anticipate a road condition and generate a trigger signal accordingly. In examples, any of the described control systems may trigger signals to cause configuration of an effective modulus of elasticity of one or more regions of a bushing system in response to a sense condition.

In examples, any of the described control systems may be configured to communicate or coordinate configuration of two or more bushing systems that are present in a vehicle. In examples, a rider experience may be enhanced by controlling the operation and/or effective modulus of elasticity of multiple bushing systems simultaneously. For examples, any of the described controls may be used to affect the operation and/or effective modulus of elasticity of bushing systems used in various suspensions of a vehicle.

Control and/or configuration of multiple bushing systems on a vehicle suspension or other component such as motor mounts, and seat mounts. In examples, any of the described controls may be employed to also control one or more bushing system used in any component such as motor mounts, and seat mounts. As previously described, in examples where one or more bushing systems are used in a motor mount, the described controls may cause the effective modulus of elasticity of a bushing system to be varied based on a measured vibration, based on RPM of the motor, or other like sensed condition. In examples, the configurable and/or adjustable busying system may be used for seat mounts to minimize vibration imparted to a passenger under different conditions, machine tool mounts in a factory setting, and other like applications and the described controls may cause the effective modulus of elasticity of a bushing system to be configured based on any of the previously sensed information along with any additional information regarding passenger pose, environment inside the vehicle, or any other information that can be sensed or predicted that may affect vibration of a vehicle seat.

In at least one example, the vehicle computing device 604 may include one or more system controllers 626, which may be configured to control steering, propulsion, braking, safety, emitters, communication, and other systems of the vehicle 602. These system controller(s) 626 may communicate with and/or control corresponding systems of the drive module(s) 614 and/or other components of the vehicle 602.

The memory 618 may further include one or more map(s) 628 that may be used by the vehicle 602 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the map may be stored in a tiled format, such that individual tiles of the map represent a discrete portion of an environment and may be loaded into working memory as needed. In at least one example, the one or more maps 628 may include at least one map (e.g., images and/or a mesh). In some examples, the vehicle 602 may be controlled based at least in part on the maps 628. That is, the maps 628 may be used in connection with the localization component 620, the perception component 622, and/or the planning component 624 to determine a location of the vehicle 602, identify objects in an environment, and/or generate routes and/or trajectories to navigate within an environment.

In some examples, the one or more map(s) 628 may be stored on a remote computing device(s) (such as computing device(s) 630) accessible via one or more network(s) 632. In some examples, multiple maps 628 may be stored based on, for example, a characteristic (e.g., type of entity, time of day, day of week, season of the year, etc.). Storing multiple maps 628 may have similar memory requirements but increase the speed at which data in a map may be accessed.

In examples, one or more of the sensor system(s) 606 may generate one or more signals indicative of an object (e.g., another vehicle, a wall, a guardrail, a bridge support, a utility pole, and/or a pedestrian) and communicate the one or more signals to the perception component 622 and/or the planning component 624, which may predict a collision with an object in the environment through which the vehicle 602 is travelling and trigger a signal accordingly. In examples, one or more of the sensor system(s) 606 may generate one or more signals indicative of direction of travel, vehicle status (e.g. acceleration, turning, and/or braking), and/or road conditions (e.g. presence and degree of obstacle one or more wheels have to travel over, and/or presence and degree of depression one or more wheels have to travel through), and communicate the one or more signals to the perception component 622, the planning component 624, and/or bushing control system 638, which may determine an event or predicted event and trigger one or more signals accordingly for the operation of bushing system 200.

In some examples, aspects of some or all of the components discussed herein may include any models, algorithms, and/or machine learning algorithms. For example, in some examples, the components in the memory 618 and/or the memory 634 may be implemented as a neural network.

As described herein, an exemplary neural network is a biologically inspired algorithm which passes input data through a series of connected layers to produce an output. Each layer in a neural network may also include another neural network or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks, such as, for example, ResNet70, ResNet101, VGG, DenseNet, PointNet, and the like.

In at least one example, the sensor system(s) 306 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time-of-flight (TOF), etc.), microphones, wheel encoders, environment sensors (e.g., temperature sensors, humidity sensors, light sensors, pressure sensors, etc.), etc. The sensor system(s) 306 may include multiple examples of each of these or other types of sensors. For example, the LIDAR sensors may include individual LIDAR sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device 604. Additionally, or alternatively, the sensor system(s) 606 may send sensor data, via the one or more networks 632, to the one or more computing device(s) 630 at a particular frequency, after a lapse of a predetermined period of time, in near real-time, etc.

The vehicle 602 may also include one or more emitters 608 for emitting light and/or sound, as described above. The emitters 608 in this example include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology.

The vehicle 602 may also include one or more communication connection(s) 610 that enable communication between the vehicle 602 and one or more other local or remote computing device(s). For example, the communication connection(s) 510 may facilitate communication with other local computing device(s) on the vehicle 602 and/or the drive module(s) 614. Also, the communication connection(s) 610 may allow the vehicle 602 to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 may include physical and/or logical interfaces for connecting the vehicle computing device 604 to another computing device or a network, such as network(s) 632. For example, the communications connection(s) 610 may enable Wi-Fi-based communication, such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive modules 614. In some examples, the vehicle 602 may have a single drive module 514. In at least one example, if the vehicle 602 has multiple drive modules 614, individual drive modules 514 may be positioned on opposite ends of the vehicle 602 (e.g., the leading end and the rear, etc.). In at least one example, the drive module(s) 614 may include one or more sensor systems to detect conditions of the drive module(s) 614 and/or the surroundings of the vehicle 602. By way of example and not limitation, the sensor system(s) 606 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 614. In some cases, the sensor system(s) on the drive module(s) 614 may overlap or supplement corresponding systems of the vehicle 602 (e.g., sensor system(s) 606).

The stopped here drive module(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 614 may include a drive module controller, which may receive and preprocess data from the sensor system(s) 606 and to control operation of the various vehicle systems. In some examples, the drive module controller may include one or more processors and memory communicatively coupled with the one or more processors. The memory may store one or more modules to perform various functionalities of the drive module(s) 614. Furthermore, the drive module(s) 614 also include one or more communication connection(s) that enable communication by the respective drive module with one or more other local or remote computing device(s).

In at least one example, the direct connection 612 may provide a physical interface to couple the one or more drive module(s) 614 with the body of the vehicle 602. For example, the direct connection 612 may allow the transfer of energy, fluids, air, data, etc. between the drive module(s) 614 and the vehicle 602. In some examples, the direct connection 612 may further releasably secure the drive module(s) 614 to the body of the vehicle 602.

In at least one example, the localization component 620, perception component 622, and/or the planning component 624 may process sensor data, as described above, and may send their respective outputs, over the one or more network(s) 632, to one or more computing device(s) 630. In at least one example, the localization component 320, the perception component 622, and/or the planning component 624 may send their respective outputs to the one or more computing device(s) 630 at a particular frequency, after a lapse of a predetermined period of time, in near real-time, etc.

The processor(s) 616 of the vehicle 602 and/or the processor(s) 636 of the computing device(s) 630 may include any suitable processor capable of executing instructions to process data and perform operations as described herein. By way of example and not limitation, the processor(s) 616 and 636 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and 634 are examples of non-transitory computer-readable media. The memory 618 and 634 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 6 is illustrated as a distributed system, in alternative examples, components of the vehicle 602 may be associated with the computing device(s) 630, and/or components of the computing device(s) 630 may be associated with the vehicle 602. That is, the vehicle 602 may perform one or more of the functions associated with the computing device(s) 630 and vice versa.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architecture 600 shown in FIG. 6 is merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architecture 600 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architecture 600. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architecture 300 may be transmitted to the architecture 600 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations.

Figure 7:
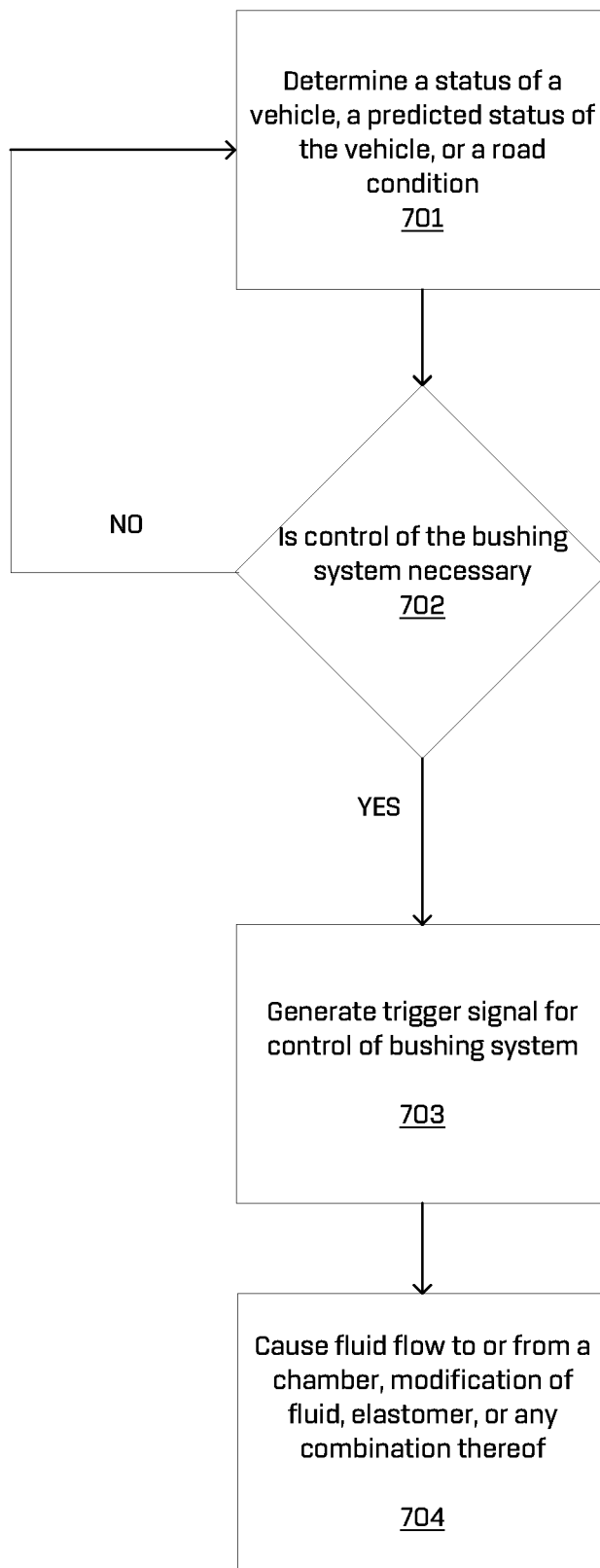
FIG. 7 is an example flow diagram of a system of operating a bushing system as described.

FIG. 7 illustrate an example flow diagram of the control of a bushing system. In examples, process flow 700 may determine at 701 a status of a vehicle, a location of the vehicle, a predicted status of the vehicle, or a road condition. The determination may be based on sensor information, predicted information, sensed wheel behavior, predicted road conditions, vehicle status, predicted or sensed collision, predicted or sensed acceleration, pre-planned information, user input, previously stored passenger profiles, impact of the wheel with an object, predicted impact of the wheel with an object, detected vehicle maneuver, planned vehicle maneuver, road surface roughness, and/or any combination thereof. This, as described earlier, may be performed based on sensor data, prediction module logic, mapping data, or any combination thereof. The information may be sent to control system 638 or one or more of the individual controllers that may be part of control system 638 or in communication with control system 638 as previously discussed. Upon determining a status of the vehicle, a predicted status of the vehicle, and/or a road condition or other relevant information, the system may determine at 702 whether an adjustment is to be made to the bushing system. In examples, as previously discussed, the bushing system may be control in order to either transform a motion from rotational to translational, from translational to rotational, to modify the effective modulus of elasticity of at least a portion of the bushing system, or a combination thereof. If the system determines that no control is necessary for the bushing system, then no trigger signal is generated and the system can return to monitoring a status of a vehicle, a location of the vehicle, a predicted status of the vehicle, and/or a road condition or like information at 701. If instead, the system determines at 702 that bushing system must be configured or controlled, then the system may generate at 703 at trigger signal to effectuate a control of the bushing system. In response to the trigger signal generated, the system at 704 may then cause either a fluid flow to or from at least one chamber, and/or modification of a material property of an MRF and/or MRE using a magnetic field, or any combination thereof. In this manner, the bushing system can be configured to perform as most suitable in the situation.

Figure 8A:
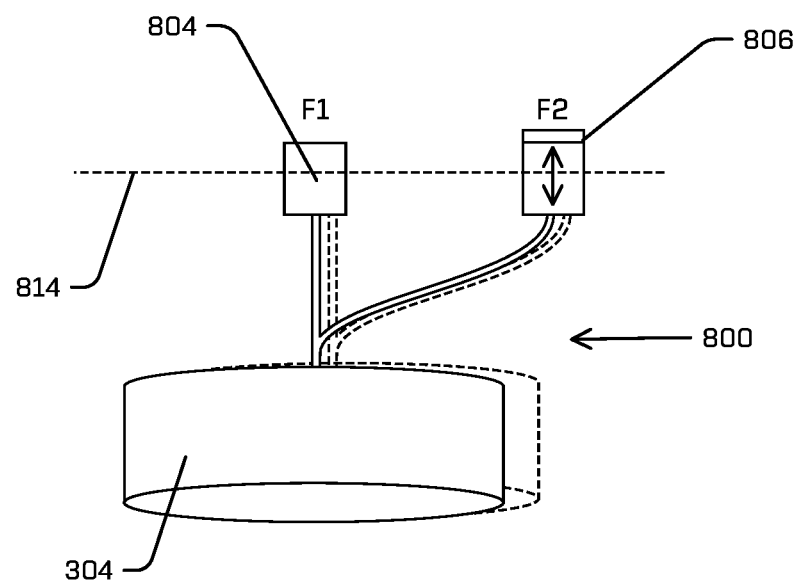
FIGS. 8A-8C are example diagrams illustrating the implementation of a bushing system as described herein in a Macpherson strut.
Figure 8C:
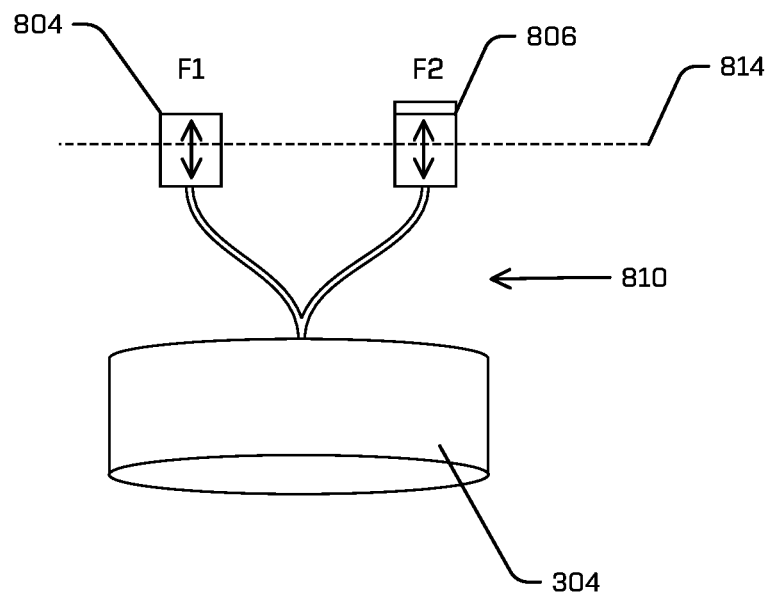
Figure 8B:
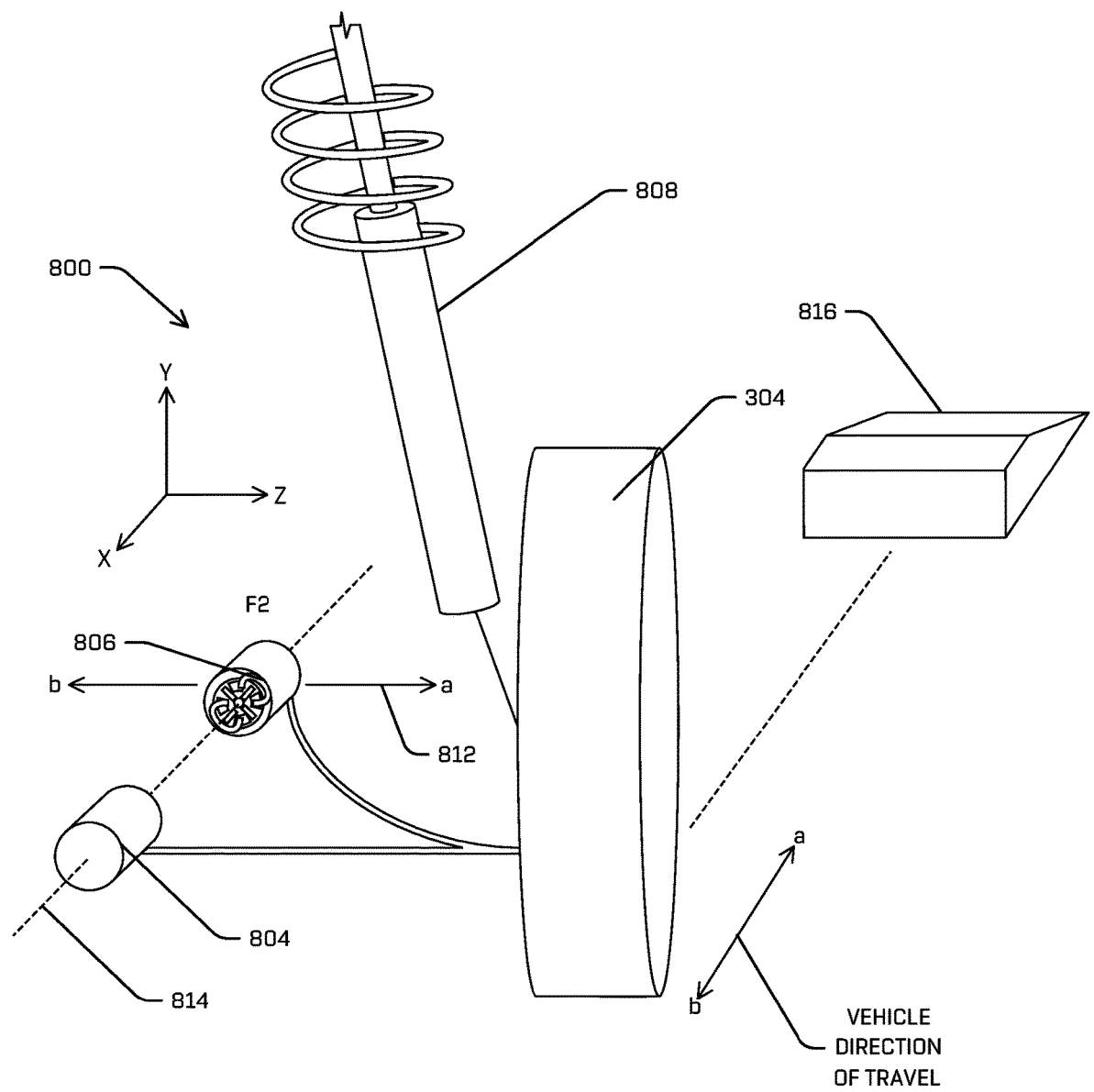

In examples, as illustrated in FIGS. 8A-8C, one or more bushing systems 200 may be used in a Macpherson strut. Any configuration may be used. FIGS. 8A and 8B illustrates a configuration 800 in which a wheel 304 is connected to vehicle 300 via a Macpherson strut 802 employing two bushings 804 and 806. In examples, additional components 808 may also be present in the suspension system. In examples, first bushing 704 may be a standard bushing and second bushing 806 may be a bushing system 200 as described herein. In examples, first bushing 804 may be a bushing system 200 as described herein, and second bushing 806 may be a standard bushing. In examples, both first and second bushings 804 and 806 may be a bushing system 200 as described herein. The bushing system 200 employed as illustrated in FIG. 8A may be a double-pin system, a single-pin system, or any combination thereof.

FIG. 8C illustrates an A-frame suspension arm 810 for a Macpherson strut connecting a wheel 304 to a vehicle 300 employing a first bushing 804 and a second bushing 806. As described, the first bushing 804 can be a standard bushing or a bushing system 200 as described herein. In examples, the second bushing 806 can be a standard bushing or a bushing system 200 as described herein. In examples, both first and second bushings 804 and 806 may be a bushing system 200 as described herein. The bushing system 200 employed as illustrated in FIG. 8C may be a double-pin system, a single-pin system, or any combination thereof.

As discussed earlier, employing one or more bushing system 200 may enable improved operation of the suspension system, such as the Macpherson strut illustrated in FIGS. 8A-8C, by transforming rotational motion of the suspension arm connected by way of bushing system 200 into translational motion or vice versa during travel. As illustrated in FIGS. 8A-8C, in examples, employing bushing system 200 may cause a translation at the location of the bushing system 200. The translation may be in a direction 812 about a pivot axis 814 of the bushing system 200 either toward or away from wheel 304. In examples, this motion may affect a suspension arm yaw and rotation. In examples, if wheel 304 travels over a bump 816 it will travel upward in a vertical direction. As the wheel 304 rises, it may result in a rotation of the suspension arms about pivot axis 814 at both first and second bushings 804 and 806. In examples where first bushing 804 is a standard bushing and second bushing 806 is a bushing system 200, double-pin system or single-pin system, it will induce a kinematic couple from rotational motion to a translational motion of the suspension arm along an axis perpendicular to wheel 304. As such, because of bushing system 200 operating as previously described, the system may result in a yaw rotation of the suspension arm connected via bushing system 200 and thus generate a longitudinal wheel recession.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Although the subject matter presented herein has been described in language specific to computer structural features, methodological acts, and computer readable media, it is to be understood that the subject matter defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present disclosure, which is set forth in the following claims.

Example Clauses

A. A vehicle comprising: a vehicle structure; a bushing system coupled to the vehicle structure, the bushing system comprising: a first rigid portion fixed to the vehicle structure; a second rigid portion movable relative to the first rigid portion; and an elastomeric member disposed between the first rigid portion and the second rigid portion, the elastomeric member defining a first chamber and a second chamber; and a suspension arm coupled to the second rigid portion; wherein the bushing system is configured such that at least one of: rotation of the suspension arm causes fluid to flow out of the first chamber and into the second chamber thereby causing the suspension arm to translate; or translation of the suspension arm causes fluid to flow out of the second chamber and into the first chamber, thereby causing the suspension arm to rotate.

B. The vehicle of paragraph A, wherein the first chamber is fluidly connected to the second chamber.

C. The vehicle of paragraph A or B, wherein the elastomeric member comprises a third fluid chamber fluidly connected to a fourth fluid chamber.

D. The vehicle of any one of paragraphs A-C, further comprising one or more fluid connections between the first chamber and the third chamber, and one or more fluid connections between the second chamber and the fourth chamber.

E. The vehicle of any one of paragraphs A-D, further comprising a bushing control system configured to control the operation of the bushing system by controlling fluid flow to and from at least the first chamber.

F. The vehicle of any one of paragraphs A-E, wherein the bushing system is a double-pin bushing system and the second rigid portion comprises a first inner sleeve and a second inner sleeve.

G. The vehicle of any one of paragraphs A-F, wherein the bushing system is a single-pin bushing system wherein the second rigid portion comprises an inner sleeve and further comprising one or more vanes extending from the inner sleeve.

H. The vehicle of paragraph G, wherein a vane extends into the elastomeric member between the first chamber and the second chamber.

I. The vehicle of paragraph H, further comprising: a third chamber and a fourth chamber, wherein a first vane extends from the inner sleeve into the elastomeric member between the first chamber and the second chamber, and wherein a second vane extends from the inner sleeve into the elastomeric member between the second chamber and the fourth chamber.

J. The vehicle of paragraph I, wherein the first chamber is fluidly connected to the second chamber and the third chamber being fluidly connected to the fourth chamber.

K. The vehicle of any one of paragraphs A-J, wherein the bushing system is a single-pin bushing system and the first rigid portion comprises a housing and further comprising one or more vanes extending from the housing.

L. The vehicle of any one of paragraphs A-K, further comprising: a third chamber and a fourth chamber, wherein a first vane extends from the housing into the elastomeric member between the first chamber and the third chamber, and wherein a second vane extends from the housing into the elastomeric member between the third chamber and the fourth chamber.

M. The vehicle of paragraph L, wherein the first chamber is fluidly connected to the second chamber and the third chamber being fluidly connected to the fourth chamber.

N. A bushing system comprising: a first rigid portion; a second rigid portion movable relative to the first rigid portion; and an elastomeric member disposed between the first rigid portion and the second rigid portion, the elastomeric member comprising: a first chamber; and a second chamber fluidly connected to the first chamber; wherein the bushing system is configured such that at least one of: rotation of the second rigid portion causes fluid to flow from the first chamber to the second chamber thereby causing the second rigid portion to translate; or translation of the second rigid portion causes fluid to flow from the second chamber to the first chamber, thereby causing the second rigid portion to rotate.

O. The bushing system of paragraph N, wherein the elastomeric member comprises a third chamber fluidly connected to a fourth chamber and further comprising one or more fluid connections between the first chamber and the third chamber, and one or more fluid connections between the second chamber and the fourth chamber.

P. The bushing system of paragraph N or O, wherein the bushing system is a double-pin bushing system wherein: the elastomeric member comprises a first elastic body and a second elastic body separate from the first elastic body; the first rigid portion is a housing surrounding the first elastic body and the second elastic body; the second rigid portion is a first inner sleeve surrounded by the first elastic body; the bushing system further comprising: a second inner sleeve surrounded by the second elastic body; a third chamber; and a fourth chamber fluidly connected to the third chamber, wherein the first chamber and the fourth chamber are embedded in the second elastic body, and the second chamber and the third chamber are embedded in the first elastic body.

Q. The bushing system of any one of paragraphs N-P, wherein the bushing system is a single-pin bushing system wherein: the first rigid portion comprises a housing; and the second rigid portion comprises an inner sleeve; the bushing system further comprising: one or more vanes extending from the inner sleeve; one or more vanes extending from the housing; a third chamber in the elastomeric member; and a fourth chamber in the elastomeric member.

R. The bushing system of paragraph Q, wherein: a first vane extends from the inner sleeve into the elastomeric member between the first chamber and the second chamber; a second vane extends from the inner sleeve into the elastomeric member between the second chamber and the fourth chamber; a third vane extends from the housing into the elastomeric member between the third chamber and the fourth chamber; and a fourth vane extends from the housing into the elastomeric member between the first chamber and the third chamber.

S. A method of transforming a first motion into a second motion comprising: receiving, by a bushing system comprising a first chamber fluidly connected to a second chamber, a first force that is either a translation first force or a rotational first force; causing the first chamber to be compressed in response to receiving the translation force or rotational force; causing the second chamber to expand in response to the first chamber being compressed; imparting, by the bushing system, a second force associated with causing the second chamber to expand, wherein: the second force is a rotational second force if the first force received is the translation first force, and the second force is a translation second force if the first force received is the rotational first force.

T. The method of paragraph S, further comprising controlling one or more valves in conjunction with causing the first chamber to be compressed and the second chamber to expand.

U. A vehicle comprising: a vehicle structure; a bushing system coupled to the vehicle structure, the bushing system comprising: a first rigid portion fixed to the vehicle structure; a second rigid portion movable relative to the first rigid portion; and an elastomeric member disposed between the first rigid portion and the second rigid portion; and a suspension arm coupled to the second rigid portion; wherein the bushing system is configured such that a first effective modulus of elasticity of a first region of the elastomeric member is configurable independent of a second effective modulus of elasticity of a second region of the elastomeric member in response to at least one of: a fluid flowing to or from a first chamber of the elastomeric member; or a modification of a physical property of a material in the elastomeric member.

V. The vehicle of paragraph U, wherein the elastomeric member further comprises: a third region of configurable effective modulus of elasticity; and a fourth region of configurable effective modulus of elasticity.

W. The vehicle of paragraph V, wherein the effective modulus of elasticity of the first region, the second region, the third region, and the fourth region is independently controlled.

X. The vehicle of paragraph V or W, wherein the first chamber in located in the first region, and further comprising: a second chamber in the second region; a third chamber in the third region; and a fourth chamber in the fourth region, wherein an effective modulus of elasticity of the first region, second region, third region, and fourth region is dependent on a fluid pressure in the first chamber, second chamber, third chamber, and fourth chamber respectively.

Y. The vehicle of paragraph X, further comprising a control system configured to control a fluid flow to and from at least one of the first chamber, the second chamber, the third chamber, or the fourth chamber.

Z. The vehicle of paragraph X or Y, wherein each of the first chamber, the second chamber, the third chamber, and the fourth chamber contains a smart fluid material.

AA. The vehicle of any one of paragraphs V-Z, wherein the first chamber is located in the first region, the first chamber containing a first smart fluid material, and further comprising: a second chamber in the second region, the second chamber containing a second smart fluid material; a third chamber in the third region, the third chamber containing a third smart fluid material; a fourth chamber in the fourth region, the fourth chamber containing a fourth smart fluid material; and an electrode, an electromagnet or a coil to generate an electric field, magnetic field, or an electromagnetic field to affect the viscosity of at least one of the first smart fluid material, the second smart fluid material, the third smart fluid material, and the fourth smart fluid material.

BB. The vehicle of paragraph AA, further comprising one or more controllers configured to independently control the viscosity of the first smart fluid material, the second smart fluid material, the third smart fluid material, or the fourth smart fluid material.

CC. The vehicle of any one of paragraphs V-BB, wherein the material in the elastomeric member comprises a smart elastomer material, and wherein the smart elastomer material is present in each of the first region, second region, third region, and fourth region, and further comprising: an electrode, an electromagnet or a coil configured to generate an electric field, magnetic field, or an electromagnetic field to modify a modulus of the smart elastomer material in at least one of the first region, the second region, the third region, or the fourth region independently of the modulus of the smart elastomer material present in at least one other of the first region, the second region, the third region, or the fourth region.

DD. The vehicle of paragraph CC, further comprising one or more controllers configured to independently control the modulus of the smart elastomer material in the first region, the second region, the third region, or the fourth region.

EE. The vehicle of any one of paragraphs U-DD, wherein the bushing system is a double-pin bushing system and the second rigid portion comprises a first inner sleeve and a second inner sleeve.

FF. The vehicle of any one of paragraphs U-EE, wherein the bushing system is a single-pin bushing system wherein the second rigid portion comprises an inner sleeve and further comprising one or more vanes extending from the inner sleeve.

GG. The vehicle of any one of paragraphs U-FF, wherein the first rigid portion comprises a housing and further comprising one or more vanes extending from the housing.

HH. A bushing system comprising: a first rigid portion; a second rigid portion movable relative to the first rigid portion; and an elastomeric member disposed between the first rigid portion and the second rigid portion, wherein the bushing system is configured such that a first effective modulus of elasticity of a first region of the elastomeric member is configurable independent of a second effective modulus of elasticity of a second region of the elastomeric member in response to at least one of: a fluid flowing to or from a first chamber of the elastomeric member; or a modification of a physical property of a material in the elastomeric member.

II. The bushing system of paragraph HH, wherein the elastomeric member further comprises: a third region of configurable effective modulus of elasticity; and a fourth region of configurable effective modulus of elasticity.

JJ. The bushing system of paragraph II, wherein the first chamber is in the first region, and wherein elastomeric member further comprises: a second chamber in the second region; a third chamber in the third region; and a fourth chamber in the fourth region, wherein an effective modulus of elasticity of the first region, the second region, the third region, and the fourth region is dependent on a fluid pressure in the first chamber, the second chamber, the third chamber, or the fourth chamber respectively.

KK. The vehicle of paragraph II or JJ, wherein the first chamber in located in the first region, the first chamber containing a first smart fluid material, and further comprising: a second chamber in the second region, the second chamber containing a second smart fluid material; a third chamber in the third region, the third chamber containing a third smart fluid material; a fourth chamber in the fourth region, the fourth chamber containing a fourth smart fluid material; and an electrode, an electromagnet or a coil configured to generate an electric field, magnetic field, or an electromagnetic field to affect the viscosity of at least one of the first smart fluid material, the second smart fluid material, the third smart fluid material, and the fourth smart fluid material.

LL. The vehicle of any one of paragraphs II-KK, wherein the material in the elastomeric member is a smart elastomer material, and wherein the smart elastomer material is present in each of the first region, second region, third region, and fourth region, and further comprising: an electrode, an electromagnet or a coil configured to generate an electric field, magnetic field, or an electromagnetic field to modify a modulus of the smart elastomer material in at least one of the first region, the second region, the third region, or the fourth region independently of a modulus of the smart elastomer material present in at least one other of the first region, the second region, the third region, or the fourth region.

MM. A method of configuring an effective modulus of elasticity of a bushing system comprising: determining a status of a vehicle, a predicted status of the vehicle, a location of the vehicle, or a road condition; generating, based at least in part on the status of the vehicle, the predicted status of the vehicle, the location of the vehicle, or the road condition, a trigger signal; configuring, based on the trigger signal, a first effective modulus of elasticity of a first region of the elastomeric member independent of a second effective modulus of elasticity of a second region of the elastomeric member by causing: a fluid flowing to or from a first chamber of the elastomeric member; or a modification of a physical property of a material in the elastomeric member.

NN. The method of paragraph MM, wherein the elastomeric member further comprises: a third region of configurable effective modulus of elasticity; and a fourth region of configurable effective modulus of elasticity, and wherein the effective modulus of elasticity of the first region of the elastomeric member is configured independently from the effective modulus of elasticity of the third region, or the fourth region.

While the example clauses described above are described with respect to particular implementations, it should be understood that, in the context of this document, the content of the example clauses can be implemented via a method, device, system, a computer-readable medium, and/or another implementation. Additionally, any of examples A-NN may be implemented alone or in combination with any other one or more of the examples A-NN.

What is claimed is:

1. A vehicle comprising:
a vehicle structure;
a bushing system coupled to the vehicle structure, the bushing system comprising:
a first rigid portion fixed to the vehicle structure;
a second rigid portion movable relative to the first rigid portion; and
an elastomeric member disposed between the first rigid portion and the second rigid portion; and
a suspension arm coupled to the second rigid portion;
wherein the bushing system is configured such that a first effective modulus of elasticity of a first region of the elastomeric member is configurable independent of a second effective modulus of elasticity of a second region of the elastomeric member, and
wherein the bushing system is one of:
a double-pin bushing system and the second rigid portion comprises a first inner sleeve and a second inner sleeve; or
a single-pin bushing system wherein the first rigid portion comprises a housing and the second rigid portion comprises an inner sleeve, and further comprising one or more vanes extending from the inner sleeve, from the housing, or from both.

2. The vehicle of claim 1, wherein the elastomeric member further comprises:
a third region of configurable effective modulus of elasticity; and
a fourth region of configurable effective modulus of elasticity.

3. The vehicle of claim 2, wherein the effective modulus of elasticity of the first region, the second region, the third region, and the fourth region is independently controlled.

4. The vehicle of claim 2, wherein the elastomeric member includes a first chamber located in the first region, and further comprising:
a second chamber in the second region;
a third chamber in the third region; and
a fourth chamber in the fourth region,
wherein an effective modulus of elasticity of the first region, second region, third region, and fourth region is dependent on a fluid pressure in the first chamber, second chamber, third chamber, and fourth chamber respectively.

5. The vehicle of claim 4, further comprising a control system configured to control a fluid flow to and from at least one of the first chamber, the second chamber, the third chamber, or the fourth chamber.

6. The vehicle of claim 4, wherein each of the first chamber, the second chamber, the third chamber, and the fourth chamber contains a smart fluid material.

7. The vehicle of claim 2, wherein the elastomeric member includes a first chamber located in the first region, the first chamber containing a first smart fluid material, and further comprising:
a second chamber in the second region, the second chamber containing a second smart fluid material;
a third chamber in the third region, the third chamber containing a third smart fluid material;
a fourth chamber in the fourth region, the fourth chamber containing a fourth smart fluid material; and
an electrode, an electromagnet or a coil to generate an electric field, magnetic field, or an electromagnetic field to affect a viscosity of at least one of the first smart fluid material, the second smart fluid material, the third smart fluid material, and the fourth smart fluid material.

8. The vehicle of claim 7, further comprising one or more controllers configured to independently control the viscosity of the first smart fluid material, the second smart fluid material, the third smart fluid material, or the fourth smart fluid material.

9. The vehicle of claim 2, wherein a material in the elastomeric member comprises a smart elastomer material, and wherein the smart elastomer material is present in each of the first region, second region, third region, and fourth region, and further comprising:
an electrode, an electromagnet or a coil configured to generate an electric field, magnetic field, or an electromagnetic field to modify a modulus of the smart elastomer material in at least one of the first region, the second region, the third region, or the fourth region independently of the modulus of the smart elastomer material present in at least one other of the first region, the second region, the third region, or the fourth region.

10. The vehicle of claim 9, further comprising one or more controllers configured to independently control the modulus of the smart elastomer material in the first region, the second region, the third region, or the fourth region.

11. The vehicle of claim 1, wherein the bushing system is the double-pin bushing system wherein the second rigid portion comprises the first inner sleeve and the second inner sleeve.

12. The vehicle of claim 1, wherein the bushing system is the single-pin bushing system and at least a first of the one or more vanes extends from the inner sleeve.

13. The vehicle of claim 12, wherein at least a second of the one or more vanes extends from the housing.

14. A bushing system comprising:
a first rigid portion;
a second rigid portion movable relative to the first rigid portion; and
an elastomeric member disposed between the first rigid portion and the second rigid portion,
wherein the bushing system is configured such that a first effective modulus of elasticity of a first region of the elastomeric member is configurable independent of a second effective modulus of elasticity of a second region of the elastomeric member, and
wherein the bushing system is one of:
a double-pin bushing system and the second rigid portion comprises a first inner sleeve and a second inner sleeve; or
a single-pin bushing system wherein the first rigid portion comprises a housing and the second rigid portion comprises an inner sleeve, and further comprising one or more vanes extending from the inner sleeve, from the housing, or from both.

15. The bushing system of claim 14, wherein the elastomeric member further comprises:
a third region of configurable effective modulus of elasticity; and
a fourth region of configurable effective modulus of elasticity.

16. The bushing system of claim 15, wherein the elastomeric member includes a first chamber in the first region, and wherein elastomeric member further comprises:
a second chamber in the second region;
a third chamber in the third region; and
a fourth chamber in the fourth region,
wherein an effective modulus of elasticity of the first region, the second region, the third region, and the fourth region is dependent on a fluid pressure in the first chamber, the second chamber, the third chamber, or the fourth chamber respectively.

17. The bushing system of claim 15, wherein the elastomeric member includes a first chamber located in the first region, the first chamber containing a first smart fluid material, and further comprising:
a second chamber in the second region, the second chamber containing a second smart fluid material;
a third chamber in the third region, the third chamber containing a third smart fluid material;
a fourth chamber in the fourth region, the fourth chamber containing a fourth smart fluid material; and
an electrode, an electromagnet or a coil configured to generate an electric field, magnetic field, or an electromagnetic field to affect the viscosity of at least one of the first smart fluid material, the second smart fluid material, the third smart fluid material, and the fourth smart fluid material.

18. The bushing system of claim 15, wherein a material in the elastomeric member is a smart elastomer material, and wherein the smart elastomer material is present in each of the first region, second region, third region, and fourth region, and further comprising:
an electrode, an electromagnet or a coil configured to generate an electric field, magnetic field, or an electromagnetic field to modify a modulus of the smart elastomer material in at least one of the first region, the second region, the third region, or the fourth region independently of a modulus of the smart elastomer material present in at least one other of the first region, the second region, the third region, or the fourth region.

19. A method of configuring an effective modulus of elasticity of a bushing system comprising:
determining a status of a vehicle, a predicted status of the vehicle, a location of the vehicle, or a road condition;
generating, based at least in part on the status of the vehicle, the predicted status of the vehicle, the location of the vehicle, or the road condition, a trigger signal;
configuring, based on the trigger signal, a first effective modulus of elasticity of a first region of an elastomeric member independent of a second effective modulus of elasticity of a second region of the elastomeric member by:
causing a first fluid to flow between a first chamber of the elastomeric member substantially located above a first inner sleeve and a second chamber of the elastomeric member substantially located on a horizontal side of a second inner sleeve, or causing a second fluid to flow between a third chamber of the elastomeric member, the third chamber being located below the first inner sleeve and opposite the first chamber, and a fourth chamber being located on a horizontal side of a second inner sleeve opposite the second chamber,
wherein the first inner sleeve is the same or different from the second inner sleeve.

20. The method of claim 19, wherein the elastomeric member further comprises:
a third region of configurable effective modulus of elasticity; and
a fourth region of configurable effective modulus of elasticity, and
wherein the effective modulus of elasticity of the first region of the elastomeric member is configured independently from the effective modulus of elasticity of the third region, or the fourth region.

* * * * *